(12) United States Patent
Guan

(10) Patent No.: US 12,509,675 B2
(45) Date of Patent: Dec. 30, 2025

(54) AMINOACYL-TRNA SYNTHETASES AND USES HEREOF

(71) Applicant: Novo Nordisk A/S, Bagsvaerd (DK)

(72) Inventor: Hongtao Guan, Beijing (CN)

(73) Assignee: Novo Nordisk A/S, Bagsvaerd (DK)

( * ) Notice: Subject to any disclaimer, the term of this patent is extended or adjusted under 35 U.S.C. 154(b) by 899 days.

(21) Appl. No.: 17/431,452

(22) PCT Filed: Feb. 19, 2020

(86) PCT No.: PCT/EP2020/054343
§ 371 (c)(1),
(2) Date: Aug. 17, 2021

(87) PCT Pub. No.: WO2020/169658
PCT Pub. Date: Aug. 27, 2020

(65) Prior Publication Data
US 2022/0251535 A1  Aug. 11, 2022

(30) Foreign Application Priority Data
May 3, 2019  (EP) .................................... 19172611

(51) Int. Cl.
*C12N 9/00* (2006.01)
*C12P 21/02* (2006.01)

(52) U.S. Cl.
CPC ................ *C12N 9/93* (2013.01); *C12P 21/02* (2013.01); *C12Y 601/01* (2013.01)

(58) Field of Classification Search
None
See application file for complete search history.

(56) References Cited

U.S. PATENT DOCUMENTS

| | | | |
|---|---|---|---|
| 4,572,894 A | 2/1986 | Imahori et al. | |
| 7,045,337 B2 | 5/2006 | Schultz et al. | |
| 7,824,893 B2 | 11/2010 | Deiters et al. | |
| 9,644,002 B2 | 5/2017 | Schepartz | |
| 2002/0042097 A1 | 4/2002 | Tirrell et al. | |
| 2014/0319415 A1 | 10/2014 | Inouye et al. | |
| 2015/0080549 A1 | 3/2015 | Kariyuki et al. | |
| 2016/0368993 A1 | 12/2016 | Sutcliffe et al. | |

FOREIGN PATENT DOCUMENTS

| | | | |
|---|---|---|---|
| CN | 1477195 A | 2/2004 | |
| WO | 2004110964 A2 | 12/2004 | |
| WO | WO-2006034332 A2 * | 3/2006 | ....... A61K 47/48246 |
| WO | 2006097537 A2 | 9/2006 | |
| WO | 2006110182 A2 | 10/2006 | |
| WO | 2006133088 | 12/2006 | |
| WO | 2008081418 A1 | 7/2008 | |
| WO | 08121563 A3 | 11/2008 | |
| WO | 2010006214 A1 | 1/2010 | |
| WO | 13049234 A2 | 4/2013 | |
| WO | 2015120287 A2 | 8/2015 | |
| WO | 2016154675 | 10/2016 | |
| WO | 2018069481 | 4/2018 | |
| WO | 2018206738 A1 | 11/2018 | |

OTHER PUBLICATIONS

Sokabe, Masaaki; et al; "The structure of alanyl-tRNA synthetase with editing domain" Proceedings of the National Academy of Science, 106, 11028-11033, 2009 (Year: 2009).*
Bain et al., "Bio synthetic site-specific incorporation of a non-natural amino acid into a polypeptide." Journal of the American Chemical Society, 1989, vol. 111, No. 20, pp. 8013-8014.
Chin, J.,"Expanding and reprogramming the genetic code of cells and animals," Annual review of biochemistry, Feb. 2014, vol. 83, pp. 379-408.
"Database UniProt [Online] May 30, 2000 (May 30, 2000), 11 RecName: Full-Alanine-tRNA ligase; EC=6.1.1.7; AltName: Full=Alanyl-tRNA synthetase; Short=AlaRS; 11,XP002794728, retrieved from EBI accession No. UniProt:O58035 Database accession No. O58035".
Hirsch et al.,"Error analysis by amino acid analog incorporation in tissues of aging mice." Interdisc. Topic. Gerontol, Jan. 1976, vol. 140, pp. 1-10.
Ibba et al.,"Substrate specificity is determined by amino acid binding pocket size in *Escherichia coli* phenylalanyl-tRNA synthetase." Biochemistry, 1994, vol. 33, No. 23, pp. 7107-7112.
JC Anderson et al.,"An expanded genetic code with a functional quadruple codon." Proceedings of the national academy of sciences, May 2004, vol. 101, No. 20, pp. 7566-7571.
Lau Jesper et al.,"Discovery of the Once-Weekly Glucagon-Lik Peptide-1(GLP-1) Analogue Semaglutide," Journal of Medicinal Chemistry, Sep. 2015, vol. 58, No. 18, pp. 7370-7380.
Liu et al.,"Adding new chemistries to the genetic code." Annual review of biochemistry, Mar. 2010, vol. 79, pp. 413-444.
Noren et al.,"A general method for site-specific incorporation of unnatural amino acids into proteins." Science, Apr. 1989, vol. 244, No. 4901, pp. 182-188.
Tsuchiya et al.,"Chemoenzymatic synthesis of polypeptides containing the unnatural amino acid 2-aminoisobutyric acid." Chemical Communications, Jan. 2017, vol. 53, No. 53, pp. 7318-7321.
Wang et al.,"A general approach for the generation of orthogonal tRNAs." Chemistry & biology, Jul. 2001, vol. 8, No. 9, pp. 883-890.
Young et al.,"Beyond the canonical 20 amino acids: expanding the genetic lexicon. Journal of Biological Chemistry>" Feb. 2010, vol. 285, No. 15, pp. 11039-11044.

* cited by examiner

*Primary Examiner* — David W Berke-Schlessel
(74) *Attorney, Agent, or Firm* — Elizabeth A. Dingess-Hammond

(57) ABSTRACT

The invention relates to aminoacyl-tRNA synthetases that aminoacylate tRNA with 2-Aminoisobutyric acid (Aib), thus enabling the incorporation of the Aib into a growing polypeptide chain during translation, e.g. in eubacterial host cells such as *E. coli*. For example, but not limited to, the invention relates to new aminoacyl-tRNA synthetases and the uses hereof, as well as a method for producing polypeptides that contain one or more Aib.

5 Claims, No Drawings
Specification includes a Sequence Listing.

AMINOACYL-TRNA SYNTHETASES AND USES HEREOF

CROSS-REFERENCE TO RELATED APPLICATIONS

This application is a 35 U.S.C. § 371 National Stage application of International Application PCT/EP2020/054343 (WO 2020/169658), filed Feb. 19, 2020, which claims priority to European Patent Application 19172611.6, filed May 3, 2019 and International Application PCT/CN2019/075525, filed Feb. 20, 2019; the contents of which are incorporated herein by reference.

TECHNICAL FIELD

The invention is in the field of translation biochemistry. The invention relates to an aminoacyl-tRNA synthetase that can be used to incorporate unnatural amino acids into polypeptides.

INCORPORATION-BY-REFERENCE OF THE SEQUENCE LISTING

The present application is filed with a Sequence Listing in electronic form. The entire contents of the sequence listing are hereby incorporated by reference.

BACKGROUND

Recombinant expression is an efficient way to produce natural or engineered proteins and peptides (individually and collectively referred to as "polypeptides"). The vast majority of known organism encodes the same twenty naturally occurring amino acids, and consequently recombinant expression is, without further development, limited to polypeptides made exclusively from naturally occurring amino acids. One strategy to overcome this limitation has been developed for the in vivo site-specific incorporation of diverse unnatural amino acids into polypeptides in both prokaryotic and eukaryotic organisms (Wang L1, Schultz PG, A general approach for the generation of orthogonal tRNAs, Chem. Biol., 2001 Sep. 8 (9): 883-90; Liu CC, Schultz PG, Adding new chemistries to the genetic code, Annu. Rev. Biochem., 2010, 79:413-44.). These methods utilize an aminoacyl-tRNA synthetase (RS) that aminoacylates a tRNA with a desired unnatural amino acid, which in turn incorporates that desired unnatural amino acid into a growing polypeptide chain in response to a selector codon during translation. The translation components may be developed to cross-react with the endogenous tRNAs, RSs, or amino acids in the host organism with reduced efficiency.

2-Aminoisobutyric acid (Aib) is a non-proteinogenic amino acid with the structural formula $H_2N-C(CH_3)_2-COOH$. Aib can be incorporated into a polypeptide and endow the polypeptide with desirable properties. One example of a polypeptide with desirable properties comprising Aib is semaglutide; a bioactive GLP-1 (glucagon-like peptide-1) analogue [Lau J. et. al, Discovery of the once-weekly glucagon-like peptide-1 (GLP-1) analogue semaglutide, J. Med. Chem., 2015; 58:7370-7380] that has been marketed as the antidiabetic drug Ozempic®. Semaglutide is disclosed in WO06097537.

No translation components have been reported to genetically encode Aib, and thus polypeptides containing Aib are currently precluded from being recombinantly expressed.

SUMMARY

The invention relates to an aminoacyl-tRNA synthetase that aminoacylates tRNA with 2-Aminoisobutyric acid (Aib), thus enabling the incorporation of the Aib into a growing polypeptide chain during translation. In other words, the invention provides means for the preparation of polypeptides having translationally incorporated Aib.

In a first aspect, the invention relates to 2-Aminoisobutyric acid-tRNA synthetase (AibRS) that aminoacylates a tRNA with 2-Aminoisobutyric acid. In a second aspect, the invention relates to the use of AibRS for the preparation of polypeptides containing Aib. In a third aspect, invention relates to a method for preparing a compound comprising a polypeptide containing Aib, wherein the method comprises the step of using the AibRS for the preperation of the polypeptide containing Aib.

DESCRIPTION

Unless otherwise indicated, in the specification and in the appended claims, terms presented in singular form also include the plural situation. Thus, the singular forms "a", "an" and "the" include plural referents unless the content clearly dictates otherwise. E.g. reference to "a polypeptide" includes, as a practical matter, many polypeptides.

In a first aspect, the invention relates to 2-Aminoisobutyric acid-tRNA synthetase (AibRS). The 2-Aminoisobutyric acid-tRNA synthetase (AibRS) comprises an amino acid sequence of SEQ ID NO: 7 or a variant hereof, wherein the variant of SEQ ID NO: 7 has Gly in position 215.

In another aspect, the invention relates to the use of an AibRS of the invention for the preparation of a polypeptide containing Aib. In a further aspect, the invention relates to the use of an AibRS of the invention for the preparation of a resulting polypeptide comprising SEQ ID NO: 32.

In another aspect, the invention relates to a method for preparing Chem. 2 including the steps of (i) preparing a resulting polypeptide by using an AibRS of the invention and (ii) derivatisation of the resulting polypeptide.

2-Aminoisobutyric Acid (Aib)

The term "2-Aminoisobutyric acid " (Aib), as used herein, refers to the unnatural amino acid represented by the chemical structure Chem 1. Aib may also be referred to as "α-methylalanine".

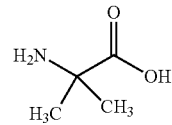

Chem 1

2-Aminoisobutyric Acid-tRNA Synthetase (AibRS)

As used herein, "2-Aminoisobutyric acid-tRNA synthetase" (AibRS) refers to an aminoacyl-tRNA synthetase (RS) that is capable of aminoacylating a tRNA with Aib. The AibRS may be: (i) identical or substantially similar to a naturally occurring alanine-tRNA synthetase (AlaRS), (ii) derived from a naturally occurring AlaRS by natural or artificial mutagenesis, (iii) or derived by any process that takes a sequence of a wild-type or mutant AlaRS sequence of (i) or (ii) into account, e.g. library screening or rational design. The AibRS may be derived from an AlaRS of *Pyrococcus horikoshii* or any naturally occurring AlaRS.

The term "translation", as used herein, refers to a translation operation, or part of a translation operation, that is identical or similar to the translation operation of gene expression as known from the fields of molecular biology and genetics. The outcome of translation is a growing polypeptide chain which is also referred to as a "resulting polypeptide". The AibRS of the invention may aminoacylate a tRNA with Aib making the tRNA available for translation, wherein the outcome of the translation is a resulting polypeptide containing one or more Aib residues. A tRNA that functions in this manner is also referred to as "tRNA$^{Aib}$". In other words, the AibRS may be configured to incorporate Aib into a resulting polypeptide when used in connection with a translation process. The function of the Aib is not limited to any specific resulting polypeptide. The translation system is particularly suitable for preparing a resulting polypeptide comprising SEQ ID NO: 32.

The aminoacylatation of the tRNA with Aib by the AibRS may take place in competition with other amino acids, e.g. a natural amino acid, such as Ala, present in a host cell. In other words, the invention is not limited to an AibRS that exclusively functions to aminoacylate the tRNA of the translational system with Aib; the AibRS of the invention may aminoacylate the tRNA with any amino acid. Preferably, the AibRS aminoacylates the tRNA with Aib. The efficiency of the AibRS function may be determined by analysing the resulting polypeptide upon translation of the tRNA. The efficiency may be expressed as the ratio between the amount of resulting polypeptide containing Aib and the amount of resulting polypeptide containing another amino acid, e.g. Ala. The quantification of the resulting polypeptide may be carried out using LC-MS.

The function of the AibRS of the invention is not limited to any specific biological system. The AibRS may operate in context of in vitro conditions and/or in vivo conditions. The AibRS is suitable for operating in context of a host cell, where the translation of the resulting polypeptide containing Aib takes place by utilising one or more components of the translation machinery of the host cell. The AibRS may interact with endogenous components of a biological system in which the AibRS is utilised, e.g. components of a host cell.

The term "aminoacylation" as used herein, refers to the operation in which an AibRS (or any other aminoacyl-tRNA synthetase) catalyses the bonding between a tRNA and an amino acid. The AibRS is said to "aminoacylate" the tRNA. The term "aminoacylate" is used interchangeably with "charge".

In one embodiment, the AibRS comprises an amino acid sequence of SEQ ID NO: 7 or a variant hereof, wherein the variant comprises 215Gly. In one embodiment the variant of SEQ ID NO: 7 is a variant of Formula I. In one embodiment, the variant of Formula I is at least 90% identical to SEQ ID NO: 7 in positions not designated Xaa. In one embodiment, the variant of Formula I is at least 50%, at least 60%, at least 70%, at least 75%, at least 80%, at least 85%, at least 90%, at least 95%, at least 99%, or at least 100% identical to Formula I in sequence positions that are not designated Xaa. In one embodiment, the variant of SEQ ID NO: 7 is at least 41%, at least 55%, or at least 90% identical to SEQ ID NO: 7. In one embodiment, the variant of SEQ ID NO: 7 is at least 50%, preferably at least 60%, more preferably at least 70%, more preferably at least 75%, more preferably at least 80%, more preferably at least 85%, more preferably at least 90%, more preferably at least 95%, and most preferably at least 99% identical to SEQ ID NO: 7. In one embodiment, the variant of SEQ ID NO: 7 is characterised in: position 192 is Trp, His, Val, Ile, or Leu, position 193 is Ala, Leu, Ile, or Gly, position 213 is Thr, Ser, Cys, or Ala, position 216 is Phe or Trp, position 217 is Met, Ile, or Leu, position 249 is Thr, Ser, Val, or Phe, position 360 is Asn or Ala, and position 459 is Glu or Ala. In one embodiment, the variant of SEQ ID NO: 7 comprises: [192His; 215Gly]; [192His; 215Gly; 360Ala; 459Ala], [192His; 215Gly; 217Ile; 360Ala; 459Ala], [192His; 215Gly; 217Leu; 360Ala; 459Ala], [192His; 215Gly; 193Leu; 360Ala; 459Ala], [192His; 215Gly; 216Trp; 360Ala; 459Ala], [192His; 215Gly; 193Leu; 216Trp; 360Ala; 459Ala], [192His; 215Gly; 193Ile; 360Ala; 459Ala], [192His; 215Gly; 193Ile; 217Ile; 360Ala; 459Ala], [192His; 215Gly; 193Leu; 217Ile; 360Ala; 459Ala], [192His; 215Gly; 193Ile; 217Leu; 360Ala. 459Ala], [192His; 215Gly; 193Leu; 217Leu; 360Ala; 459Ala], [192Val; 215Gly; 217Ile; 360Ala; 459Ala], [192Ile; 215Gly; 217Ile; 360Ala; 459Ala], [192Leu; 215Gly; 217Ile; 360Ala; 459Ala], [192His; 193Gly; 215Gly; 217Ile; 360Ala; 459Ala], [192His; 213Ser; 215Gly; 360Ala; 459Ala], [192His; 215Gly; 249Ser; 360Ala; 459Ala], [192His; 215Gly; 249Val; 360Ala; 459Ala], [192His; 213Cys; 215Gly; 249Val; 360Ala; 459Ala], or [192His; 213Ala; 215Gly; 249Phe; 360Ala; 459Ala]. In one embodiment, the variant of SEQ ID NO: 7 is selected from a list consisting of SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30. In one embodiment, the AibRS is derived from an archaeal bacterium. In one embodiment, the AibRS is derived from *Pyrococcus horikoshii*. In one embodiment, the AibRS is configured to perform the function of aminoacylating a tRNA with Aib. In one embodiment, the AibRS is capable of aminoacylating a tRNA with Aib. In one embodiment, the AibRS is configured to perform the function of aminoacylating a tRNA with Aib in a host cell. In one embodiment, the AibRS is configured to perform the function of aminoacylating a tRNA with Aib in *E. coli*. In one embodiment, the efficiency of the function of aminoacylating a tRNA with Aib is determined by analysing the expression product, i.e. the resulting polypeptide upon translation of the tRNA. In one embodiment, the efficiency is expressed as the incorporation ratio between the resulting polypeptide containing Aib and the amount of resulting polypeptide containing Ala or Aib in the position intended for Aib. In one embodiment, the incorporation ratio is determined using LC-MS and calculated based on the mass spectrum as follows: Incorporation ratio= [Peak intensity]$_{Aib\text{-}containing\ polypeptide}$/([Peak intensity]$_{Aib\text{-}containing\ polypeptide}$+[Peak intensity]$_{Ala\text{-}containing\ polypeptide}$)*100%. In one embodiment, the incorporation ratio is at least 1%, at least 5%, at least 10%, at least 15%, at least 20%, at least 25%, at least 30%, at least 35%, at least 40%, at least 45%, at least 50%, at least 55%, at least 60%, at least 65%, or at least 70%.

tRNA$^{Aib}$

As used herein, "tRNA$^{Aib}$" refers to a tRNA which can be aminoacylated with Aib by AibRS, and which incorporates Aib into a resulting polypeptide during translation. The tRNA may be: (i) identical or substantially similar to a naturally occurring alanine-tRNA (tRNA$^{Ala}$), (ii) derived from a naturally occurring tRNA$^{Ala}$ a by natural or artificial mutagenesis, (iii) derived by any process that takes a sequence of a wild-type or mutant tRNA$^{Ala}$ sequence of (1) or (2) into account, e.g. library screening and/or rational design. In some embodiments, the tRNA may be derived from *Pyrococcus horikoshii*. The tRNA$^{Aib}$ may be a suppressor tRNA.

The tRNA$^{Aib}$ can exist in a charged stated (i.e. aminoacylated with an amino acid), or in an uncharged state (i.e. not aminoacylated with an amino acid). The tRNA$^{Aib}$ is cognate to the AibRS of the invention and is aminoacylated with Aib. The aminoacylatation of the tRNA by the AibRS with Aib may take place in competition with another amino acid, e.g. a natural amino acid, such as Ala, present in a host cell. In other words, the tRNA$^{Aib}$ is not limited to a tRNA molecule that is aminoacylated exclusively with Aib by the AibRS, the tRNA$^{Aib}$ may be aminoacylated with another amino acid by the AibRS. The tRNA$^{Aib}$ functions to insert an amino acid into a resulting polypeptide during translation in response to a selector codon. Preferably, that amino acid is Aib.

The term "in response to", as used herein, refers to the process in which a tRNA of the invention recognizes a selector codon and mediates the incorporation of the unnatural amino acid, which is coupled to the tRNA, into a resulting polypeptide. The tRNA$^{Aib}$ may incorporate Aib in response to a selector codon that is a stop codon, e.g. TAG.

The term "encode", as used herein, refers to any process whereby the information in a molecule or sequence string is used to direct the production of a second molecule or sequence string that is different from the first molecule or sequence string. In particular, an RNA molecule can encode a polypeptide, in which case a translation process is required to take place before the resulting polypeptide can be obtained. When used to describe the process of translation, the term "encode" may also extend to the triplet codon that encodes an amino acid or a stop codon. In particular a DNA molecule can encode a resulting polypeptide, in which case both a transcription process and a translation process are required to take place before the resulting peptide can be obtained. It is to be understood that the present invention is not limited to work in context of polynucleotides, for which only a translation process is required to generate the resulting polypeptide (e.g. RNA). The invention may also work in context of polynucleotides, for which both a transcription process and a translation process are required to generate the resulting polypeptide (e.g. DNA).

In one embodiment, the AibRS is configured to perform the function of aminoacylating a tRNA with Aib. In one embodiment, the tRNA is a suppressor tRNA. In one embodiment, the tRNA comprises one or more anticodons that encodes Aib. In one embodiment, the anticodon of the tRNA that encodes Aib is complementary to a stop codon. In one embodiment, the selector codon is a nonsense codon, e.g. a stop codon, a four-base codon, a rare codon, and a codon derived from natural, unnatural base pairs and/or the like. In one embodiment, the stop codon is an amber, an ochre, and/or an opal codon. In one embodiment, the anticodon that encodes Aib is CTA. In one embodiment, the tRNA is encoded by SEQ ID NO: 3 or a variant hereof. In one embodiment, the variant of SEQ ID NO: 3 encoding the tRNA contains a G3A mutation. In one embodiment, the variant of SEQ ID NO: 3 encoding the tRNA is at least 50%, at least 60%, at least 70% at least 75%, at least 80%, at least 85%, at least 90%, at least 95%, at least 99%, or at least 100% identical to SEQ ID NO: 3. In one embodiment, the variant of SEQ ID NO: 3 encoding the tRNA is SEQ ID NO: 4. In one embodiment, the tRNA is encoded by SEQ ID NO: 4. In one embodiment, the tRNA is derived from an archaeal bacterium. In one embodiment, the tRNA is derived from *Pyrococcus horikoshii*.

Amino Acids

The term "natural amino acid", as used herein, refers the 20 standard amino acids which are encoded by the standard genetic code in humans. Natural amino acids may also be referred to as "proteinogenic amino acids". The term "unnatural amino acid", refers to amino acids that may exist in nature (but not fall under the 20 standard amino acids which are encoded by the standard genetic code in humans), or be purely synthetic, e.g. modified amino acids and amino acids analogues. Unnatural amino acids may also be referred to as "non-proteinogenic amino acids" or "non-coded amino acids". Non-limiting examples of unnatural amino acids are Aib and D-isomers of the natural amino acids. If the term "amino acid" is used herein without indication of whether or not it is natural or unnatural, it is to be construed as if it includes both natural and unnatural amino acids. The term "any amino acid" as used herein is to be construed as if it includes both natural and unnatural amino acids.

Suppressor tRNA and Selector Codons

The term "suppressor tRNA" as used herein, refers to a tRNA that alters the reading of an mRNA in a given translation system, allowing for translational read-through of a codon (e.g. a selector codon that is a stop codon) that would otherwise result in the termination of translation or mistranslation (e.g., frame-shifting). Typically, the suppressor tRNA allows for the incorporation of an amino acid in response to a stop codon during the translation of a polypeptide (a process that is referred to as "read-through").

The term "selector codon", as used herein, refers to a codon in response to which the tRNA (e.g. suppressor tRNA) incorporates an amino acid into the resulting polypeptide. The tRNA is said to be an "anticodon" to the selector codon. The selector codon may be a nonsense codon, e.g. a stop codon, a four-base codon, a rare codon, and a codon derived from natural, unnatural base pairs and/or the like. Non-limiting examples of stop codons are amber, ochre, and opal codons.

Mutations and Mutants

The term "mutation", as used herein in context of an amino acid sequence or a polypeptide, refers to an amino acid (i) being substituted by another amino acid, (ii) being deleted, or (iii) being added. Mutations in context of an amino acid sequence may be referred to as "amino acid changes". A specific amino acid in a specific position of an amino acid sequence (or a polypeptide) may be described by reference to the sequence position in question followed by a reference to the three-letter code of the amino acid that is present in that position. A non-limiting example of this nomenclature in context of an amino acid sequence or polypeptide is: "192His and 215Gly", meaning that His is present in position 192 and Gly is present in position 215. Substitutions in an amino acid sequence (or a polypeptide) may be described by reference to the three-letter code of the amino acid that is substituted, followed by reference to the sequence position in question, followed by a reference to the amino acid that is substituted with. A non-limiting example of this nomenclature is: "Trp192His; Val215Gly", wherein Trp at position 192 has been substituted with His, and Val at position 215 has been substituted with Gly. Substitutions may be provided in relation to a specific sequence described in the sequence listing (typically in relation to a wild-type tRNA synthetase), and the position of the amino acid that is substituted is as such determined based on a numbering that can be derived from that particular sequence in the sequence listing. In the sequence listing, the first amino acid residue (counting from the N-terminus) of SEQ ID NO: 1 (Met) is assigned no. 1; the second amino acid residue of SEQ ID NO: 1 (Glu) is assigned no. 2 and so forth. The term "mutation", and as used herein in context of a nucleotide sequence or a polynucleotide, refers to a nucleotide (i) being substituted by another nucleotide, (ii) being deleted, or (iii) being added. Substitutions in nucleotide sequences or polynucleotides may be described by reference to the one-letter code of the nucleobase of the nucleotide that is substituted, followed by reference to the sequence position of the nucleotide that is substituted, followed by a reference to the nucleobase of the nucleotide that is substituted with. A non-limiting example of substitution nomenclature in context of a nucleotide sequence or a polynucleotide is: "G3A", wherein the guanine has been replaced with the adenine. Substitutions may be provided in relation to a specific sequence described in the sequence listing (typically in relation to wild-type tRNA), and the position of the nucleotide that is substituted is as such determined based on a numbering that can be derived from that particular sequence in the sequence listing. In the sequence listing, the first nucleotide residue (counting from the 5'-end) of SEQ ID NO: 2 (G) is assigned no. 1; the second amino acid residue of SEQ ID NO: 2 (G) is assigned no. 2 and so forth.

The term "mutant", as used herein in context of an amino acid sequence or a polypeptide refers to a sequence that has one or more mutations as compared to the sequence it is a mutant of.

Variant

The term "variant", as used herein, refers to a component that may have structural differences as compared to the component that it is a variant of, but it maintains a similar functionality. E.g. an AibRS and a variant hereof do not necessarily share the same amino acid sequence, but they will both aminoacylate a cognate tRNA with an unnatural amino acid. A variant of an AibRS of the invention may have one or more mutations, as compared to the AibRS, as long as the variant still functions to aminoacylate a tRNA with Aib. Mutations may include substitutions, deletions and additions. The mutations in a variant may also be referred to as "variations".

Polynucleotides and Polypeptides

The term "polynucleotide", as used herein, refers to a sequence of two or more nucleotides. The terms "polynucleotide" and "nucleotide sequence" are used interchangeably. The term "polypeptide", as used herein, refers to a sequence of two or more, natural or unnatural, amino acids. As such, the term "polypeptide" encompasses both peptides and proteins. The terms "polypeptide" and "amino acid sequence" are used interchangeably. The term "resulting polypeptide", as used herein, refers to a polypeptide that is the product of a translation process, typically involving the AibRS of the invention. The resulting polypeptide may also be referred to as a "growing polypeptide chain", especially when the resulting polypeptide is described in context of the translation process. The AibRS of the invention is particularly suitable for the preparation of the resulting polypeptide comprising SEQ ID NO: 32, which is the amino acid sequence of semaglutide [Lau J. et. al, Discovery of the once-weekly glucagon-like peptide-1 (GLP-1) analogue semaglutide, J. Med. Chem., 2015; 58:7370-7380].

In one embodiment, the AibRS is used for the preparation of a resulting polypeptide containing one or more Aib residues. In one embodiment, the AibRS is used for the preparation of a resulting polypeptide containing one or more Aib residues, wherein the resulting polypeptide containing one or more Aib residues is a GLP-1 analogue. In one embodiment, the AibRS is used for the preparation of a resulting polypeptide, wherein the resulting polypeptide comprises SEQ ID NO: 32. In one embodiment, the AibRS is used for the preparation of a resulting polypeptide, wherein the resulting polypeptide is SEQ ID NO: 32.

Derivative

The term "derivative", as used herein, in the context of a polypeptide means a chemically modified polypeptide, in which one or more substituents have been covalently attached to the polypeptide. The term "derivatisation", as used herein, refers to the process of obtaining the derivative from the polypeptide. E.g. Chem. 2 may be obtained from SEQ ID NO: 32 by derivatisation introducing a substituent (may also be referred to as "side chain") of Chem. 3.

The AibRS of the invention is particularly useful in a method of preparing semaglutide (Chem. 2) comprising the steps of (i) preparation of a resulting polypeptide comprising SEQ ID NO: 32 by using the AibRS of the invention and (ii) derivatisation of the polypeptide comprising SEQ ID NO: 32 with the substituent Chem. 3.

Chem. 2

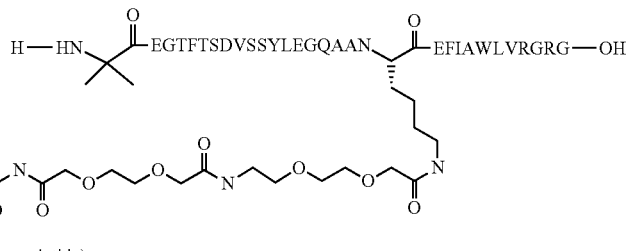

(semaglutide)

Chem. 3

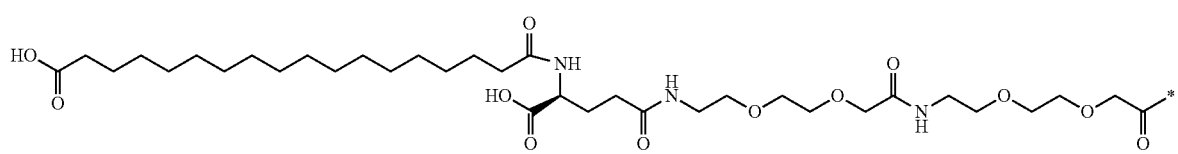

(substituent [or side chain] of semaglutide; wherein * indicates the point of attachement to the polypeptide sequence)

In one embodiment, the invention relates to a method of producing a compound comprising the steps of: (i) preparation of a resulting polypeptide containing one or more Aib residues using the AibRS of the invention, and (ii) derivatisation of the resulting polypeptide; in a preferred embodiment the compound is Chem. 2; in a preferred embodiment, the resulting polypeptide is SEQ ID NO: 32; in a preferred embodiment, and the resulting polypeptide is derivatised with Chem. 3. Derivatisation may be carried out as described in Lau J. et. al, Discovery of the once-weekly glucagon-like peptide-1 (GLP-1) analogue semaglutide, J. Med. Chem., 2015; 58:7370-7380.

Cognate

As used herein, "cognate" refers to components that function together, or have some aspect of specificity for each other, e.g. a tRNA$^{Aib}$ and an AibRS, as well as an anticodon and a stop codon. The components can also be referred to as being "complementary". In one embodiment the AibRS is cognate to a tRNA$^{Aib}$.

Orthogonal

The term "orthogonal" as used herein refers to a molecule (e.g., an AibRS and/or a tRNA$^{Aib}$) that functions with endogenous components of a host cell with reduced efficiency as compared to a corresponding molecule that is endogenous to the host cell or that fails to function with endogenous components of the cell. In the context of tRNAs and RS, orthogonal refers to an inability or reduced efficiency of an orthogonal tRNA to function with an endogenous RS compared to an endogenous tRNA to function with the endogenous RS, or of an orthogonal RS to function with an orthogonal tRNA compared to an endogenous RS to function with the endogenous tRNA. The orthogonal molecule lacks a functionally normal endogenous complementary molecule in the cell. For example, an orthogonal tRNA in a cell is aminoacylated by any endogenous RS of the cell with reduced or even zero efficiency, when compared to aminoacylation of an endogenous tRNA by the endogenous RS. In another example, an orthogonal RS aminoacylates any endogenous tRNA a cell of interest with reduced or even zero efficiency, as compared to aminoacylation of the endogenous tRNA by an endogenous RS. Orthogonality may be expressed as the efficiency of the AibRS function.

The translational components (e.g. an AibRS and/or a tRNA$^{Aib}$) of the invention may be derived from any organism (or a combination of organisms) for use in a host translation system from any other species, with the caveat that the translational components and the host system function in an orthogonal manner. In some embodiments, the translational components are derived from Archaea genes (i.e. archaebacteria) for use in a eubacterial host system. For example, the orthogonal tRNA$^{Aib}$ can be derived from an archae organism, e. g. an archaebacterium, such as *Methanococcus jannaschii, Methanobacterium thermoauto-trophicu, Halobacterium* (e.g. *Haloferax volcanii* and *Halobacterium* species NRC-I), *Archaeoglobus fulgidus, Pyrococcus furiosus, Pyrococcus horikoshii, Aeuropyrum pernix, Methanococcus maripaludis, Methanopyrus kandleri, Methanosarcina mazei, Pyrobaculum aerophilum, Pyrococcus abyssi, Sulfolobus solfataricus, Sulfolobus lokodaii, Thermoplasma acidophilum, Thermoplasma volcanium*, or the like, or a eubaclerium, such as *E. coli*, and *Thermus thermophilus*. In some embodiments, the translational components are derived from eukaryotic sources, e.g., plants, algae, protists, fungi, yeasts, animals (e.g., mammals, insects, arthropods, etc.), or the like.

Host Cell

The term "host cell", as used herein refers to a cell in which the AibRS of the invention may carry out its function. The host cell may be prokaryotic, e.g. bacteria and archaea, or eukaryotic, e.g. yeast, algae, filamentous fungus, a mammalian cell, a plant cell, and an insect cell. A microbial host cell may also be referred to as a "microorganism". Non-limiting examples of eubacteria include *E. coli, Thermus thermophilus, Bacillus subtilis, Bacillus stearothermophilus, Corynebacterium glutamicum*. Non-limiting examples of archaea include *Methanococcus jannaschii, Methanosarcina mazei, Methanobacterium thermoautotrophicum, Methanococcus maripaludis, Methanopyrus kandleri, Halobacterium* (e.g. *Haloferax volcanii* and *Halobacterium* species NRC-I), *Archaeoglobus fulgidus, Pyrococcus furiosus, Pyrococcus horikoshii, Pyrobaculum aerophilum, Pyrococcus abyssi, Sulfolobus solfataricus, Sulfolobus tokodaii, Aeuropyrum pernix, Thermoplasma acidophilum* and *Thermoplasma volcanium*. Non-limiting examples of yeast and filamentous fungi include *Saccharomyces cerevisiae, Pichia pastoris, Pichia pfaffi, Hansenula polymorpha, Aspergillus niger* and *Trichoderma resei*. Non-limiting examples of mammalian cells include CHO, CHO-K1, CHO-DXB11, CHO-DG44, CHO-S, HEK293 or derivatives of any of these cells.

Host cells are typically genetically engineered (e.g., transformed, transduced or transfected) with the polynucleotide encoding the AibRS of the invention, e.g. using one or more vectors. The coding regions for the AibRS of the invention, and the polypeptide to be translated may be operably linked to gene expression control elements that are functional in the desired host cell. Vectors may contain transcription and translation terminators, transcription and translation initiation sequences, as well as promoters useful for regulation of the expression of the particular target nucleic acid. The vectors may comprise generic expression cassettes containing at least one independent terminator sequence, sequences permitting replication of the cassette in eukaryotes, or prokaryotes, or both (e.g., shuttle vectors) and selection markers for both prokaryotic and eukaryotic systems. Non-limiting examples of vectors are a plasmid, a bacterium, a virus, a naked polynucleotide, or a conjugated polynucleotide. In one embodiment, the host cell is *E. coli*.

Consensus Sequence

The term "consensus sequence", as used herein, refers to the calculated order of most frequent amino acid residues found at each position in a sequence alignment. It represents the results of multiple sequence alignments in which related sequences (e.g. Archaeal AlaRS sequences) are compared to each other and similar sequence motifs are calculated. Thus, a consensus sequence is a model for the putative amino acid positions essential for functionality (e.g. by being involved in folding and/or amino acid binding) of the bioactive polypeptide. In general, there is a high degree of freedom for amino acids sequence positions not identified as a putative site of activity since the amino acids of these positions are often solvent-exposed in loops, and therefore a high degree of variation can be introduced in these positions while maintaining the function exercised by the bioactive polypeptide. In one embodiment, the Aib is defined as a variant of a consensus sequence. In one embodiment the Aib is defined as a variant of Formula I. In one embodiment the Aib is defined as a variant of Formula II. In one embodiment the Aib is defined as a variant of Formula III.

Sequence Identity

Sequence identity is the extent to which two (nucleotide or amino acid) sequences have the same residues at the same positions in an alignment. The sequence identity is conveniently expressed as a percentage, i.e. if 85 amino acids out of 100 aligned positions between the two sequences are identical the degree of identity is 85%. If one of the two sequences is a consensus sequence, then only the conserved positions of the consensus sequence is considered for the calculation. I.e. if 85 amino acids out of 100 aligned and conserved positions are identical, then the degree of identity is 85% even though the sequences may be longer than 100 amino acids. For purposes of the present invention, the sequence identity between two amino acid sequences is determined by using simple handwriting and eyeballing; and/or a standard protein or peptide alignment program, such as "align" which is based on a Needleman-Wunsch algorithm. This algorithm is described in Needleman, S. B. and Wunsch, C. D., (1970), Journal of Molecular Biology, 48: 443-453, and the align program by Myers and W. Miller in "Optimal Alignments in Linear Space" CABIOS (computer applications in the biosciences) (1988) 4:11-17. For the alignment, the default scoring matrix BLOSUM62 and the default identity matrix may be used, and the penalty for the first residue in a gap may be set at –12, or preferably at –10, and the penalties for additional residues in a gap at –2, or preferably at –0.5.

PARTICULAR EMBODIMENTS

It is to be understood that the terminology used herein is for the purpose of describing particular embodiments, and thus it is not intended to be limiting.
1. A 2-Aminoisobutyric acid-tRNA synthetase (AibRS) comprising an amino acid sequence of SEQ ID NO: 7 or a variant hereof, wherein the variant comprises 215Gly.
2. The AibRS according to any preceding embodiment; wherein the variant of SEQ ID NO: 7 is a variant of Formula I; wherein Formula I is:

Xaa-Xaa-Xaa-Xaa-Xaa-Xaa-Xaa-Xaa-Xaa-Phe-Xaa-Glu-

Xaa-Gly-Xaa-Xaa-Xaa-Lys-Xaa-Cys-Xaa-Xaa-Cys-Gly-

Xaa-Xaa-Phe-Trp-Thr-Xaa-Xaa-Xaa-Xaa-Arg-Xaa-Xaa-

Cys-Gly-Asp-Xaa-Pro-Cys-Xaa-Xaa-Tyr-Xaa-Phe-Ile-

Gly-Xaa-Pro-Xaa-Xaa-Xaa-Xaa-Xaa-Xaa-Leu-Xaa-

Glu-Xaa-Arg-Xaa-Xaa-Phe-Xaa-Xaa-Phe-Phe-Glu-Xaa-

Xaa-Xaa-His-Xaa-Xaa-Xaa-Xaa-Arg-Tyr-Pro-Val-Xaa-

Xaa-Arg-Trp-Arg-Asp-Asp-Val-Xaa-Leu-Val-Gly-Ala-

Ser-Ile-Xaa-Asp-Phe-Gln-Pro-Trp-Val-Xaa-Xaa-Gly-

Xaa-Xaa-Xaa-Pro-Pro-Ala-Asn-Pro-Leu-Xaa-Ile-Ser-

Gln-Pro-Xaa-Ile-Arg-Xaa-Xaa-Asp-Xaa-Asp-Xaa-Val-

Gly-Xaa-Xaa-Gly-Arg-His-Xaa-Thr-Xaa-Phe-Glu-Met-

Met-Ala-His-His-Ala-Phe-Asn-Xaa-Xaa-Xaa-Xaa-Xaa-

Xaa-Tyr-Trp-Xaa-Xaa-Glu-Thr-Val-Xaa-Xaa-Xaa-Xaa-

Xaa-Phe-Xaa-Xaa-Xaa-Xaa-Xaa-Xaa-Xaa-Xaa-Xaa-

Xaa-Ile-Thr-Phe-Xaa-Glu-Xaa-Xaa-Trp-Xaa-Gly-Gly-

Gly-Asn-Ala-Gly-Xaa-Xaa-Xaa-Glu-Val-Xaa-Xaa-Xaa-

Gly-Xaa-Glu-Xaa-Ala-Thr-Leu-Val-Phe-Met-Xaa-Tyr-

Xaa-Xaa-Xaa-Xaa-Xaa-Xaa-Xaa-Xaa-Xaa-Xaa-Xaa-

Xaa-Xaa-Xaa-Xaa-Xaa-Xaa-Xaa-Xaa-Xaa-Pro-Xaa-Xaa-

Xaa-Xaa-Xaa-Val-Asp-Thr-Gly-Tyr-Gly-Leu-Glu-Arg-

Xaa-Xaa-Trp-Xaa-Ser-Xaa-Gly-Xaa-Pro-Thr-Xaa-Tyr-

Asp-Ala-Xaa-Xaa-Xaa-Xaa-Xaa-Xaa-Xaa-Leu-Xaa-

Xaa-Xaa-Ala-Gly-Xaa-Xaa-Xaa-Xaa-Xaa-Xaa-Xaa-

Ile-Leu-Xaa-Xaa-Xaa-Xaa-Xaa-Ala-Gly-Xaa-Xaa-

Asp-Xaa-Xaa-Xaa-Xaa-Xaa-Leu-Xaa-Xaa-Leu-Arg-

Xaa-Xaa-Val-Ala-Xaa-Xaa-Xaa-Xaa-Xaa-Xaa-Xaa-

Glu-Leu-Xaa-Xaa-Xaa-Xaa-Xaa-Pro-Xaa-Glu-Xaa-Xaa-

Tyr-Ala-Ile-Ala-Asp-His-Thr-Xaa-Xaa-Leu-Xaa-Phe-

Met-Leu-Xaa-Asp-Gly-Val-Xaa-Pro-Ser-Asn-Xaa-Xaa-

Ala-Gly-Tyr-Leu-Ala-Arg-Leu-Xaa-Ile-Arg-Xaa-Xaa-

Xaa-Arg-Xaa-Xaa-Xaa-Xaa-Leu-Gly-Xaa-Xaa-Xaa-Pro-

Leu-Xaa-Xaa-Ile-Xaa-Xaa-Xaa-Xaa-Xaa-Xaa-Xaa-

Xaa-Xaa-Xaa-Xaa-Pro-Glu-Xaa-Xaa-Glu-Xaa-Xaa-Xaa-

Xaa-Xaa-Xaa-Xaa-Xaa-Xaa-Xaa-Glu-Glu-Xaa-Xaa-

Xaa-Xaa-Xaa-Thr-Xaa-Xaa-Arg-Gly-Xaa-Xaa-Xaa-Xaa-

Xaa-Xaa-Xaa-Xaa-Xaa-Xaa-Lys-Xaa-Xaa-Gly-Xaa-

Xaa-Xaa-Xaa-Pro-Xaa-Xaa-Leu-Xaa-Xaa-Xaa-Tyr-

Xaa-Ser-His-Gly-Xaa-Xaa-Pro-Glu-Xaa-Xaa-Xaa-Glu-

Xaa-Ala-Xaa-Xaa-Xaa-Xaa-Xaa-Val-Xaa-Xaa-Pro-

Asp-Asn-Phe-Tyr-Xaa-Xaa-Val-Ala-Xaa-Xaa-Xaa-Xaa-

Xaa-Xaa wherein each Xaa in Formula I is independently selected and is one or more amino acids, or absent;
wherein the variant of Formula I is at least 90% identical to SEQ ID NO: 7 in positions not designated Xaa.
3. The AibRS according to any preceding embodiment; wherein the variant of SEQ ID NO: 7 is a variant of Formula I; wherein Formula I corresponds to a consensus sequence of the following formula:

Xaa-Xaa-Xaa-Xaa-Xaa-Xaa-Xaa-Xaa-Xaa-Phe-Xaa-Glu-

Xaa-Gly-Xaa-Xaa-Xaa-Lys-Xaa-Cys-Xaa-Xaa-Cys-Gly-

Xaa-Xaa-Phe-Trp-Thr-Xaa-Xaa-Xaa-Xaa-Arg-Xaa-Xaa-

Cys-Gly-Asp-Xaa-Pro-Cys-Xaa-Xaa-Tyr-Xaa-Phe-Ile-

Gly-Xaa-Pro-Xaa-Xaa-Xaa-Xaa-Xaa-Xaa-Leu-Xaa-

Glu-Xaa-Arg-Xaa-Xaa-Phe-Xaa-Xaa-Phe-Phe-Glu-Xaa-

Xaa-Xaa-His-Xaa-Xaa-Xaa-Xaa-Arg-Tyr-Pro-Val-Xaa-

Xaa-Arg-Trp-Arg-Asp-Asp-Val-Xaa-Leu-Val-Gly-Ala-

Ser-Ile-Xaa-Asp-Phe-Gln-Pro-Trp-Val-Xaa-Xaa-Gly-

Xaa-Xaa-Xaa-Pro-Pro-Ala-Asn-Pro-Leu-Xaa-Ile-Ser-

Gln-Pro-Xaa-Ile-Arg-Xaa-Xaa-Asp-Xaa-Asp-Xaa-Val-

-continued

```
Gly-Xaa-Xaa-Gly-Arg-His-Xaa-Thr-Xaa-Phe-Glu-Met-

Met-Ala-His-His-Ala-Phe-Asn-Xaa-Xaa-Xaa-Xaa-Xaa-

Xaa-Tyr-Trp-Xaa-Xaa-Glu-Thr-Val-Xaa-Xaa-Xaa-Xaa-

Xaa-Phe-Xaa-Xaa-Xaa-Xaa-Xaa-Xaa-Xaa-Xaa-Xaa-Xaa-

Xaa-Ile-Thr-Phe-Xaa-Glu-Xaa-Xaa-Trp-Xaa-Gly-Gly-

Gly-Asn-Ala-Gly-Xaa-Xaa-Xaa-Glu-Val-Xaa-Xaa-Xaa-

Gly-Xaa-Glu-Xaa-Ala-Thr-Leu-Val-Phe-Met-Xaa-Tyr-

Xaa-Xaa-Xaa-Xaa-Xaa-Xaa-Xaa-Xaa-Xaa-Xaa-Xaa-Xaa-

Xaa-Xaa-Xaa-Xaa-Xaa-Xaa-Xaa-Xaa-Pro-Xaa-Xaa-

Xaa-Xaa-Xaa-Val-Asp-Thr-Gly-Tyr-Gly-Leu-Glu-Arg-

Xaa-Xaa-Trp-Xaa-Ser-Xaa-Gly-Xaa-Pro-Thr-Xaa-Tyr-

Asp-Ala-Xaa-Xaa-Xaa-Xaa-Xaa-Xaa-Xaa-Leu-Xaa-

Xaa-Xaa-Ala-Gly-Xaa-Xaa-Xaa-Xaa-Xaa-Xaa-Xaa-Xaa-

Ile-Leu-Xaa-Xaa-Xaa-Xaa-Xaa-Xaa-Ala-Gly-Xaa-Xaa-

Asp-Xaa-Xaa-Xaa-Xaa-Xaa-Leu-Xaa-Xaa-Leu-Arg-

Xaa-Xaa-Val-Ala-Xaa-Xaa-Xaa-Xaa-Xaa-Xaa-Xaa-Xaa-

Glu-Leu-Xaa-Xaa-Xaa-Xaa-Xaa-Pro-Xaa-Glu-Xaa-Xaa-

Tyr-Ala-Ile-Ala-Asp-His-Thr-Xaa-Xaa-Leu-Xaa-Phe-

Met-Leu-Xaa-Asp-Gly-Val-Xaa-Pro-Ser-Asn-Xaa-Xaa-

Ala-Gly-Tyr-Leu-Ala-Arg-Leu-Xaa-Ile-Arg-Xaa-Xaa-

Xaa-Arg-Xaa-Xaa-Xaa-Xaa-Leu-Gly-Xaa-Xaa-Xaa-Pro-

Leu-Xaa-Xaa-Ile-Xaa-Xaa-Xaa-Xaa-Xaa-Xaa-Xaa-Xaa-

Xaa-Xaa-Xaa-Xaa-Pro-Glu-Xaa-Xaa-Glu-Xaa-Xaa-Xaa-

Xaa-Xaa-Xaa-Xaa-Xaa-Xaa-Xaa-Glu-Glu-Xaa-Xaa-

Xaa-Xaa-Xaa-Thr-Xaa-Xaa-Arg-Gly-Xaa-Xaa-Xaa-Xaa-

Xaa-Xaa-Xaa-Xaa-Xaa-Xaa-Lys-Xaa-Xaa-Gly-Xaa-

Xaa-Xaa-Xaa-Pro-Xaa-Xaa-Xaa-Leu-Xaa-Xaa-Xaa-Tyr-

Xaa-Ser-His-Gly-Xaa-Xaa-Pro-Glu-Xaa-Xaa-Xaa-Glu-

Xaa-Ala-Xaa-Xaa-Xaa-Xaa-Xaa-Val-Xaa-Xaa-Pro-

Asp-Asn-Phe-Tyr-Xaa-Xaa-Val-Ala-Xaa-Xaa-Xaa-Xaa-

Xaa-Xaa
``` wherein each Xaa of Formula I is independently selected and is one or more amino acids, or absent;
wherein the variant of Formula I is at least 90% identical to SEQ ID NO: 7 in positions not designated Xaa.

4. The AibRS according to any preceding embodiment; wherein the variant of Formula I is at least 50%, at least 60%, at least 70%, at least 75%, at least 80%, at least 85%, at least 90%, at least 95%, at least 99%, or at least 100% identical to Formula I in sequence positions that are not designated Xaa.

5. The AibRS according to any preceding embodiment, wherein Xaa is one or more amino acids of any kind, or absent.

6. The AibRS according to any preceding embodiment, wherein the Xaa of Formula I is any amino acid or absent.

7. The AibRS according to any preceding embodiment; wherein the Xaa of Formula I is any amino acid.

8. The AibRS according to any preceding embodiment, wherein the variant of SEQ ID NO: 7 is at least 41% identical to SEQ ID NO: 7.

9. The AibRS according to any preceding embodiment, wherein the variant of SEQ ID NO: 7 is at least 55% identical to SEQ ID NO: 7.

10. The AibRS according to any preceding embodiment, wherein the variant of SEQ ID NO: 7 is at least 90% identical to SEQ ID NO: 7.

11. The AibRS according to any preceding embodiment, wherein the variant of SEQ ID NO: 7 is at least 50%, preferably at least 60%, more preferably at least 70%, more preferably at least 75%, more preferably at least 80%, more preferably at least 85%, more preferably at least 90%, more preferably at least 95%, and most preferably at least 99% identical to SEQ ID NO: 7.

12. The AibRS according to any preceding embodiment; wherein the variant of SEQ ID NO: 7 is characterised in:
position 192 is Trp, His, Val, Ile, or Leu
position 193 is Ala, Leu, Ile, or Gly
position 213 is Thr, Ser, Cys, or Ala
position 216 is Phe or Trp
position 217 is Met, Ile, or Leu
position 249 is Thr, Ser, Val, or Phe
position 360 is Asn or Ala,
position 459 is Glu or Ala.

13. The AibRS according to any preceding embodiment; wherein the variant of SEQ ID NO: 7 is characterised in:
position 192 is His, Val, Ile, or Leu
position 193 is Ala, Leu, Ile, or Gly
position 213 is Thr, Ser, Cys, or Ala
position 216 is Phe or Trp
position 217 is Met, Ile, or Leu
position 249 is Thr, Ser, Val, or Phe
position 360 is Ala,
position 459 is Ala.

14. The AibRS according to any preceding embodiment; wherein the variant of SEQ ID NO: 7 comprises: [192His; 215Gly]; [192His; 215Gly; 360Ala; 459Ala], [192His; 215Gly; 217Ile; 360Ala; 459Ala], [192His; 215Gly; 217Leu; 360Ala; 459Ala], [192His; 215Gly; 193Leu; 360Ala; 459Ala], [192His; 215Gly; 216Trp; 360Ala; 459Ala], [192His; 215Gly; 193Leu; 216Trp; 360Ala; 459Ala], [192His; 215Gly; 193Ile; 360Ala; 459Ala], [192His; 215Gly; 193Ile; 217Ile; 360Ala; 459Ala], [192His; 215Gly; 193Leu; 217Ile; 360Ala; 459Ala], [192His; 215Gly; 193Ile; 217Leu; 360Ala. 459Ala], [192His; 215Gly; 193Leu; 217Leu; 360Ala; 459Ala], [192Val; 215Gly; 217Ile; 360Ala; 459Ala], [192Ile; 215Gly; 217Ile; 360Ala; 459Ala], [192Leu; 215Gly; 217Ile; 360Ala; 459Ala], [192His; 193Gly; 215Gly; 217Ile; 360Ala; 459Ala], [192His; 213Ser; 215Gly; 360Ala; 459Ala], [192His; 215Gly; 249Ser; 360Ala; 459Ala], [192His; 215Gly; 249Val; 360Ala; 459Ala], [192His; 213Cys; 215Gly; 249Val; 360Ala; 459Ala], or [192His; 213Ala; 215Gly; 249Phe; 360Ala; 459Ala].

15. The AibRS according to any preceding embodiment; wherein the variant of SEQ ID NO: 7 comprises: [192His; 215Gly; 360Ala; 459Ala], [192His; 215Gly; 217Ile; 360Ala; 459Ala], [192His; 215Gly; 217Leu; 360Ala; 459Ala], [192His; 215Gly; 193Leu; 360Ala; 459Ala], [192His; 215Gly; 216Trp; 360Ala; 459Ala], [192His; 215Gly; 193Leu; 216Trp; 360Ala; 459Ala], [192His; 215Gly; 193Ile; 360Ala; 459Ala], [192His; 215Gly; 193Ile; 217Ile; 360Ala; 459Ala], [192His; 215Gly;

193Leu; 217Ile; 360Ala; 459Ala], [192His; 215Gly; 193Ile; 217Leu; 360Ala. 459Ala], [192His; 215Gly; 193Leu; 217Leu; 360Ala; 459Ala], [192Val; 215Gly; 217Ile; 360Ala; 459Ala], [192Ile; 215Gly; 217Ile; 360Ala; 459Ala], [192Leu; 215Gly; 217Ile; 360Ala; 459Ala], [192His; 193Gly; 215Gly; 217Ile; 360Ala; 459Ala], [192His; 213Ser; 215Gly; 360Ala; 459Ala], [192His; 215Gly; 249Ser; 360Ala; 459Ala], [192His; 215Gly; 249Val; 360Ala; 459Ala], [192His; 213Cys; 215Gly; 249Val; 360Ala; 459Ala], or [192His; 213Ala; 215Gly; 249Phe; 360Ala; 459Ala].

16. The AibRS according to any preceding embodiment; wherein the variant of SEQ ID NO: 7 is selected from a list consisting of SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30.

17. The AibRS according to any preceding embodiment; wherein the variant of SEQ ID NO: 7 is selected from a list consisting of SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30.

18. The AibRS according to any preceding embodiment; wherein the AibRS is derived from an archaeal bacterium.

19. The AibRS according to any preceding embodiment; wherein the AibRS is derived from *Pyrococcus horikoshii*.

20. The AibRS according to any preceding embodiment; wherein the AibRS is configured to perform the function of aminoacylating a tRNA with Aib.

21. The AibRS according to any preceding claim; wherein the AibRS is capable of aminoacylating a tRNA with Aib.

22. The AibRS according to any preceding embodiment; wherein the tRNA is a suppressor tRNA.

23. The AibRS according to any preceding embodiment; wherein the tRNA comprises one or more anticodons that encodes Aib.

24. The AibRS according to any preceding embodiment; wherein the anticodon of the tRNA that encodes Aib is complementary to a stop codon.

25. The AibRS according to any preceding embodiment; wherein the anticodon that encodes Aib is CTA.

26. The AibRS according to any preceding embodiment; wherein the tRNA is encoded by SEQ ID NO: 3 or a variant hereof.

27. The AibRS according to any preceding embodiment; wherein the variant of SEQ ID NO: 3 encoding the tRNA contains a G3A mutation.

28. The AibRS according to any preceding embodiment; wherein the variant of SEQ ID NO: 3 encoding the tRNA is at least 50%, at least 60%, at least 70% at least 75%, at least 80%, at least 85%, at least 90%, at least 95%, at least 99%, or at least 100% identical to SEQ ID NO: 3.

29. The AibRS according to any preceding embodiment; wherein the variant of SEQ ID NO: 3 encoding the tRNA is SEQ ID NO: 4.

30. The AibRS according to any preceding embodiment; wherein the tRNA is encoded by SEQ ID NO: 4.

31. The AibRS according to any preceding embodiment; wherein the tRNA is derived from an archaeal bacterium.

32. The AibRS according to any preceding embodiment; wherein the tRNA is derived from *Pyrococcus horikoshii*.

33. The AibRS according to any preceding embodiment; wherein the AibRS is configured to perform the function of aminoacylating a tRNA with Aib in a host cell.

34. The AibRS according to any preceding embodiment; wherein the AibRS is configured to perform the function of aminoacylating a tRNA with Aib in *E. coli*.

35. The AibRS according to any preceding embodiment; wherein the efficiency of the function is determined by analysing the expression product, i.e. the resulting polypeptide upon translation of the tRNA.

36. The AibRS according to any preceding embodiment; wherein the efficiency is expressed as the incorporation ratio between the resulting polypeptide containing Aib and the amount of resulting polypeptide containing Ala or Aib in the position intended for Aib.

37. The AibRS according to any preceding embodiment; wherein the incorporation ratio is determined using LC-MS and calculated based on the mass spectrum as follows: Incorporation ratio=[Peak intensity]$_{Aib\text{-}containing\ polypeptide}$/([Peak intensity]$_{Aib\text{-}containing\ polypeptide}$+[Peak intensity]$_{Ala\text{-}containing\ polypeptide}$)*100%.

38. The AibRS according to any preceding embodiment; wherein the incorporation ratio is at least 1%, at least 5%, at least 10%, at least 15%, at least 20%, at least 25%, at least 30%, at least 35%, at least 40%, at least 45%, at least 50%, at least 55%, at least 60%, at least 65%, or at least 70%.

39. The use of an AibRS according to any preceding embodiment for the preparation of a resulting polypeptide containing one or more Aib residues.

40. The use of an AibRS, according to any preceding embodiment, wherein the resulting polypeptide containing one or more Aib residues is a GLP-1 analogue.

41. The use of an AibRS according to any preceding embodiment, wherein the resulting polypeptide containing one or more Aib residues comprises SEQ ID NO: 32.

42. A method of producing a compound comprising the steps of:
   i. preparation of a resulting polypeptide containing one or more Aib residues using the AibRS of any preceding embodiment,
   ii. derivatisation of the resulting polypeptide 43. A method according to any of the preceding embodiments; wherein the compound is Chem 2

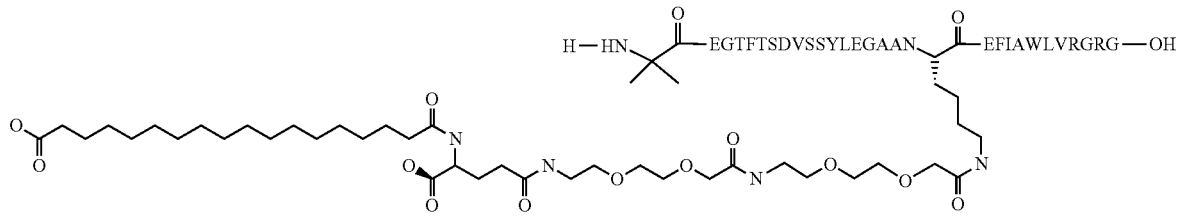

FURTHER PARTICULAR EMBODIMENTS

It is to be understood that the terminology used herein is for the purpose of describing particular embodiments, and thus it is not intended to be limiting.

1. A 2-Aminoisobutyric acid-tRNA synthetase (AibRS) comprising an amino acid sequence of SEQ ID NO: 7 or a variant hereof, wherein the variant comprises 215Gly.
2. An AibRS comprising an amino acid sequence of SEQ ID NO: 7, or a variant hereof, wherein the variant is at least 41%, at least 50%, at least 55%, at least 60%, at least 70%, at least 80%, at least 90%, at least 95%, at least 99%, or at least 100% identical to SEQ ID NO: 7.
3. An AibRS comprising an amino acid sequence of SEQ ID NO: 10, or a variant hereof, wherein the variant is at least 41%, at least 50%, at least 55%, at least 60% at least 70%, at least 80%, at least 90%, at least 95%, at least 99%, or at least 100% identical to SEQ ID NO: 10.
4. An AibRS comprising an amino acid sequence of SEQ ID NO: 11, or a variant hereof, wherein the variant is at least 41%, at least 50%, at least 55%, at least 60% at least 70%, at least 80%, at least 90%, at least 95%, at least 99%, or at least 100% identical to SEQ ID NO: 11.
5. An AibRS comprising an amino acid sequence of SEQ ID NO: 12, or a variant hereof, wherein the variant is at least 41%, at least 50%, at least 55%, at least 60% at least 70%, at least 80%, at least 90%, at least 95%, at least 99%, or at least 100% identical to SEQ ID NO: 12.
6. An AibRS comprising an amino acid sequence of SEQ ID NO: 13, or a variant hereof, wherein the variant is at least 41%, at least 50%, at least 55%, at least 60% at least 70%, at least 80%, at least 90%, at least 95%, at least 99%, or at least 100% identical to SEQ ID NO: 13.
7. An AibRS comprising an amino acid sequence of SEQ ID NO: 14, or a variant hereof, wherein the variant is at least 41%, at least 50%, at least 55%, at least 60% at least 70%, at least 80%, at least 90%, at least 95%, at least 99%, or at least 100% identical to SEQ ID NO: 14.
8. An AibRS comprising an amino acid sequence of SEQ ID NO: 15, or a variant hereof, wherein the variant is at least 41%, at least 50%, at least 55%, at least 60% at least 70%, at least 80%, at least 90%, at least 95%, at least 99%, or at least 100% identical to SEQ ID NO: 15.
9. An AibRS comprising an amino acid sequence of SEQ ID NO: 16, or a variant hereof, wherein the variant is at least 41%, at least 50%, at least 55%, at least 60% at least 70%, at least 80%, at least 90%, at least 95%, at least 99%, or at least 100% identical to SEQ ID NO: 16.
10. An AibRS comprising an amino acid sequence of SEQ ID NO: 17, or a variant hereof, wherein the variant is at least 41%, at least 50%, at least 55%, at least 60% at least 70%, at least 80%, at least 90%, at least 95%, at least 99%, or at least 100% identical to SEQ ID NO: 17.
11. An AibRS comprising an amino acid sequence of SEQ ID NO: 18, or a variant hereof, wherein the variant is at least 41%, at least 50%, at least 55%, at least 60% at least 70%, at least 80%, at least 90%, at least 95%, at least 99%, or at least 100% identical to SEQ ID NO: 18.
12. An AibRS comprising an amino acid sequence of SEQ ID NO: 19, or a variant hereof, wherein the variant is at least 41%, at least 50%, at least 55%, at least 60% at least 70%, at least 80%, at least 90%, at least 95%, at least 99%, or at least 100% identical to SEQ ID NO: 19.
13. An AibRS comprising an amino acid sequence of SEQ ID NO: 20, or a variant hereof, wherein the variant is at least 41%, at least 50%, at least 55%, at least 60% at least 70%, at least 80%, at least 90%, at least 95%, at least 99%, or at least 100% identical to SEQ ID NO: 20.
14. An AibRS comprising an amino acid sequence of SEQ ID NO: 21, or a variant hereof, wherein the variant is at least 41%, at least 50%, at least 55%, at least 60% at least 70%, at least 80%, at least 90%, at least 95%, at least 99%, or at least 100% identical to SEQ ID NO: 21.
15. An AibRS comprising an amino acid sequence of SEQ ID NO: 22, or a variant hereof, wherein the variant is at least 41%, at least 50%, at least 55%, at least 60% at least 70%, at least 80%, at least 90%, at least 95%, at least 99%, or at least 100% identical to SEQ ID NO: 22.
16. An AibRS comprising an amino acid sequence of SEQ ID NO: 23, or a variant hereof, wherein the variant is at least 41%, at least 50%, at least 55%, at least 60% at least 70%, at least 80%, at least 90%, at least 95%, at least 99%, or at least 100% identical to SEQ ID NO: 23.
17. An AibRS comprising an amino acid sequence of SEQ ID NO: 24, or a variant hereof, wherein the variant is at least 41%, at least 50%, at least 55%, at least 60% at least 70%, at least 80%, at least 90%, at least 95%, at least 99%, or at least 100% identical to SEQ ID NO: 24.
18. An AibRS comprising an amino acid sequence of SEQ ID NO: 25, or a variant hereof, wherein the variant is at least 41%, at least 50%, at least 55%, at least 60% at least 70%, at least 80%, at least 90%, at least 95%, at least 99%, or at least 100% identical to SEQ ID NO: 25.
19. An AibRS comprising an amino acid sequence of SEQ ID NO: 26, or a variant hereof, wherein the variant is at least 41%, at least 50%, at least 55%, at least 60% at least 70%, at least 80%, at least 90%, at least 95%, at least 99%, or at least 100% identical to SEQ ID NO: 26.
20. An AibRS comprising an amino acid sequence of SEQ ID NO: 27, or a variant hereof, wherein the variant is at least 41%, at least 50%, at least 55%, at least 60% at least 70%, at least 80%, at least 90%, at least 95%, at least 99%, or at least 100% identical to SEQ ID NO: 27.
21. An AibRS comprising an amino acid sequence of SEQ ID NO: 28, or a variant hereof, wherein the of variant is at least 41%, at least 50%, at least 55%, at least 60% at least 70%, at least 80%, at least 90%, at least 95%, at least 99%, or at least 100% identical to SEQ ID NO: 28.

22. An AibRS comprising an amino acid sequence of SEQ ID NO: 29, or a variant hereof, wherein the variant is at least 41%, at least 50%, at least 55%, at least 60% at least 70%, at least 80%, at least 90%, at least 95%, at least 99%, or at least 100% identical to SEQ ID NO: 29.

23. An AibRS comprising an amino acid sequence of SEQ ID NO: 30, or a variant hereof, wherein the variant is at least 41%, at least 50%, at least 55%, at least 60% at least 70%, at least 80%, at least 90%, at least 95%, at least 99%, or at least 100% identical to SEQ ID NO: 30.

24. The AibRS according to any of the embodiments 4-23, wherein the variant comprises 215Gly.

25. The AibRS according to any preceding embodiment; wherein the variant is of Formula I or a variant hereof:

```
Formula I:
Xaa-Xaa-Xaa-Xaa-Xaa-Xaa-Xaa-Xaa-Xaa-Phe-Xaa-Glu-

Xaa-Gly-Xaa-Xaa-Xaa-Lys-Xaa-Cys-Xaa-Xaa-Cys-Gly-

Xaa-Xaa-Phe-Trp-Thr-Xaa-Xaa-Xaa-Xaa-Arg-Xaa-Xaa-

Cys-Gly-Asp-Xaa-Pro-Cys-Xaa-Xaa-Tyr-Xaa-Phe-Ile-

Gly-Xaa-Pro-Xaa-Xaa-Xaa-Xaa-Xaa-Xaa-Leu-Xaa-

Glu-Xaa-Arg-Xaa-Xaa-Phe-Xaa-Xaa-Phe-Phe-Glu-Xaa-

Xaa-Xaa-His-Xaa-Xaa-Xaa-Xaa-Arg-Tyr-Pro-Val-Xaa-

Xaa-Arg-Trp-Arg-Asp-Asp-Val-Xaa-Leu-Val-Gly-Ala-

Ser-Ile-Xaa-Asp-Phe-Gln-Pro-Trp-Val-Xaa-Xaa-Gly-

Xaa-Xaa-Xaa-Pro-Pro-Ala-Asn-Pro-Leu-Xaa-Ile-Ser-

Gln-Pro-Xaa-Ile-Arg-Xaa-Xaa-Asp-Xaa-Asp-Xaa-Val-

Gly-Xaa-Xaa-Gly-Arg-His-Xaa-Thr-Xaa-Phe-Glu-Met-

Met-Ala-His-His-Ala-Phe-Asn-Xaa-Xaa-Xaa-Xaa-Xaa-

Xaa-Tyr-Trp-Xaa-Xaa-Glu-Thr-Val-Xaa-Xaa-Xaa-Xaa-

Xaa-Phe-Xaa-Xaa-Xaa-Xaa-Xaa-Xaa-Xaa-Xaa-Xaa-

Xaa-Ile-Thr-Phe-Xaa-Glu-Xaa-Xaa-Trp-Xaa-Gly-Gly-

Gly-Asn-Ala-Gly-Xaa-Xaa-Xaa-Glu-Val-Xaa-Xaa-Xaa-

Gly-Xaa-Glu-Xaa-Ala-Thr-Leu-Val-Phe-Met-Xaa-Tyr-

Xaa-Xaa-Xaa-Xaa-Xaa-Xaa-Xaa-Xaa-Xaa-Xaa-

Xaa-Xaa-Xaa-Xaa-Xaa-Xaa-Xaa-Xaa-Pro-Xaa-Xaa-

Xaa-Xaa-Xaa-Val-Asp-Thr-Gly-Tyr-Gly-Leu-Glu-Arg-

Xaa-Xaa-Trp-Xaa-Ser-Xaa-Gly-Xaa-Pro-Thr-Xaa-Tyr-

Asp-Ala-Xaa-Xaa-Xaa-Xaa-Xaa-Xaa-Xaa-Leu-Xaa-

Xaa-Xaa-Ala-Gly-Xaa-Xaa-Xaa-Xaa-Xaa-Xaa-Xaa-

Ile-Leu-Xaa-Xaa-Xaa-Xaa-Xaa-Xaa-Ala-Gly-Xaa-Xaa-

Asp-Xaa-Xaa-Xaa-Xaa-Xaa-Xaa-Leu-Xaa-Xaa-Leu-Arg-

Xaa-Xaa-Val-Ala-Xaa-Xaa-Xaa-Xaa-Xaa-Xaa-Xaa-

Glu-Leu-Xaa-Xaa-Xaa-Xaa-Xaa-Pro-Xaa-Glu-Xaa-Xaa-

Tyr-Ala-Ile-Ala-Asp-His-Thr-Xaa-Xaa-Leu-Xaa-Phe-

Met-Leu-Xaa-Asp-Gly-Val-Xaa-Pro-Ser-Asn-Xaa-Xaa-

Ala-Gly-Tyr-Leu-Ala-Arg-Leu-Xaa-Ile-Arg-Xaa-Xaa-

Xaa-Arg-Xaa-Xaa-Xaa-Xaa-Leu-Gly-Xaa-Xaa-Xaa-Pro-

Leu-Xaa-Xaa-Ile-Xaa-Xaa-Xaa-Xaa-Xaa-Xaa-Xaa-

Xaa-Xaa-Xaa-Xaa-Pro-Glu-Xaa-Xaa-Glu-Xaa-Xaa-Xaa-

Xaa-Xaa-Xaa-Xaa-Xaa-Xaa-Xaa-Glu-Glu-Xaa-Xaa-

Xaa-Xaa-Xaa-Thr-Xaa-Xaa-Arg-Gly-Xaa-Xaa-Xaa-Xaa-

Xaa-Xaa-Xaa-Xaa-Xaa-Xaa-Lys-Xaa-Xaa-Gly-Xaa-

Xaa-Xaa-Xaa-Pro-Xaa-Xaa-Xaa-Leu-Xaa-Xaa-Xaa-Tyr-

Xaa-Ser-His-Gly-Xaa-Xaa-Pro-Glu-Xaa-Xaa-Xaa-Glu-

Xaa-Ala-Xaa-Xaa-Xaa-Xaa-Xaa-Val-Xaa-Xaa-Pro-

Asp-Asn-Phe-Tyr-Xaa-Xaa-Val-Ala-Xaa-Xaa-Xaa-Xaa-

Xaa-Xaa,
``` wherein Xaa is one or more amino acids of any kind, or absent.

26. The AibRS according to any preceding embodiment; wherein the variant of Formula I is at least 50%, at least 60%, at least 70%, at least 75%, at least 80%, at least 85%, at least 90%, at least 95%, at least 99%, or at least 100% identical to Formula I in sequence positions that are not designated Xaa.

27. The AibRS according to any preceding embodiment; wherein the Xaa of Formula I is any amino acid or absent.

28. The AibRS according to any preceding embodiment; wherein the Xaa of Formula I is any amino acid.

29. The AibRS according to any preceding embodiment; wherein the variant is of Formula II or a variant hereof:

```
Formula II:
Xaa-Xaa-Xaa-Xaa-Xaa-Xaa-Xaa-Xaa-Xaa-Phe-Xaa-Glu-

Xaa-Gly-Xaa-Xaa-Arg-Lys-Xaa-Cys-Xaa-Xaa-Cys-Gly-

Xaa-Xaa-Phe-Trp-Thr-Xaa-Asp-Pro-Asp-Arg-Glu-Thr-

Cys-Gly-Asp-Xaa-Pro-Cys-Asp-Xaa-Tyr-Xaa-Phe-Ile-

Gly-Xaa-Pro-Xaa-Xaa-Xaa-Xaa-Tyr-Xaa-Leu-Xaa-

Glu-Xaa-Arg-Glu-Xaa-Phe-Leu-Xaa-Phe-Phe-Glu-Xaa-

Xaa-Xaa-His-Xaa-Arg-Xaa-Xaa-Arg-Tyr-Pro-Val-Xaa-

Xaa-Arg-Trp-Arg-Asp-Asp-Val-Xaa-Leu-Val-Gly-Ala-

Ser-Ile-Xaa-Asp-Phe-Gln-Pro-Trp-Val-Xaa-Ser-Gly-

Xaa-Xaa-Xaa-Pro-Pro-Ala-Asn-Pro-Leu-Xaa-Ile-Ser-

Gln-Pro-Ser-Ile-Arg-Xaa-Thr-Asp-Xaa-Asp-Asn-Val-

Gly-Xaa-Thr-Gly-Arg-His-Xaa-Thr-Xaa-Phe-Glu-Met-

Met-Ala-His-His-Ala-Phe-Asn-Xaa-Pro-Xaa-Xaa-Xaa-

Xaa-Tyr-Trp-Xaa-Asp-Glu-Thr-Val-Glu-Xaa-Xaa-Xaa-

Xaa-Phe-Xaa-Thr-Xaa-Xaa-Leu-Xaa-Xaa-Xaa-Xaa-Glu-

Xaa-Ile-Thr-Phe-Lys-Glu-Xaa-Xaa-Trp-Xaa-Gly-Gly-

Gly-Asn-Ala-Gly-Pro-Xaa-Xaa-Glu-Val-Leu-Xaa-Arg-

Gly-Leu-Glu-Val-Ala-Thr-Leu-Val-Phe-Met-Gln-Tyr-
```

-continued

```
Lys-Xaa-Xaa-Xaa-Xaa-Xaa-Xaa-Xaa-Xaa-Xaa-Xaa-
Xaa-Xaa-Xaa-Xaa-Gly-Xaa-Xaa-Xaa-Xaa-Pro-Met-Xaa-
Xaa-Xaa-Xaa-Val-Asp-Thr-Gly-Tyr-Gly-Leu-Glu-Arg-
Xaa-Val-Trp-Xaa-Ser-Xaa-Gly-Thr-Pro-Thr-Ala-Tyr-
Asp-Ala-Val-Xaa-Xaa-Val-Xaa-Xaa-Xaa-Leu-Xaa-
Xaa-Xaa-Ala-Gly-Xaa-Xaa-Xaa-Xaa-Xaa-Xaa-Xaa-
Ile-Leu-Xaa-Glu-Asn-Ser-Xaa-Leu-Ala-Gly-Xaa-Xaa-
Asp-Ile-Glu-Xaa-Xaa-Xaa-Asp-Leu-Xaa-Xaa-Leu-Arg-
Xaa-Xaa-Val-Ala-Xaa-Xaa-Xaa-Gly-Ile-Xaa-Xaa-Xaa-
Glu-Leu-Xaa-Xaa-Xaa-Xaa-Xaa-Pro-Xaa-Glu-Xaa-Ile-
Tyr-Ala-Ile-Ala-Asp-His-Thr-Xaa-Xaa-Leu-Xaa-Phe-
Met-Leu-Xaa-Asp-Gly-Val-Xaa-Pro-Ser-Asn-Val-Lys-
Ala-Gly-Tyr-Leu-Ala-Arg-Leu-Leu-Ile-Arg-Xaa-Xaa-
Xaa-Arg-Xaa-Xaa-Xaa-Xaa-Leu-Gly-Leu-Xaa-Xaa-Pro-
Leu-Xaa-Glu-Ile-Xaa-Xaa-Xaa-Xaa-Xaa-Xaa-Leu-
Xaa-Xaa-Xaa-Xaa-Pro-Glu-Xaa-Xaa-Glu-Xaa-Xaa-Xaa-
Xaa-Ile-Xaa-Xaa-Xaa-Xaa-Xaa-Glu-Glu-Xaa-Xaa-
Tyr-Xaa-Xaa-Thr-Leu-Xaa-Arg-Gly-Xaa-Xaa-Leu-Val-
Xaa-Xaa-Xaa-Xaa-Xaa-Leu-Lys-Lys-Xaa-Gly-Xaa-
Xaa-Glu-Xaa-Pro-Leu-Glu-Xaa-Leu-Xaa-Xaa-Xaa-Tyr-
Xaa-Ser-His-Gly-Xaa-Xaa-Pro-Glu-Xaa-Val-Xaa-Glu-
Xaa-Ala-Xaa-Xaa-Xaa-Gly-Xaa-Xaa-Val-Xaa-Xaa-Pro-
Asp-Asn-Phe-Tyr-Xaa-Leu-Val-Ala-Xaa-Xaa-Xaa-Glu-
Xaa-Xaa,
``` wherein Xaa is one or more amino acids of any kind, or absent.

30. The AibRS according to any preceding embodiment; wherein the variant of Formula II is at least 50%, at least 60%, at least 70%, at least 75%, at least 80%, at least 85%, at least 90%, at least 95%, at least 99%, or at least 100% identical to Formula II in sequence positions that are not designated Xaa.

31. The AibRS according to any preceding embodiment; wherein the Xaa of Formula II is any amino acid or absent.

32. The AibRS according to any preceding embodiment; wherein the Xaa of Formula II is any amino acid.

33. The AibRS according to any preceding embodiment; wherein the variant is of Formula III or a variant hereof:

```
Formula III:
Met-Xaa-Met-Asp-Met-Xaa-Thr-Arg-Met-Phe-Lys-Glu-
Glu-Gly-Trp-Ile-Arg-Lys-Xaa-Cys-Lys-Xaa-Cys-Gly-
Lys-Xaa-Phe-Trp-Thr-Leu-Asp-Pro-Asp-Arg-Glu-Thr-
Cys-Gly-Asp-Pro-Pro-Cys-Asp-Glu-Tyr-Xaa-Phe-Ile-
Gly-Lys-Pro-Gly-Ile-Pro-Lys-Lys-Tyr-Thr-Leu-Xaa-
Glu-Met-Arg-Glu-Lys-Phe-Leu-Ser-Phe-Phe-Glu-Xaa-
Xaa-Gly-His-Gly-Arg-Val-Lys-Arg-Tyr-Pro-Val-Leu-
Pro-Arg-Trp-Arg-Asp-Asp-Val-Leu-Leu-Val-Gly-Ala-
Ser-Ile-Met-Asp-Phe-Gln-Pro-Trp-Val-Ile-Ser-Gly-
Glu-Ala-Asp-Pro-Pro-Ala-Asn-Pro-Leu-Thr-Ile-Ser-
Gln-Pro-Ser-Ile-Arg-Phe-Thr-Asp-Ile-Asp-Asn-Val-
Gly-Ile-Thr-Gly-Arg-His-Phe-Thr-Ile-Phe-Glu-Met-
Met-Ala-His-His-Ala-Phe-Asn-Tyr-Pro-Gly-Lys-Pro-
Ile-Tyr-Trp-Met-Asp-Glu-Thr-Val-Glu-Leu-Ala-Phe-
Glu-Phe-Phe-Thr-Lys-Xaa-Leu-Gly-Met-Lys-Pro-Glu-
Asp-Ile-Thr-Phe-Lys-Glu-Asn-Pro-Trp-Ala-Gly-Gly-
Gly-Asn-Ala-Gly-Pro-Ala-Phe-Glu-Val-Leu-Tyr-Arg-
Gly-Leu-Glu-Val-Ala-Thr-Leu-Val-Phe-Met-Gln-Tyr-
Lys-Xaa-Ala-Pro-Xaa-Ala-Xaa-Xaa-Xaa-Gln-Val-
Val-Xaa-Ile-Lys-Gly-Asp-Xaa-Tyr-Val-Pro-Met-Xaa-
Thr-Xaa-Val-Val-Asp-Thr-Gly-Tyr-Gly-Leu-Glu-Arg-
Leu-Val-Trp-Met-Ser-Gln-Gly-Thr-Pro-Thr-Ala-Tyr-
Asp-Ala-Val-Leu-Gly-Tyr-Val-Val-Glu-Pro-Leu-Lys-
Xaa-Met-Ala-Gly-Xaa-Glu-Lys-Ile-Asp-Xaa-Xaa-Ile-
Leu-Met-Glu-Asn-Ser-Arg-Leu-Ala-Gly-Met-Phe-Asp-
Ile-Glu-Asp-Met-Gly-Asp-Leu-Arg-Xaa-Leu-Arg-Xaa-
Xaa-Val-Ala-Xaa-Arg-Val-Gly-Ile-Ser-Val-Glu-Glu-
Leu-Glu-Xaa-Xaa-Xaa-Arg-Pro-Tyr-Glu-Leu-Ile-Tyr-
Ala-Ile-Ala-Asp-His-Thr-Lys-Ala-Leu-Thr-Phe-Met-
Leu-Ala-Asp-Gly-Val-Ile-Pro-Ser-Asn-Val-Lys-Ala-
Gly-Tyr-Leu-Ala-Arg-Leu-Leu-Ile-Arg-Lys-Ser-Ile-
Arg-His-Leu-Arg-Glu-Leu-Gly-Leu-Glu-Xaa-Pro-Leu-
Ser-Glu-Ile-Val-Ala-Met-His-Ile-Lys-Glu-Leu-Xaa-
Xaa-Thr-Phe-Pro-Glu-Phe-Lys-Glu-Met-Glu-Asp-Val-
Ile-Leu-Asp-Ile-Xaa-Xaa-Val-Glu-Glu-Lys-Arg-Tyr-
Xaa-Glu-Thr-Leu-Xaa-Arg-Gly-Ser-Xaa-Leu-Val-Xaa-
Arg-Glu-Ile-Xaa-Lys-Leu-Lys-Lys-Xaa-Gly-Xaa-Xaa-
Glu-Xaa-Pro-Leu-Glu-Lys-Leu-Ile-Leu-Phe-Tyr-Glu-
Ser-His-Gly-Leu-Thr-Pro-Glu-Ile-Val-Xaa-Glu-Ile-
Ala-Glu-Lys-Glu-Gly-Xaa-Lys-Val-Xaa-Ile-Pro-Asp-
Asn-Phe-Tyr-Ser-Leu-Val-Ala-Lys-Xaa-Ala-Glu-Xaa-
Xaa,
``` wherein Xaa is one or more amino acids of any kind, or absent.

34. The AibRS according to any preceding embodiment; wherein the variant of Formula III is at least 50%, at least 60%, at least 70%, at least 75%, at least 80%, at least 85%, at least 90%, at least 95%, at least 99%, or at least 100% identical to Formula III in sequence positions that are not designated Xaa.

35. The AibRS according to any preceding embodiment; wherein the Xaa of Formula III is any amino acid or absent.

36. The AibRS according to any preceding embodiment; wherein the Xaa of Formula III is any amino acid.

37. The AibRS according to any preceding embodiment; wherein the variant comprises at least 197 amino acids selected from a list consisting of: 10Phe, 12Glu, 14Gly, 18Lys, 20Cys, 23Cys, 24Gly, 27Phe, 28Trp, 29Thr, 34Arg, 37Cys, 38Gly, 39Asp, 41Pro, 42Cys, 45Tyr, 47Phe, 48Ile, 49Gly, 51Pro, 59Leu, 61Glu, 63Arg, 66Phe, 69Phe, 70Phe, 71Glu, 75His, 80Arg, 81Tyr, 82Pro, 83Val, 86Arg, 87Trp, 88Arg, 89Asp, 90Asp, 91Val, 93Leu, 94Val, 95Gly, 96Ala, 97Ser, 98Ile, 100Asp, 101Phe, 102Gln, 103Pro, 104Trp, 105Val, 108Gly, 112Pro, 113Pro, 114Ala, 115Asn, 116Pro, 117Leu, 119Ile, 120Ser, 121Gln, 122Pro, 124Ile, 125Arg, 128Asp, 130Asp, 132Val, 133Gly, 136Gly, 137Arg, 138His, 140Thr, 142Phe, 143Glu, 144Met, 145Met, 146Ala, 147His, 148His, 149Ala, 150Phe, 151Asn, 158Tyr, 159Trp, 162Glu, 163Thr, 164Val, 170Phe, 182Ile, 183Thr, 184Phe, 186Glu, 189Trp, 191Gly, 192Gly, 193Gly, 194Asn, 195Ala, 196Gly, 200Glu, 201Val, 205Gly, 207Glu, 209Ala, 210Thr, 211Leu, 212Val, 213Phe, 214Met, 216Tyr, 238Pro, 244Val, 245Asp, 246Thr, 247Gly, 248Tyr, 249Gly, 250Leu, 251Glu, 252Arg, 255Trp, 257Ser, 259Gly, 261Pro, 262Thr, 264Tyr, 265Asp, 266Ala, 275Leu, 279Ala, 280Gly, 289Ile, 290Leu, 297Ala, 298Gly, 301Asp, 308Leu, 311Leu, 312Arg, 315Val, 316Ala, 325Glu, 326Leu, 332Pro, 334Glu, 337Tyr, 338Ala, 339Ile, 340Ala, 341Asp, 342His, 343Thr, 346Leu, 348Phe, 349Met, 350Leu, 352Asp, 353Gly, 354Val, 356Pro, 357Ser, 358Asn, 361Ala, 362Gly, 363Tyr, 364Leu, 365Ala, 366Arg, 367Leu, 369Ile, 370Arg, 374Arg, 379Leu, 380Gly, 384Pro, 385Leu, 388Ile, 401Pro, 402Glu, 405Glu, 417Glu, 418Glu, 424Thr, 427Arg, 428Gly, 440Lys, 443Gly, 448Pro, 452Leu, 456Tyr, 458Ser, 459His, 460Gly, 463Pro, 464Glu, 468Glu, 470Ala, 477Val, 480Pro, 481Asp, 482Asn, 483Phe, 484Tyr, 487Val, and 488Ala;

38. The AibRS according to any preceding embodiment; wherein the variant comprises at least 264 amino acids selected from a list consisting of: 10Phe, 12Glu, 14Gly, 17Arg, 18Lys, 20Cys, 23Cys, 24Gly, 27Phe, 28Trp, 29Thr, 31Asp, 32Pro, 33Asp, 34Arg, 35Glu, 36Thr, 37Cys, 38Gly, 39Asp, 41Pro, 42Cys, 43Asp, 45Tyr, 47Phe, 48Ile, 49Gly, 51Pro, 57Tyr, 59Leu, 61Glu, 63Arg, 64Glu, 66Phe, 67Leu, 69Phe, 70Phe, 71Glu, 75His, 77Arg, 80Arg, 81Tyr, 82Pro, 83Val, 86Arg, 87Trp, 88Arg, 89Asp, 90Asp, 91Val, 93Leu, 94Val, 95Gly, 96Ala, 97Ser, 98Ile, 100Asp, 101Phe, 102Gln, 103Pro, 104Trp, 105Val, 107Ser, 108Gly, 112Pro, 113Pro, 114Ala, 115Asn, 116Pro, 117Leu, 119Ile, 120Ser, 121Gln, 122Pro, 123Ser, 124Ile, 125Arg, 127Thr, 128Asp, 130Asp, 131Asn, 132Val, 133Gly, 135Thr, 136Gly, 137Arg, 138His, 140Thr, 142Phe, 143Glu, 144Met, 145Met, 146Ala, 147His, 148His, 149Ala, 150Phe, 151Asn, 153Pro, 158Tyr, 159Trp, 161Asp, 162Glu, 163Thr, 164Val, 165Glu, 170Phe, 172Thr, 175Leu, 180Glu, 182Ile, 183Thr, 184Phe, 185Lys, 186Glu, 189Trp, 191Gly, 192Gly, 193Gly, 194Asn, 195Ala, 196Gly, 197Pro, 200Glu, 201Val, 202Leu, 204Arg, 205Gly, 206Leu, 207Glu, 208Val, 209Ala, 210Thr, 211Leu, 212Val, 213Phe, 214Met, 215Gln, 216Tyr, 217Lys, 233Gly, 238Pro, 239Met, 244Val, 245Asp, 246Thr, 247Gly, 248Tyr, 249Gly, 250Leu, 251Glu, 252Arg, 254Val, 255Trp, 257Ser, 259Gly, 260Thr, 261Pro, 262Thr, 263Ala, 264Tyr, 265Asp, 266Ala, 267Val, 271Val, 275Leu, 279Ala, 280Gly, 289Ile, 290Leu, 292Glu, 293Asn, 294Ser, 296Leu, 297Ala, 298Gly, 301Asp, 302Ile, 303Glu, 307Asp, 308Leu, 311Leu, 312Arg, 315Val, 316Ala, 320Gly, 321Ile, 325Glu, 326Leu, 332Pro, 334Glu, 336Ile, 337Tyr, 338Ala, 339Ile, 340Ala, 341Asp, 342His, 343Thr, 346Leu, 348Phe, 349Met, 350Leu, 352Asp, 353Gly, 354Val, 356Pro, 357Ser, 358Asn, 359Val, 360Lys, 361Ala, 362Gly, 363Tyr, 364Leu, 365Ala, 366Arg, 367Leu, 368Leu, 369Ile, 370Arg, 374Arg, 379Leu, 380Gly, 381Leu, 384Pro, 385Leu, 387Glu, 388Ile, 396Leu, 401Pro, 402Glu, 405Glu, 410Ile, 417Glu, 418Glu, 421Tyr, 424Thr, 425Leu, 427Arg, 428Gly, 431Leu, 432Val, 439Leu, 440Lys, 441Lys, 443Gly, 446Glu, 448Pro, 449Leu, 450Glu, 452Leu, 456Tyr, 458Ser, 459His, 460Gly, 463Pro, 464Glu, 466Val, 468Glu, 470Ala, 474Gly, 477Val, 480Pro, 481Asp, 482Asn, 483Phe, 484Tyr, 486Leu, 487Val, 488Ala, and 492Glu.

39. The AibRS according to any preceding embodiment; wherein the variant comprises at least 434 amino acids selected from a list consisting of: 1Met, 3Met, 4Asp, 5Met, 7Thr, 8Arg, 9Met, 10Phe, 11Lys, 12Glu, 13Glu, 14Gly, 15Trp, 16Ile, 17Arg, 18Lys, 20Cys, 21Lys, 23Cys, 24Gly, 25Lys, 27Phe, 28Trp, 29Thr, 30Leu, 31Asp, 32Pro, 33Asp, 34Arg, 35Glu, 36Thr, 37Cys, 38Gly, 39Asp, 40Pro, 41Pro, 42Cys, 43Asp, 44Glu, 45Tyr, 47Phe, 48Ile, 49Gly, 50Lys, 51Pro, 52Gly, 53Ile, 54Pro, 55Lys, 56Lys, 57Tyr, 58Thr, 59Leu, 61Glu, 62Met, 63Arg, 64Glu, 65Lys, 66Phe, 67Leu, 68Ser, 69Phe, 70Phe, 71Glu, 74Gly, 75His, 76Gly, 77Arg, 78Val, 79Lys, 80Arg, 81Tyr, 82Pro, 83Val, 84Leu, 85Pro, 86Arg, 87Trp, 88Arg, 89Asp, 90Asp, 91Val, 92Leu, 93Leu, 94Val, 95Gly, 96Ala, 97Ser, 98Ile, 99Met, 100Asp, 101Phe, 102Gln, 103Pro, 104Trp, 105Val, 106Ile, 107Ser, 108Gly, 109Glu, 110Ala, 111Asp, 112Pro, 113Pro, 114Ala, 115Asn, 116Pro, 117Leu, 118Thr, 119Ile, 120Ser, 121Gln, 122Pro, 123Ser, 124Ile, 125Arg, 126Phe, 127Thr, 128Asp, 129Ile, 130Asp, 131Asn, 132Val, 133Gly, 134Ile, 135Thr, 136Gly, 137Arg, 138His, 139Phe, 140Thr, 141Ile, 142Phe, 143Glu, 144Met, 145Met, 146Ala, 147His, 148His, 149Ala, 150Phe, 151Asn, 152Tyr, 153Pro, 154Gly, 155Lys, 156Pro, 157Ile, 158Tyr, 159Trp, 160Met, 161Asp, 162Glu, 163Thr, 164Val, 165Glu, 166Leu, 167Ala, 168Phe, 169Glu, 170Phe, 171Phe, 172Thr, 173Lys, 175Leu, 176Gly, 177Met, 178Lys, 179Pro, 180Glu, 181Asp, 182Ile, 183Thr, 184Phe, 185Lys, 186Glu, 187Asn, 188Pro, 189Trp, 190Ala, 191Gly, 192Gly, 193Gly, 194Asn, 195Ala, 196Gly, 197Pro, 198Ala, 199Phe, 200Glu, 201Val, 202Leu, 203Tyr, 204Arg, 205Gly, 206Leu, 207Glu, 208Val, 209Ala, 210Thr, 211Leu, 212Val, 213Phe, 214Met, 215Gln, 216Tyr, 217Lys, 219Ala, 220Pro, 223Ala, 227Gln, 228Val, 229Val, 231Ile, 232Lys, 233Gly, 234Asp, 236Tyr, 237Val, 238Pro, 239Met, 241Thr, 243Val, 244Val, 245Asp, 246Thr, 247Gly, 248Tyr, 249Gly, 250Leu, 251Glu, 252Arg, 253Leu, 254Val, 255Trp, 256Met, 257Ser, 258Gln, 259Gly, 260Thr, 261Pro, 262Thr, 263Ala, 264Tyr, 265Asp, 266Ala, 267Val, 268Leu, 269Gly, 270Tyr, 271Val, 272Val, 273Glu, 274Pro, 275Leu, 276Lys, 278Met, 279Ala, 280Gly, 282Glu, 283Lys, 284Ile, 285Asp, 288Ile, 289Leu, 290Met, 291Glu, 292Asn, 293Ser, 294Arg, 295Leu, 296Ala, 297Gly, 298Met, 299Phe, 300Asp, 301Ile, 302Glu, 303Asp, 304Met, 305Gly, 306Asp, 307Leu, 308Arg, 310Leu, 311Arg, 314Val, 315Ala, 317Arg, 318Val, 319Gly, 320Ile, 321Ser, 322Val, 323Glu, 324Glu, 325Leu, 326Glu, 330Arg, 331Pro, 332Tyr, 333Glu, 334Leu, 335Ile, 336Tyr, 337Ala, 338Ile, 339Ala, 340Asp, 341His, 342Thr, 343Lys, 344Ala, 345Leu, 346Thr, 347Phe, 348Met, 349Leu, 350Ala, 351Asp, 352Gly, 353Val, 354Ile, 355Pro, 356Ser, 357Asn, 358Val, 359Lys, 360Ala, 361Gly, 362Tyr, 363Leu, 364Ala, 365Arg, 366Leu, 367Leu, 368Ile, 369Arg, 370Lys, 371Ser, 372Ile, 373Arg, 374His, 375Leu, 376Arg, 377Glu, 378Leu, 379Gly, 380Leu, 381Glu, 383Pro, 384Leu, 385Ser, 386Glu, 387Ile, 388Val, 389Ala, 390Met, 391His, 392Ile, 393Lys, 394Glu, 395Leu, 398Thr, 399Phe, 400Pro, 401Glu, 402Phe, 403Lys, 404Glu, 405Met, 406Glu, 407Asp, 408Val, 409Ile, 410Leu, 411Asp, 412Ile, 415Val, 416Glu, 417Glu, 418Lys, 419Arg, 420Tyr, 422Glu, 423Thr, 424Leu, 426Arg, 427Gly, 428Ser, 430Leu, 431Val, 433Arg, 434Glu, 435Ile, 437Lys, 438Leu, 439Lys, 440Lys, 442Gly, 445Glu, 447Pro, 448Leu, 449Glu, 450Lys, 451Leu, 452Ile, 453Leu, 454Phe, 455Tyr, 456Glu, 457Ser, 458His, 459Gly, 460Leu, 461Thr, 462Pro, 463Glu, 464Ile, 465Val, 467Glu, 468Ile, 469Ala, 470Glu, 471Lys, 472Glu, 473Gly, 475Lys, 476Val, 478Ile, 479Pro, 480Asp, 481Asn, 482Phe, 483Tyr, 484Ser, 485Leu, 486Val, 487Ala, 488Lys, 490Ala, and 491Glu.
40. The AibRS according to any preceding embodiment; wherein the variant is further characterised by:
position 192 is Trp, His, Val, Ile, or Leu
position 193 is Ala, Leu, Ile, or Gly
position 213 is Thr, Ser, Cys, or Ala
position 216 is Phe or Trp
position 217 is Met, Ile, or Leu
position 249 is Thr, Ser, Val, or Phe
position 360 is Asn or Ala,
position 459 is Glu or Ala
41. The AibRS according to any preceding embodiment; wherein the variant is further characterised by:
position 192 is His, Val, Ile, or Leu
position 193 is Ala, Leu, Ile, or Gly
position 213 is Thr, Ser, Cys, or Ala
position 216 is Phe or Trp
position 217 is Met, Ile, or Leu
position 249 is Thr, Ser, Val, or Phe
position 360 is Ala,
position 459 is Ala
42. The AibRS according to any preceding embodiment; wherein the variant further comprises one or more amino acids selected from a list consisting of: 192Trp, 192His, 192Val, 192Ile, 192Leu, 193Ala, 193Leu, 193Ile, 193Gly, 213Thr, 213Ser, 213Cys, 213Ala, 216Phe, 216Trp, 217Met, 217Ile, 217Leu, 249Thr, 249Ser, 249Val, 249Phe, 360Asn, 360Ala, 459Glu, and 459Ala.
43. The AibRS according to any preceding embodiment; wherein the variant further comprises two or more amino acids selected from a list consisting of: 192Trp, 192His, 192Val, 192Ile, 192Leu, 193Ala, 193Leu, 193Ile, 193Gly, 213Thr, 213Ser, 213Cys, 213Ala, 216Phe, 216Trp, 217Met, 217Ile, 217Leu, 249Thr, 249Ser, 249Val, 249Phe, 360Asn, 360Ala, 459Glu, and 459Ala.
44. The AibRS according to any preceding embodiment; wherein the variant further comprises three or more amino acids selected from a list consisting of: 192Trp, 192His, 192Val, 192Ile, 192Leu, 193Ala, 193Leu, 193Ile, 193Gly, 213Thr, 213Ser, 213Cys, 213Ala, 216Phe, 216Trp, 217Met, 217Ile, 217Leu, 249Thr, 249Ser, 249Val, 249Phe, 360Ala, 360Ala, 459Glu, and 459Ala.
45. The AibRS according to any preceding embodiment; wherein the variant further comprises one or more amino acids selected from a list consisting of: 192His, 192Val, 192Ile, 192Leu, 193Leu, 193Ile, 193Gly, 213Ser, 213Cys, 213Ala, 216Trp, 217Ile, 217Leu, 249Ser, 249Val, 249Phe, 360Ala, and 459Ala.
46. The AibRS according to any preceding embodiment; wherein the variant further comprises two or more amino acids selected from a list consisting of: 192His, 192Val, 192Ile, 192Leu, 193Leu, 193Ile, 193Gly, 213Ser, 213Cys, 213Ala, 216Trp, 217Ile, 217Leu, 249Ser, 249Val, 249Phe, 360Ala, and 459Ala.
47. The AibRS according to any preceding embodiment; wherein the variant further comprises three or more amino acids selected from a list consisting of: 192His, 192Val, 192Ile, 192Leu, 193Leu, 193Ile, 193Gly, 213Ser, 213Cys, 213Ala, 216Trp, 217Ile, 217Leu, 249Ser, 249Val, 249Phe, 360Ala, and 459Ala.
48. The AibRS according to any preceding embodiment; wherein the variant is selected from a list consisting of: SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30.
49. The AibRS according to any preceding embodiment; wherein the variant is selected from a list consisting of: SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30.
50. The AibRS according to any preceding embodiment; wherein the AibRS is derived from an archaeal bacterium.
51. The AibRS according to any preceding embodiment; wherein the AibRS is derived from *Pyrococcus horikoshii*.
52. The AibRS according to any preceding embodiment; wherein the AibRS is configured to perform the function of aminoacylating a tRNA with Aib.
53. The AibRS according to any preceding embodiment; wherein the tRNA is a suppressor tRNA.
54. The AibRS according to any preceding embodiment; wherein the tRNA comprises one or more anticodons that encodes Aib.
55. The AibRS according to any preceding embodiment; wherein the anticodon of the tRNA that encodes Aib is complementary to a stop codon.
56. The AibRS according to any preceding embodiment; wherein the anticodon that encodes Aib is CTA.
57. The AibRS according to any preceding embodiment; wherein the tRNA is encoded by SEQ ID NO: 3 or a variant hereof.
58. The AibRS according to any preceding embodiment; wherein the variant encoding the tRNA contains a G3A mutation.
59. The AibRS according to any preceding embodiment; wherein the variant encoding the tRNA is at least 50%, at least 60%, at least 70% at least 75%, at least 80%, at least 85%, at least 90%, at least 95%, at least 99%, or at least 100% identical to SEQ ID NO: 3.
60. The AibRS according to any preceding embodiment; wherein the variant encoding the tRNA is SEQ ID NO: 4.
61. The AibRS according to any preceding embodiment; wherein the tRNA is encoded by SEQ ID NO: 4.
62. The AibRS according to any preceding embodiment; wherein the tRNA is derived from an archaeal bacterium.
63. The AibRS according to any preceding embodiment; wherein the tRNA is derived from *Pyrococcus horikoshii*.
64. The AibRS according to any preceding embodiment; wherein the AibRS is configured to perform the function of aminoacylating a tRNA with Aib in a host cell.
65. The AibRS according to any preceding embodiment; wherein the AibRS is configured to perform the function of aminoacylating a tRNA with Aib in *E. coli*.
66. The AibRS according to any preceding embodiment; wherein the efficiency of the function is determined by analysing the expression product, i.e. the resulting polypeptide upon translation of the tRNA.
67. The AibRS according to any preceding embodiment; wherein the efficiency is expressed as the incorporation ratio between the resulting polypeptide containing Aib and the amount of resulting polypeptide containing Ala or Aib in the position intended for Aib.
68. The AibRS according to any preceding embodiment; wherein the incorporation ratio is determined using LC-MS and calculated based on the mass spectrum as follows: Incorporation ratio=$[\text{Peak intensity}]_{Aib\text{-containing polypeptide}}/([\text{Peak intensity}]_{Aib\text{-containing polypeptide}}+[\text{Peak intensity}]_{Ala\text{-containing polypeptide}})*100\%$.
69. The AibRS according to any preceding embodiment; wherein the incorporation ratio is at least 1%, at least 5%, at least 10%, at least 15%, at least 20%, at least 25%, at least 30%, at least 35%, at least 40%, at least 45%, at least 50%, at least 55%, at least 60%, at least 65%, or at least 70%.
70. The use of an AibRS, according to any preceding embodiment, for the preparation of a resulting polypeptide containing one or more Aib residues.
71. The use of an AibRS, according to any preceding embodiment, wherein the resulting polypeptide containing one or more Aib residues is a GLP-1 analogue.
72. The use of an AibRS according to any preceding embodiment, wherein the resulting polypeptide containing one or more Aib residues comprises SEQ ID NO: 32.
73. A method of producing a compound comprising the steps of:
 a. preparation of a resulting polypeptide containing one or more Aib residues using the AibRS of any preceding embodiment
 b. derivatisation of the resulting polypeptide.
74. A method according to any of the preceding embodiments wherein the resulting polypeptide comprises SEQ ID NO: 32.
75. A method according to any of the preceding embodiments wherein the compound is Chem. 2

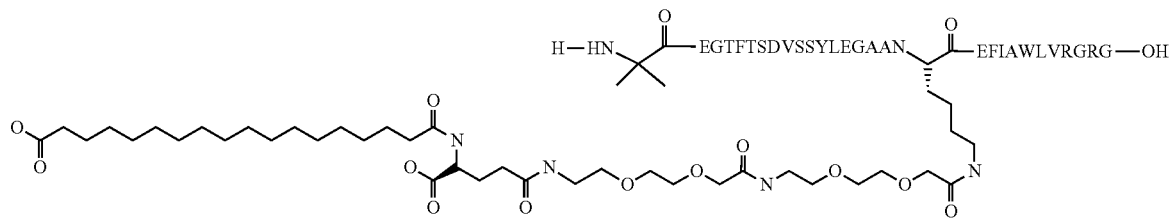

76. A method according to any of the preceding embodiments; wherein the resulting polypeptide comprises SEQ ID NO: 32; and wherein the compound is Chem. 2:

Chem. 2

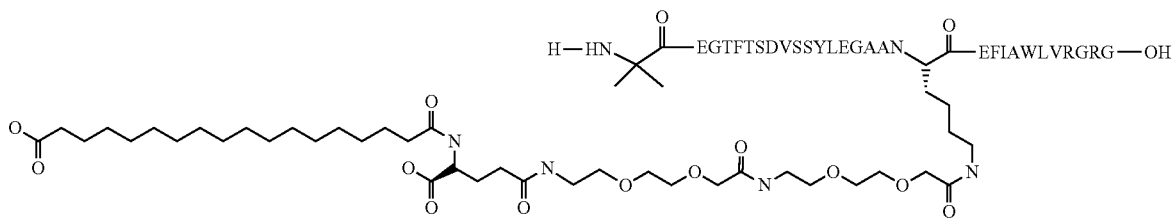

77. A method according to any of the preceding embodiments; wherein the derivatisation introduces a substituent of Chem. 3:

Chem. 3

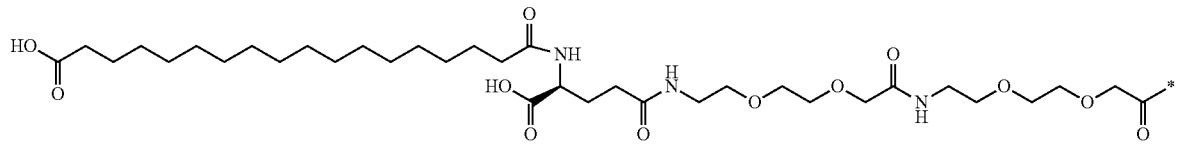

EXAMPLES

General Procedures
SDS-PAGE

SDS-PAGE was carried out as standard in the art using 4-12% NuPAGE™ Bis-Tris to analyse expression samples. For preparation of gels and samples the protocols of the supplier (Thermofisher) were applied.

Plasmid Construction For Expression of tRNA$^{Aib}$, AibRS and Target Polypeptide (i.e. resulting polypeptide)

Expression of the tRNA$^{Aib}$, the AibRS and the target polypeptide (i.e. the resulting polypeptide) was performed from two separate plasmids or a single plasmid. In case of using two separate plasmids, each contained separate selection markers, i.e. amp and kan resistance markers. In case of using a single plasmid, a single marker, i.e. amp, was employed. Expression of the tRNA$^{Aib}$, the AibRS and the target polypeptide (i.e. the resulting polypeptide) were controlled by separate promoter and terminator sequences, i.e. T7 promotor and terminator to control expression of the target polypeptide, lac promoter and terminator to control expression of the AibRS, and lpp promoter and terminator to control expression of the tRNA$^{Aib}$. Preferably the tRNA$^{Aib}$ was expressed for multiple copies of the tDNA, i.e. as two separate 3× concatemers where the expression from each was controlled by an lpp promoter and terminator as well as a tet promoter and terminator, respectively. Each individual tRNA$^{Aib}$ in the concatemer was spaced by ValU-ValX operon linker and IleT and AlaT operon linker to enable processing by RNAses to release the separate tRNA molecules.

E. coli Transformation

Transformation of E. coli was performed by standard methods according to Sambrook et al. (1989) [Sambrook J, Fritsch E F, Maniatis T.; Molecular Cloning: A Laboratory Manual, 2nd edn; Cold Spring Harbor Laboratory Press: New York; 1989] or by electroporation with a Bio-Rad Gene Pulser set at 25 μF, 200 ohm, and 2.5 kV in 2-mm cuvettes according to Dower et al. (1988) [Dower, W. J., Miller, J. F., & Ragsdale, C. W. (1988) Nucleic Acids Res. 16, 6127-6145]. Transformed cells were selected on LB media supplemented with the appropriate selective antibiotics, i.e. ampicillin and/or canavanine.

E. coli Cultivation

E. coli TKO cells (WO/2010/052335) transformed with the plasmids to be tested were taken either from a frozen stocks or directly from fresh transformations on LB plates (with appropriate antibiotics). Cells were then inoculated into 50 ml tubespin bioreactor P50 filled with 8 ml LB medium plus antibiotics. The cells were grown at 37° C. with shaking at 220 rpm for 5 hours. Cells from the pre-culture were diluted into 20 ml of minimal defined medium (M9) with appropriate antibiotics filled into 125 mL Corning® Disposable Erlenmeyer Flask. Aib were added to a concentration of 10 mM. The cells were cultivated at 37° C. to OD600 to 1.0. Target protein expression was induced by addition of 1 mM IPTG and further cultivated at 30° C. or 37° C. for a minimum of 4 hours up to overnight. Inclusion body fractions were isolated and collected with sonication and centrifugation as described in next paragraph.

Sample Preparation and LC-MS Methods

A suspension of E. coli cells, corresponding to 10 OD, was centrifuged at 13000×g for 5 minutes. The resulting pellet was re-suspended in 1 ml 10 mM Kaliumphoshate pH 5.0 buffer and sonificated for 2 min at 30% amplitude, 5"/5" on/off. After repeated centrifugation at 13000×g for 5 minutes, the pellet fraction was dissolved with 8M urea/100 mM DTT/50 mM CAPS pH 12 buffer and shaken 1 h at RT, 2000×rpm. Samples were filtered with 0.2 μm UPLC filters and analysed by LC-MS using the following setup:

| Parameter | Information |
|---|---|
| MS System | Waters UPLC Xevo G2 Q-TOF (in 3.3.C.19.1) |
| Resolution | 20,000 |
| Ion source | Dual ESI (positive mode), 120° C. |
| Capillary | 3 KV |
| Sample Cone | 35 V |
| Desolvation Temperature | 380° C. |
| Cone Gas (L/h) | 38 |
| Desolvation Gas (L/h) | 800 |
| Range m/z | m/z: 500 to 4,000 (200-4,000) |
| Column | Acquity UPLC BEH300 C4 1.7 um (Size: 2.1 × 50 mm) (Waters Part# 186004495) |
| Column temperature | 80° C. (45° C.) |
| Flow Rate | 0.2-0.4 mL/min |
| Pressure limit | 15000 psi |
| Buffer A | Formic acid (0.1% v/v) in water (Fisher LC118-1) |
| Buffer B | Formic acid(0.1% v/v) in acetonitrile (Fisher LC120-1) |
| Buffer C | Trifluoroacetic acid (0.05% v/v) in water |
| Buffer D | Trifluoroacetic acid(0.04% v/v) in acetonitrile |
| Gradient/RunTime | General gradient: 5% B for 2.5 min, 5-95% B in 5 min, keep 95% B for 0.5 min, reduce to 5% B in 0.1 min and keep for 1.9 min, Total runtime: 10 min | tRNA Synthetase and tRNA Suitable For 2-Aminoisobutyric Acid Incorporation in a Polypeptide During Translation Methodologies that allow the systematic addition of unnatural amino acids to the genetic code of E. coli, yeast and mammalian cells have previously been reported [Wals K. and Ovaa H; Unnatural amino acid incorporation in E. coli: current and future applications in the design of therapeutic proteins; Front Chem. Apr 1; 2:15 (2014)], [Wang Q. and Wang L; Genetic incorporation of unnatural amino acids into proteins in yeast; Methods Mol. Biol; 794: 199-213 (2012)] and [Schmied W H, Elsässer S J; Efficient multisite unnatural amino acid incorporation in mammalian cells via optimized pyrrolysyl tRNA synthetase/tRNA expression and engineered eRF1; Am Chem Soc. November 5; 136(44): 15577-83 (2014)]. The methods are based on the selection of an orthogonal tRNA/RS pair isolated from a distant organism, that enable the cells to incorporate a given amino acid in response to a unique codon, without or with reduced cross reacting with the endogenous host tRNAs, RS or amino acids.

In order to specifically incorporate 2-Aminoisobutyric acid (Aib) into a polypeptide, an RS, capable of charging tRNA with Aib, can be developed and utilised together with other translation machinery such as that endogenously part of a host cell (e.g. *E. coli*). The RS capable of charging tRNA with Aib will in the following be referred to as 2-Aminoisobutyric acid-tRNA synthetase (AibRS). The tRNA molecule charged with Aib will in the following be referred to as tRNA$^{Aib}$. The AibRS and the tRNA$^{Aib}$ will in the following collectively be referred to as an AibRS/tRNA$^{Aib}$ pair.

The AibRS and the tRNA$^{Aib}$ may conveniently be derived from an AlaRS and tRNA$^{Ala}$, respectively, as Ala shares structural similarities with Aib. The AlaRS and tRNA$^{Ala}$ may in theory originate from any organism. In this case, the AibRS and tRNA$^{Aib}$ were derived from a wild-type AlaRS and wild-type tRNA$^{Ala}$ from an archaeal bacterium, *Pyrococcus horikoshii* (ph) (referred to as phAlaRS(wt) (SEQ ID NO: 1) and phtRNA$^{Ala}$(wt) (SEQ ID NO: 2), respectively). In this case, tRNA$^{Aib}$ optimisation and AibRS development took place using *E. coli* as a model system, albeit any host cell could be used for this purpose in theory.

Optimisation of the tRNA$^{Aib}$

Example 1

The tRNA$^{Aib}$ may in principle be any tRNA (e.g. tRNA$^{Ala}$) that is cognate to AibRS. However, in order to improve the efficiency of the translation process incorporating an Aib residue, the tRNA can be optimised so that the formation of undesired translation products, e.g. polypeptides containing Ala rather than Aib, is reduced.

In order to avoid the unwanted incorporation of Aib into all positions coding for Ala, the anticodon in phtRNA$^{Ala}$(wt) (SEQ ID NO: 2) was changed to CTA, reversely complementing with TAG, which is an amber stop codon, thus resulting in a suppressor phtRNA$^{Ala}$ (SEQ ID NO: 3). Any stop codon could in principle be used for this purpose.

The suppressor phtRNA$^{Ala}$ (SEQ ID NO: 3) is not orthogonal to the endogenous *E. coli* translation system, meaning that suppressor phtRNA$^{Ala}$ (SEQ ID NO: 3) can be recognized by endogenous AlaRS of *E. coli* (ecAlaRS) and aminoacylated with Ala rather than Aib. In order to favour aminacylation with Aib, mutations can be introduced in the phtRNA$^{Ala}$ (SEQ ID NO: 3) to make it orthogonal to ecAlaRS, while maintaining its complementarity to AibRS. While such mutations may offer improved efficiency, they are in principle not needed for the invention to work. Aligning sequences from the public domain (i.e. Genbank or EMBL), the G3 and T72 DNA nucleotides forming a G-U pair in phtRNA$^{Ala}$(wt) (SEQ ID NO: 2) secondary structure is conserved in tRNA$^{Ala}$ across different species. In addition it has been demonstrated for other archaebacteria that a mutation of G3A in the tRNA$^{Ala}$ of *Aquifex aeolicus* makes the tRNA$^{Ala}$ unrecognisable to any AlaRS [M A Swairjo et al.; Alanyl-tRNA Synthetase Crystal Structure, and Design for Acceptor-Stem Recognition; Molecular Cell, Vol. 13, 829-841, (2004)]. Inspired by the observations in *Aquifex aeolicus*, a suppressor phtRNA$^{Ala}$ (SEQ ID NO: 3) containing a G3A mutation was prepared resulting in a tRNA$^{Aib}$ (SEQ ID NO: 4).

The orthogonality of suppressor phtRNA$^{Ala}$ (SEQ ID NO: 3) and tRNA$^{Aib}$ (SEQ ID NO: 4) was tested. In a first sample, the *E. coli* cells were modified by standard plasmid transformation were exogenous DNA encoding suppressor phtRNA$^{Ala}$ (SEQ ID NO: 3) and the model polypeptide MS-(Aib)-hsLeptin (SEQ ID NO: 5) were transferred into the cell. In the second sample, the *E. coli* cells were modified by standard plasmid transformation, where exogenous DNA encoding tRNA$^{Aib}$ (SEQ ID NO: 4) and the model polypeptide MS-(Aib)-hsLeptin (SEQ ID NO: 5) were transferred into the cell. In theory, the full-length model polypeptides would be expressed (albeit the model polypeptide MS-(Aib)-hsLeptin would contain Ala rather than Aib) if the endogenous ecAlaRS recognised the exogenous suppressor phtRNA$^{Ala}$ (SEQ ID NO: 3). The cell were cultivated according to the general procedures and analysed by SDS-PAGE. The analysis showed that full-length model polypeptide was expressed in the cells containing suppressor phtRNA$^{Ala}$ (SEQ ID NO: 3), while no (or very little) full-length model polypeptide was expressed in the cells containing DNA encoding tRNA$^{Aib}$ (SEQ ID NO: 4), and thus the tRNA$^{Aib}$ (SEQ ID NO: 4) was found to be recognised by ecAlaRS with a significantly reduced efficiency.

Development of 2-Aminoisobutyric Acid-tRNA Synthetase (AibRS)

Example 2

In comparison to Ala, 2-Aminoisobutyric acid (Aib) (Chem. 1) contains an extra methyl group at the alpha-carbon position, which makes the Aib unable to interact with phAlaRS(wt) due to steric hindrance.

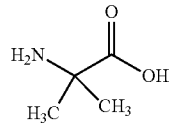

Chem. 1

(2-Aminoisobutyric acid (Aib)):

The AlaRS class II core catalytic domain of phAlaRS(wt), which contains the Ala binding pocket, is the amino acid sequence spanning position 1 to 263 of the wild-type sequence and is part of an N-terminal domain comprising the Ala binding and tRNA$^{Ala}$ binding functions, which is referred to as "aa1-495" in the following. The editing and the oligomerization domain (aa496-915) were omitted from all constructs in this study, and thus all RS constructs in the following is based on the aa1-495 portion of the phAlaRS (wt) (SEQ ID NO: 6). A phAlaRS(wt) crystal structure of the N-terminal domains (aa1-752) is published by M. Sokabe et al. (2009) [Sokabe M, Ose T, Nakamura A, Tokunaga K, Nureki O, Yao M, Tanaka I; The structure of alanyl-tRNA synthetase with editing domain; PNAS 106 (27): 11028-11033 (2009)].

The alanine binding pocket of the AlaRS was calculated based on residues having atoms closer than 5 angstroms to the alanine C-alpha carbon atom in the crystal structure 2ZZG (Crystal structure of alanyl-tRNA synthetase in complex with 5"-O-(N-(L-alanyl)-sulfamyoxyl) adenine without oligomerization domain). Distances were calculated in standard structure visualisation software, particularly Accelrys VL Viewer, by loading the 2ZZG.pdb file, selecting the A5A999.CA atom, and then selecting atoms within 5 angstroms. These atoms belonged to A99, M147, W192, T213, V215, D248, T249, and G250. In particular W192 and V215 were in close proximity to the putative location of the extra methyl group of Aib. It was speculated that the extra methyl group of Aib could be accommodated by mutations in these two positions. Mutants of the aa1-495 portion of the phAlaRS(wt) (SEQ ID NO: 6) were prepared, specifically, two mutations in position 192, i.e. W192H and W192F, were tested, and one mutation in position 215, i.e. V215G, was tested alone and in combination with W192H, resulting in a total of four mutants. Also, the wild-type aa1-495 portion of the phAlaRS(wt) (SEQ ID NO: 6) was tested.

TABLE 1

Aminoacyl-tRNA synthetase mutants of aa1-495 portion of the phAlaRS(wt) (SEQ ID NO: 6)

| SEQ ID NO | Mutations |
| --- | --- |
| 7 | V215G |
| 8 | W192F |
| 9 | W192H |
| 10 | W192H; V215G |
| 6 | No mutations (wild type) |

The mutants were transformed into *E. coli* TKO cells together with one copy of suppressor phtRNA$^{Ala}$ (SEQ ID NO: 3) and a polynucleotide encoding the model polypeptide MS-(Aib)-hsLeptin (SEQ ID NO: 5) by standard plasmid transformation methods. The *E. coli* cells were cultivated according to the general procedures. The isolated inclusion body fractions were analysed with SDS-PAGE. For all mutants including the V215G and/or W192H mutation (i.e. SEQ ID NO: 7, SEQ ID NO: 9, and SEQ ID NO: 10) a band at ~16 kDa, of varying intensity, was observed (no band was observed for SEQ ID NO: 8 or the wild type). Solubilized inclusion bodies of were analysed using LC-MS according to the general procedures, and it was confirmed that the band in sample with SEQ ID NO: 7 represented a small portion of the expressed polypeptide MS-(Aib)-hsLeptin (SEQ ID NO: 5) (found [m/1]=16198.6; calculated [m/1]=16198.4). The efficiency of the mutant was expressed as the incorporation ratio and calculated as described in Example 3. The incorporation ratio for SEQ ID NO: 7 was=<10%.

Example 3

For the archaea *Archaeoglobus fulgidus* it has been reported that the tRNA$^{Ala}$ aminoacylation mechanism may be based on a single G-U pair, corresponding to the G3 and T72 in the DNA polynucleotide, and that key residues of the AlaRS involved in the interaction with this pair are N359 & D450, and that for AlaRS of *Pyrococcus horikoshii* the two corresponding key residues are N360 and E459. Furthermore, it has been reported that these key residues in AlaRS are conserved across archaea domain [M. Naganuma et al., Nature 510, pages 507-511 (2014)].
A mutant of aa1-495 of phAlaRS(wt) containing the W192H, V215G, N360A and E459A mutations (SEQ ID NO: 11) were transformed, according to general procedures, into *E. coli* TKO cells on a plasmid containing 6 copies of tRNA$^{Aib}$ (SEQ ID NO: 4) and a polynucleotide encoding a model polypeptide IL21-H(Aib)-GLP-1 (SEQ ID NO: 31) comprising an inclusion body-inducing region from IL-21 protein at positions 1-24, and an Aib-containing GLP-1 analogue region. The Aib-containing GLP-1 region was identical to the polypeptide backbone of semaglutide (SEQ ID NO: 32) [Lau J. et. al, Discovery of the once-weekly glucagon-like peptide-1 (GLP-1) analogue semaglutide, J. Med. Chem., 2015; 58:7370-7380]. The *E. coli* cells were cultivated according to general procedures and analysed by SDS-PAGE. A strong band at ~8 kDa was identified, and LC-MS confirmed that the model polypeptide IL21-H(Aib)-GLP-1 (SEQ ID NO: 31) had been expressed (found [m/1]=8324.6; calculated [m/1]=8324.3 The efficiency of the Aib function was expressed as a incorporation ratio between the amount of resulting polypeptide containing Aib and the amount of resulting polypeptide containing Aib or Ala in the position encoding for Aib, and calculated based on the mass spectrum as follows: Incorporation ratio=[Peak intensity]$_{Aib-containing\ polypeptide}$/([Peak intensity]$_{Aib-containing\ polypeptide}$+[Peak intensity]$_{Ala-containing\ polypeptide}$)*100%. The incorporation ratio for SEQ ID NO: 11 was calculated to be 63%.

Example 4

A mutant of aa1-495 of phAlaRS(wt) containing the W192H, V215G, M217I, N360A and E459A (SEQ ID NO: 12) was prepared and tested according to the procedures described in Example 3. LC-MS confirmed that the model polypeptide IL21-H(Aib)-GLP-1 (SEQ ID NO: 12) had been expressed (found [m/1]=8324.6; calculated [m/1]=8324.3. The calculated incorporation ratio was 82%.

Example 5

A mutant of aa1-495 of phAlaRS(wt) containing the W192H, V215G, M217L, N360A, and E459A (SEQ ID NO: 13) was prepared and tested according to the procedures described in Example 3. LC-MS confirmed that the model polypeptide IL21-H(Aib)-GLP-1 (SEQ ID NO: 13) had been expressed (found [m/1]=8324.6; calculated [m/1]=8324.3. The calculated incorporation ratio was 66%.

Example 6

A mutant of aa1-495 of phAlaRS(wt) containing the W192H, V215G, A193L, N360A, and E459A (SEQ ID NO: 14) was prepared and tested according to the procedures described in Example 3. LC-MS confirmed that the model polypeptide IL21-H(Aib)-GLP-1 (SEQ ID NO: 14) had been expressed (found [m/1]=8324.6; calculated [m/1]=8324.3. The calculated incorporation ratio was 71%.

Example 7

A mutant of aa1-495 of phAlaRS(wt) containing the W192H, V215G, F216W, N360A, and E459A (SEQ ID NO: 15) was prepared and tested according to the procedures described in Example 3. LC-MS confirmed that the model polypeptide IL21-H(Aib)-GLP-1 (SEQ ID NO: 15) had been expressed (found [m/1]=8324.6; calculated [m/1]=8324.3. The calculated incorporation ratio was 66%.

Example 8

A mutant of aa1-495 of phAlaRS(wt) containing the W192H, V215G, A193L, F216W, N360A, and E459A (SEQ ID NO: 16) was prepared and tested according to the procedures described in Example 3. LC-MS confirmed that the model polypeptide IL21-H(Aib)-GLP-1 (SEQ ID NO: 16) had been expressed (found [m/1]=8324.6; calculated [m/1]=8324.3. The calculated incorporation ratio was 63%.

Example 9

A mutant of aa1-495 of phAlaRS(wt) containing the W192H, V215G, and A193I, N360A, and E459A (SEQ ID NO: 17) was prepared and tested according to the procedures described in Example 3. LC-MS confirmed that the model polypeptide IL21-H(Aib)-GLP-1 (SEQ ID NO: 16) had been expressed (found [m/1]=8324.8; calculated [m/1]= 8324.3. The calculated incorporation ratio was 60%.

Example 10

A mutant of aa1-495 of phAlaRS(wt) containing the W192H, V215G, A193I, M217I, N360A, and E459A (SEQ ID NO: 18) was prepared and tested according to the procedures described in Example 3. LC-MS confirmed that the model polypeptide IL21-H(Aib)-GLP-1 (SEQ ID NO: 16) had been expressed (found [m/1]=8324.6; calculated [m/1]=8324.3. The calculated incorporation ratio was 72%.

Example 11

A mutant of aa1-495 of phAlaRS(wt) containing the W192H, V215G, A193L, M217I, N360A, and E459A (SEQ ID NO: 19) was prepared and tested according to the procedures described in Example 3. LC-MS confirmed that the model polypeptide IL21-H(Aib)-GLP-1 (SEQ ID NO: 16) had been expressed (found [m/1]=8324.6; calculated [m/1]=8324.3. The calculated incorporation ratio was 82%.

Example 12

A mutant of aa1-495 of phAlaRS(wt) containing W192H, V215G, A193I, M217L, N360A. and E459A (SEQ ID NO: 20) was prepared and tested according to the procedures described in Example 3. LC-MS confirmed that the model polypeptide IIL21-H(Aib)-GLP-1 (SEQ ID NO: 16) had been expressed (found [m/1]=8324.8; calculated [m/1]= 8324.3. The calculated incorporation ratio was 51%.

Example 13

A mutant of aa1-495 of phAlaRS(wt) containing W192H, V215G, A193L, M217L, N360A, and E459A (SEQ ID NO: 21) was prepared and tested according to the procedures described in Example 3. LC-MS confirmed that the model polypeptide IL21-H(Aib)-GLP-1 (SEQ ID NO: 21) had been expressed (found [m/1]=8324.8; calculated [m/1]=8324.3. The calculated incorporation ratio was 57%.

Example 14

A mutant of aa1-495 of phAlaRS(wt) containing W192V, V215G, M217I, N360A, and E459A (SEQ ID NO: 22) was prepared and tested according to the procedures described in Example 3. LC-MS confirmed that the model polypeptide IL21-H(Aib)-GLP-1 (SEQ ID NO: 16) had been expressed (found [m/1]=8324.4; calculated [m/1]=8324.3. The calculated incorporation ratio was 77%.

Example 15

A mutant of aa1-495 of phAlaRS(wt) containing W192I, V215G, M217I, N360A, and E459A (SEQ ID NO: 23) was prepared and tested according to the procedures described in Example 3. LC-MS confirmed that the model polypeptide IL21-H(Aib)-GLP-1 (SEQ ID NO: 16) had been expressed (found [m/1]=8324.4; calculated [m/1]=8324.3. The calculated incorporation ratio was 74%.

Example 16

A mutant of aa1-495 of phAlaRS(wt) containing W192L, V215G, M217I, N360A, and E459A (SEQ ID NO: 24) was prepared and tested according to the procedures described in Example 3. LC-MS confirmed that the model polypeptide IL21-H(Aib)-GLP-1 (SEQ ID NO: 16) had been expressed (found [m/1]=8325.0; calculated [m/1]=8324.3. The calculated incorporation ratio was 54%.

Example 17

A mutant of aa1-495 of phAlaRS(wt) containing W192H, A193G, V215G, M217I, N360A, and E459A (SEQ ID NO: 25) was prepared and tested according to the procedures described in Example 3. LC-MS confirmed that the model polypeptide IL21-H(Aib)-GLP-1 (SEQ ID NO: 16) had been expressed (found [m/1]=8324.4; calculated [m/1]=8324.3. The calculated incorporation ratio was 86%.

Example 18

A mutant of aa1-495 of phAlaRS(wt) containing W192H, T213S, V215G, N360A, and E459A (SEQ ID NO: 26) was prepared and tested according to the procedures described in Example 3. LC-MS confirmed that the model polypeptide IL21-H(Aib)-GLP-1 (SEQ ID NO: 16) had been expressed (found [m/1]=8324.2; calculated [m/1]=8324.3. The calculated incorporation ratio was 56%.

Example 19

A mutant of aa1-495 of phAlaRS(wt) containing W192H, V215G, T249S, N360A, and E459A (SEQ ID NO: 27) was prepared and tested according to the procedures described in Example 3. LC-MS confirmed that the model polypeptide IL21-H(Aib)-GLP-1 (SEQ ID NO: 16) had been expressed (found [m/1]=8325.0; calculated [m/1]=8324.3. The calculated incorporation ratio was 67%.

Example 20

A mutant of aa1-495 of phAlaRS(wt) containing W192H, V215G, T249V, N360A, and E459A (SEQ ID NO: 28) was prepared and tested according to the procedures described in Example 3. LC-MS confirmed that the model polypeptide IL21-H(Aib)-GLP-1 (SEQ ID NO: 16) had been expressed (found [m/1]=8324.8; calculated [m/1]=8324.3. The calculated incorporation ratio was 78%.

Example 21

A mutant of aa1-495 of phAlaRS(wt) containing W192H, T213C, V215G, T249V, N360A, and E459A (SEQ ID NO: 29) was prepared and tested according to the procedures described in Example 3. LC-MS confirmed that the model polypeptide IL21-H(Aib)-GLP-1 (SEQ ID NO: 16) had been expressed (found [m/1]=8324.8; calculated [m/1]=8324.3. The calculated incorporation ratio was 82%.

Example 22

A mutant of aa1-495 of phAlaRS(wt) containing W192H, T213A, V215G, T249F, N360A, and E459A (SEQ ID NO:

30) was prepared and tested according to the procedures described in Example 3. LC-MS confirmed that the model polypeptide IL21-H(Aib)-GLP-1 (SEQ ID NO: 16) had been expressed (found [m/1]=8324.6; calculated [m/1]=8324.3. The calculated incorporation ratio was 83%.

Example 23

A consensus sequence for the archaean AlaRS was made by extracting the 100 sequences most identical to the aa1-495 portion of the phAlaRS(wt) (SEQ ID NO: 6). From the NCBI sequence database using SEQ ID NO: 6 as query against the "All non-redundant GenBank CDS translations+PDB+SwissProt+PIR+PRF" and using the NCBI online blastp suite. The extracted sequences were trimmed N-terminally and C-terminally to the same length as SEQ ID NO: 6 (to remove N-terminal extensions and the C-terminal editing domain) and then aligned using standard alignment algorithms, particularly the Geneious® 10.2.2 software using Multiple Align with Blosum62 matrix. Three consensus sequences were created by setting a threshold of identity as 85%, 75% or 50%, respectively, across all sequences in the alignment to indicate whether the amino acid position was conserved or not. Then a given amino acid position in the consensus sequence was denoted as either a specific amino acid—if conserved above the set threshold—or otherwise Xaa for any amino acid—if not conserved above the threshold. The consensus sequences are provided Table 2. The consensus sequence may change over time as the NCBI genome database is updated regularly.

TABLE 2

Consensus sequences of archaean AlaRS based on SEQ ID NO: 6

| Threshold of identity | Sequence[1] | Relative amount of conserved positions |
|---|---|---|
| 85% | Formula I:<br>Xaa-Xaa-Xaa-Xaa-Xaa-Xaa-Xaa-Xaa-Xaa-Phe-Xaa-Glu-Xaa-Gly-Xaa-Xaa-Xaa-Lys-Xaa-Cys-Xaa-Xaa-Cys-Gly-Xaa-Xaa-Phe-Trp-Thr-Xaa-Xaa-Xaa-Xaa-Arg-Xaa-Xaa-Cys-Gly-Asp-Xaa-Pro-Cys-Xaa-Xaa-Tyr-Xaa-Phe-Ile-Gly-Xaa-Pro-Xaa-Xaa-Xaa-Xaa-Xaa-Xaa-Xaa-Leu-Xaa-Glu-Xaa-Arg-Xaa-Xaa-Phe-Xaa-Xaa-Phe-Phe-Glu-Xaa-Xaa-Xaa-His-Xaa-Xaa-Xaa-Xaa-Arg-Tyr-Pro-Val-Xaa-Xaa-Arg-Trp-Arg-Asp-Asp-Val-Xaa-Leu-Val-Gly-Ala-Ser-Ile-Xaa-Asp-Phe-Gln-Pro-Trp-Val-Xaa-Xaa-Gly-Xaa-Xaa-Xaa-Pro-Pro-Ala-Asn-Pro-Leu-Xaa-Ile-Ser-Gln-Pro-Xaa-Ile-Arg-Xaa-Xaa-Asp-Xaa-Asp-Xaa-Val-Gly-Xaa-Xaa-Gly-Arg-His-Xaa-Thr-Xaa-Phe-Glu-Met-Met-Ala-His-His-Ala-Phe-Asn-Xaa-Xaa-Xaa-Xaa-Xaa-Xaa-Tyr-Trp-Xaa-Xaa-Glu-Thr-Val-Xaa-Xaa-Xaa-Xaa-Phe-Xaa-Xaa-Xaa-Xaa-Xaa-Xaa-Xaa-Xaa-Xaa-Xaa-Ile-Thr-Phe-Xaa-Glu-Xaa-Xaa-Trp-Xaa-Gly-Gly-Gly-Asn-Ala-Gly-Xaa-Xaa-Xaa-Glu-Val-Xaa-Xaa-Xaa-Xaa-Xaa-Ala-Thr-Leu-Val-Phe-Met-Xaa-Tyr-Xaa-Xaa-Xaa-Xaa-Xaa-Xaa-Xaa-Xaa-Xaa-Xaa-Xaa-Xaa-Xaa-Xaa-Xaa-Xaa-Xaa-Xaa-Xaa-Pro-Xaa-Xaa-Xaa-Xaa-Val-Asp-Thr-Gly-Tyr-Gly-Leu-Glu-Arg-Xaa-Xaa-Trp-Xaa-Ser-Xaa-Gly-Xaa-Pro-Thr-Xaa-Tyr-Asp-Ala-Xaa-Xaa-Xaa-Xaa-Xaa-Xaa-Xaa-Leu-Xaa-Xaa-Xaa-Ala-Gly-Xaa-Xaa-Xaa-Xaa-Xaa-Xaa-Xaa-Xaa-Ile-Leu-Xaa-Xaa-Xaa-Xaa-Xaa-Xaa-Ala-Gly-Xaa-Xaa-Asp-Xaa-Xaa-Xaa-Xaa-Xaa-Xaa-Leu-Xaa-Xaa-Leu-Arg-Xaa-Xaa-Val-Ala-Xaa-Xaa-Xaa-Xaa-Xaa-Xaa-Glu-Leu-Xaa-Xaa-Xaa-Xaa-Pro-Xaa-Glu-Xaa-Xaa-Tyr-Ala-Ile-Ala-Asp-His-Thr-Xaa-Xaa-Leu-Xaa-Phe-Met-Leu-Xaa-Asp-Gly-Val-Xaa-Pro-Ser-Asn-Xaa-Xaa-Ala-Gly-Tyr-Leu-Ala-Arg-Leu-Xaa-Ile-Arg-Xaa-Xaa-Xaa-Arg-Xaa-Xaa-Xaa-Xaa-Leu-Gly-Xaa-Xaa-Xaa-Pro-Leu-Xaa-Xaa-Ile-Xaa-Xaa-Xaa-Xaa-Xaa-Xaa-Xaa-Xaa-Xaa-Xaa-Xaa-Pro-Glu-Xaa-Xaa-Glu-Xaa-Xaa-Xaa-Xaa-Xaa-Xaa-Xaa-Xaa-Xaa-Xaa-Glu-Glu-Xaa-Xaa-Xaa-Xaa-Xaa-Xaa-Xaa-Glu-Glu-Xaa-Xaa-Xaa-Xaa-Xaa-Thr-Xaa-Xaa-Arg-Gly-Xaa-Xaa-Xaa-Xaa-Xaa-Xaa-Xaa-Xaa-Xaa-Xaa-Lys-Xaa-Xaa-Gly-Xaa-Xaa-Xaa-Xaa-Pro-Xaa-Xaa-Xaa-Leu-Xaa-Xaa-Xaa-Tyr-Xaa-Ser-His-Gly-Xaa-Xaa-Pro-Glu-Xaa-Xaa-Xaa-Glu-Xaa-Ala-Xaa-Xaa-Xaa-Xaa-Xaa-Xaa-Val-Xaa-Xaa-Pro-Asp-Asn-Phe-Tyr-Xaa-Xaa-Val-Ala-Xaa-Xaa-Xaa-Xaa-Xaa | 41% |
| 75% | Formula II:<br>Xaa-Xaa-Xaa-Xaa-Xaa-Xaa-Xaa-Xaa-Phe-Xaa-Glu-Xaa-Gly-Xaa-Xaa-Arg-Lys-Xaa-Cys-Xaa-Xaa-Cys-Gly-Xaa-Xaa-Phe-Trp-Thr-Xaa-Asp-Pro-Asp-Arg-Glu-Thr-Cys-Gly-Asp-Xaa-Pro-Cys-Asp-Xaa-Tyr-Xaa-Phe-Ile-Gly-Xaa-Pro-Xaa-Xaa-Xaa-Xaa-Xaa-Tyr-Xaa-Leu-Xaa-Glu-Xaa-Arg-Glu-Xaa-Phe-Leu-Xaa-Phe-Phe-Glu-Xaa-Xaa-Xaa-His-Xaa-Arg-Xaa-Xaa-Arg-Tyr-Pro-Val-Xaa-Xaa-Arg-Trp-Arg-Asp-Asp-Val-Xaa-Leu-Val-Gly-Ala-Ser-Ile-Xaa-Asp-Phe-Gln-Pro-Trp-Val-Xaa-Ser-Gly-Xaa-Xaa-Xaa-Pro-Pro-Ala-Asn-Pro-Leu-Xaa-Ile-Ser-Gln-Pro-Ser-Ile-Arg-Xaa-Thr-Asp-Xaa-Asp-Asn-Val-Gly-Xaa-Thr-Gly-Arg-His-Xaa-Thr-Xaa-Phe-Glu-Met-Met-Ala-His-His-Ala-Phe-Asn-Xaa-Pro-Xaa-Xaa-Xaa-Tyr-Trp-Xaa-Asp-Glu-Thr-Val-Glu-Xaa-Xaa-Xaa-Phe-Xaa-Thr-Xaa-Xaa-Leu-Xaa-Xaa-Xaa-Xaa-Glu-Xaa-Ile-Thr-Phe-Lys-Glu-Xaa-Xaa-Trp-Xaa-Gly-Gly-Gly-Asn-Ala-Gly-Pro-Xaa-Xaa-Glu-Val-Leu-Xaa-Arg-Gly-Leu-Glu-Val-Ala-Thr-Leu-Val-Phe-Met-Gln-Tyr-Lys-Xaa-Xaa-Xaa-Xaa-Xaa-Xaa-Xaa-Xaa-Xaa-Xaa-Xaa-Xaa-Xaa-Xaa-Gly-Xaa-Xaa-Xaa-Xaa-Pro-Met-Xaa-Xaa-Xaa-Xaa-Val-Asp-Thr-Gly-Tyr-Gly-Leu-Glu-Arg-Xaa-Val-Trp-Xaa-Ser-Xaa-Gly-Thr-Pro-Thr-Ala-Tyr-Asp-Ala-Val-Ala-Xaa-Xaa-Val-Xaa-Xaa-Xaa-Leu-Xaa-Xaa-Xaa-Ala-Gly-Xaa-Xaa-Xaa-Xaa-Xaa-Xaa-Xaa-Ile-Leu-Xaa-Glu-Asn-Ser-Xaa-Leu-Ala-Gly-Xaa-Xaa-Asp-Ile-Glu-Xaa-Xaa-Xaa-Asp-Leu-Xaa-Xaa-Leu-Arg-Xaa-Xaa-Val-Ala-Xaa-Xaa-Xaa-Gly-Ile-Xaa-Xaa-Xaa-Glu-Leu-Xaa-Xaa-Xaa-Xaa-Xaa-Pro-Xaa-Glu-Xaa-Ile-Tyr-Ala-Ile-Ala-Asp-His-Thr-Xaa-Xaa-Leu-Xaa-Phe-Met-Leu-Xaa-Asp-Gly-Val-Xaa-Pro-Ser-Asn-Val-Lys-Ala-Gly-Tyr-Leu-Ala-Arg-Leu-Leu-Ile-Arg-Xaa-Xaa-Xaa-Xaa-Arg-Xaa-Xaa-Xaa-Leu-Gly-Leu-Xaa-Xaa-Pro-Leu-Xaa-Glu-Ile-Xaa-Xaa-Xaa-Xaa-Xaa-Xaa-Leu-Xaa-Xaa-Xaa-Xaa-Pro-Glu-Xaa-Xaa-Glu-Xaa-Xaa-Xaa-Xaa-Ile-Xaa-Xaa-Xaa- | 55% |

TABLE 2-continued

Consensus sequences of archaean AIaRS based on SEQ ID NO: 6

| Threshold of identity | Sequence[1] | Relative amount of conserved positions |
|---|---|---|
| | Xaa-Xaa-Xaa-Glu-Glu-Xaa-Xaa-Tyr-Xaa-Xaa-Thr-Leu-Xaa-Arg-Gly-Xaa-Xaa-Leu-Val-Xaa-Xaa-Xaa-Xaa-Xaa-Xaa-Leu-Lys-Lys-Xaa-Gly-Xaa-Xaa-Glu-Xaa-Pro-Leu-Glu-Xaa-Leu-Xaa-Xaa-Xaa-Tyr-Xaa-Ser-His-Gly-Xaa-Xaa-Pro-Glu-Xaa-Val-Xaa-Glu-Xaa-Ala-Xaa-Xaa-Xaa-Gly-Xaa-Xaa-Val-Xaa-Xaa-Pro-Asp-Asn-Phe-Tyr-Xaa-Leu-Val-Ala-Xaa-Xaa-Xaa-Glu-Xaa-Xaa | |
| 50% | Formula III: | 90% |
| | Met-Xaa-Met-Asp-Met-Xaa-Thr-Arg-Met-Phe-Lys-Glu-Glu-Gly-Trp-Ile-Arg-Lys-Xaa-Cys-Lys-Xaa-Cys-Gly-Lys-Xaa-Phe-Trp-Thr-Leu-Asp-Pro-Asp-Arg-Glu-Thr-Cys-Gly-Asp-Pro-Pro-Cys-Asp-Glu-Tyr-Xaa-Phe-Ile-Gly-Lys-Pro-Gly-Ile-Pro-Lys-Lys-Tyr-Thr-Leu-Xaa-Glu-Met-Arg-Glu-Lys-Phe-Leu-Ser-Phe-Phe-Glu-Xaa-Xaa-Gly-His-Gly-Arg-Val-Lys-Arg-Tyr-Pro-Val-Leu-Pro-Arg-Trp-Arg-Asp-Asp-Val-Leu-Leu-Val-Gly-Ala-Ser-Ile-Met-Asp-Phe-Gln-Pro-Trp-Val-Ile-Ser-Gly-Glu-Ala-Asp-Pro-Pro-Ala-Asn-Pro-Leu-Thr-Ile-Ser-Gln-Pro-Ser-Ile-Arg-Phe-Thr-Asp-Ile-Asp-Asn-Val-Gly-Ile-Thr-Gly-Arg-His-Phe-Thr-Ile-Phe-Glu-Met-Met-Ala-His-His-Ala-Phe-Asn-Tyr-Pro-Gly-Lys-Pro-Ile-Tyr-Trp-Met-Asp-Gly-Thr-Val-Glu-Leu-Ala-Phe-Glu-Phe-Phe-Thr-Lys-Xaa-Leu-Gly-Met-Lys-Pro-Glu-Asp-Ile-Thr-Phe-Lys-Glu-Asn-Pro-Trp-Ala-Gly-Gly-Gly-Asn-Ala-Gly-Pro-Ala-Phe-Glu-Val-Leu-Tyr-Arg-Gly-Leu-Glu-Val-Ala-Thr-Leu-Val-Phe-Met-Gln-Tyr-Lys-Xaa-Ala-Pro-Xaa-Xaa-Ala-Xaa-Xaa-Xaa-Gln-Val-Val-Xaa-Ile-Lys-Gly-Asp-Xaa-Tyr-Val-Pro-Met-Xaa-Thr-Xaa-Val-Val-Asp-Thr-Gly-Tyr-Gly-Leu-Glu-Arg-Leu-Val-Trp-Met-Ser-Gln-Gly-Thr-Pro-Thr-Ala-Tyr-Asp-Ala-Val-Leu-Gly-Tyr-Val-Val-Glu-Pro-Leu-Lys-Xaa-Met-Ala-Gly-Xaa-Glu-Lys-Ile-Asp-Xaa-Xaa-Ile-Leu-Met-Glu-Asn-Ser-Arg-Leu-Ala-Gly-Met-Phe-Asp-Ile-Glu-Asp-Met-Gly-Asp-Leu-Arg-Xaa-Leu-Arg-Xaa-Xaa-Val-Ala-Xaa-Arg-Val-Gly-Ile-Ser-Val-Glu-Glu-Leu-Glu-Xaa-Xaa-Xaa-Arg-Pro-Tyr-Glu-Leu-Ile-Tyr-Ala-Ile-Ala-Asp-His-Thr-Lys-Ala-Leu-Thr-Phe-Met-Leu-Ala-Asp-Gly-Val-Ile-Pro-Ser-Asn-Val-Lys-Ala-Gly-Tyr-Leu-Ala-Arg-Leu-Leu-Ile-Arg-Lys-Ser-Ile-Arg-His-Leu-Arg-Glu-Leu-Gly-Leu-Glu-Xaa-Pro-Leu-Ser-Glu-Ile-Val-Ala-Met-His-Ile-Lys-Glu-Leu-Xaa-Xaa-Thr-Phe-Pro-Glu-Phe-Lys-Glu-Met-Glu-Asp-Val-Ile-Leu-Asp-Ile-Xaa-Xaa-Val-Glu-Glu-Lys-Arg-Tyr-Xaa-Glu-Glu-Thr-Leu-Xaa-Arg-Gly-Ser-Xaa-Leu-Val-Xaa-Arg-Glu-Ile-Xaa-Lys-Leu-Lys-Lys-Xaa-Gly-Xaa-Xaa-Glu-Xaa-Pro-Leu-Glu-Lys-Leu-Ile-Leu-Phe-Tyr-Glu-Ser-His-Gly-Leu-Thr-Pro-Glu-Ile-Val-Xaa-Glu-Ile-Ala-Glu-Lys-Glu-Gly-Xaa-Lys-Val-Xaa-Ile-Pro-Asp-Asn-Phe-Tyr-Ser-Leu-Val-Ala-Lys-Xaa-Ala-Glu-Xaa-Xaa | |

[1]Xaa designates any amino acid

A claimed AibRS may be defined in terms of a consensus sequence, e.g. as a variant of a consensus sequence. A claimed AibRS, which is defined as a variant of a consensus sequence, may be further defined by a specified level of sequence identity between the conserved amino acids (i.e. amino acids not designated Xaa) of the consensus sequence and a reference sequence. In this case it is to be understood that the claimed variant of the consensus sequence may have variation in the conserved amino acid positions to the extent that it falls within the limits set by the specified sequence identity between the consensus sequence and the reference sequence. A non-limiting example of a claimed AibRS, defined as a variant of a consensus sequence, is provided in the following:

A. A 2-Aminoisobutyric acid-tRNA synthetase (AibRS) comprising an amino acid sequence of SEQ ID NO: 7 or a variant hereof, wherein the variant of SEQ ID NO: 7 comprises 215Gly.

B. The AibRS according to claim A; wherein the variant of SEQ ID NO: 7 is a variant of Formula I; wherein Formula I is:

```
Xaa-Xaa-Xaa-Xaa-Xaa-Xaa-Xaa-Xaa-Xaa-Phe-Xaa-Glu-
Xaa-Gly-Xaa-Xaa-Lys-Xaa-Cys-Xaa-Xaa-Cys-Gly-
Xaa-Xaa-Phe-Trp-Thr-Xaa-Xaa-Xaa-Xaa-Arg-Xaa-Xaa-
Cys-Gly-Asp-Xaa-Pro-Cys-Xaa-Xaa-Tyr-Xaa-Phe-Ile-
Gly-Xaa-Pro-Xaa-Xaa-Xaa-Xaa-Xaa-Xaa-Leu-Xaa-
Glu-Xaa-Arg-Xaa-Xaa-Phe-Xaa-Xaa-Phe-Phe-Glu-Xaa-
Xaa-Xaa-His-Xaa-Xaa-Xaa-Xaa-Arg-Tyr-Pro-Val-Xaa-
Xaa-Arg-Trp-Arg-Asp-Asp-Val-Xaa-Leu-Val-Gly-Ala-
Ser-Ile-Xaa-Asp-Phe-Gln-Pro-Trp-Val-Xaa-Xaa-Gly-
Xaa-Xaa-Xaa-Pro-Pro-Ala-Asn-Pro-Leu-Xaa-Ile-Ser-
Gln-Pro-Xaa-Ile-Arg-Xaa-Xaa-Asp-Xaa-Asp-Xaa-Val-
Gly-Xaa-Xaa-Gly-Arg-His-Xaa-Thr-Xaa-Phe-Glu-Met-
Met-Ala-His-His-Ala-Phe-Asn-Xaa-Xaa-Xaa-Xaa-Xaa-
Xaa-Tyr-Trp-Xaa-Xaa-Glu-Thr-Val-Xaa-Xaa-Xaa-Xaa-
Xaa-Phe-Xaa-Xaa-Xaa-Xaa-Xaa-Xaa-Xaa-Xaa-Xaa-
Xaa-Ile-Thr-Phe-Xaa-Glu-Xaa-Xaa-Trp-Xaa-Gly-Gly-
Gly-Asn-Ala-Gly-Xaa-Xaa-Xaa-Glu-Val-Xaa-Xaa-Xaa-
Gly-Xaa-Glu-Xaa-Ala-Thr-Leu-Val-Phe-Met-Xaa-Tyr-
Xaa-Xaa-Xaa-Xaa-Xaa-Xaa-Xaa-Xaa-Xaa-Xaa-
Xaa-Xaa-Xaa-Xaa-Xaa-Xaa-Xaa-Xaa-Pro-Xaa-Xaa-
Xaa-Xaa-Xaa-Val-Asp-Thr-Gly-Tyr-Gly-Leu-Glu-Arg-
Xaa-Xaa-Trp-Xaa-Ser-Xaa-Gly-Xaa-Pro-Thr-Xaa-Tyr-
Asp-Ala-Xaa-Xaa-Xaa-Xaa-Xaa-Xaa-Xaa-Leu-Xaa-
Xaa-Xaa-Ala-Gly-Xaa-Xaa-Xaa-Xaa-Xaa-Xaa-Xaa-
Ile-Leu-Xaa-Xaa-Xaa-Xaa-Xaa-Ala-Gly-Xaa-Xaa-
Asp-Xaa-Xaa-Xaa-Xaa-Xaa-Leu-Xaa-Xaa-Leu-Arg-
Xaa-Xaa-Val-Ala-Xaa-Xaa-Xaa-Xaa-Xaa-Xaa-Xaa-
Glu-Leu-Xaa-Xaa-Xaa-Xaa-Xaa-Pro-Xaa-Glu-Xaa-Xaa-
Tyr-Ala-Ile-Ala-Asp-His-Thr-Xaa-Xaa-Leu-Xaa-Phe-
```

-continued

```
Met-Leu-Xaa-Asp-Gly-Val-Xaa-Pro-Ser-Asn-Xaa-Xaa-
Ala-Gly-Tyr-Leu-Ala-Arg-Leu-Xaa-Ile-Arg-Xaa-Xaa-
Xaa-Arg-Xaa-Xaa-Xaa-Xaa-Leu-Gly-Xaa-Xaa-Xaa-Pro-
Leu-Xaa-Xaa-Ile-Xaa-Xaa-Xaa-Xaa-Xaa-Xaa-Xaa-Xaa-
Xaa-Xaa-Xaa-Xaa-Pro-Glu-Xaa-Xaa-Glu-Xaa-Xaa-Xaa-
Xaa-Xaa-Xaa-Xaa-Xaa-Xaa-Xaa-Xaa-Glu-Glu-Xaa-Xaa-
Xaa-Xaa-Xaa-Thr-Xaa-Xaa-Arg-Gly-Xaa-Xaa-Xaa-Xaa-
Xaa-Xaa-Xaa-Xaa-Xaa-Xaa-Xaa-Lys-Xaa-Xaa-Gly-Xaa-
Xaa-Xaa-Xaa-Pro-Xaa-Xaa-Xaa-Leu-Xaa-Xaa-Xaa-Tyr-
Xaa-Ser-His-Gly-Xaa-Xaa-Pro-Glu-Xaa-Xaa-Xaa-Glu-
Xaa-Ala-Xaa-Xaa-Xaa-Xaa-Xaa-Val-Xaa-Xaa-Pro-
Asp-Asn-Phe-Tyr-Xaa-Xaa-Val-Ala-Xaa-Xaa-Xaa-Xaa-
Xaa-Xaa
``` wherein each Xaa is independently selected and is one or more amino acids, or absent;

wherein the variant of Formula I is at least 90% identical to SEQ ID NO: 7 in positions not designated Xaa.

In this example the claim language of claim B defines the claimed AibRS as a variant of a consensus sequence, i.e. a variant of Formula I. Further, the claim language of claim B defines that the variant of Formula I is at least 90% identical to SEQ ID NO: 7 in positions not designated Xaa, meaning that 10% variation, when compared to SEQ ID NO: 7, is allowed in the conserved amino acids. According to Claim A, on which Claim B depends, position 215 must be Gly. Formula I defines position 215 to be Val, however, since the claimed AibRS of claim B is defined as a variant of Formula I (and not as Formula I as such) variation in the conserved amino acids are allowed as explained above, and hence the claimed variant of Formula I may contain Gly in position 215, and consequently there is no contradiction between Claims A and B.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A 2-Aminoisobutyric acid-tRNA synthetase (AibRS) comprising an amino acid sequence of SEQ ID NO: 7 or a variant thereof and having the function of aminoacylating tRNA with 2-aminoisobutyric acid (Aib), wherein the variant of SEQ ID NO: 7 retains 215Gly and is at least 90% identical to SEQ ID NO: 7.

2. The AibRS according to claim 1, wherein the variant of SEQ ID NO: 7 comprises the following:
    position 192 is selected from Trp, His, Val, Ile, or Leu,
    position 193 is selected from Ala, Leu, Ile, or Gly,
    position 213 is selected from Thr, Ser, Cys, or Ala,
    position 216 is selected from Phe or Trp,
    position 217 is selected from Met, Ile, or Leu,
    position 249 is selected from Thr, Ser, Val, or Phe,
    position 360 is selected from Asn or Ala, and
    position 459 is selected from Glu or Ala.

3. The AibRS according to claim 1, wherein the variant of SEQ ID NO: 7 comprises: [192His; 215Gly]; [192His; 215Gly; 360Ala; 459Ala], [192His; 215Gly; 217Ile; 360Ala; 459Ala], [192His; 215Gly; 217Leu; 360Ala; 459Ala], [192His; 215Gly; 193Leu; 360Ala; 459Ala], [192His; 215Gly; 216Trp; 360Ala; 459Ala], [192His; 215Gly; 193Leu; 216Trp; 360Ala; 459Ala], [192His; 215Gly; 193Ile; 360Ala; 459Ala], [192His; 215Gly; 193Ile; 217Ile; 360Ala; 459Ala], [192His; 215Gly; 193Leu; 217Ile; 360Ala; 459Ala], [192His; 215Gly; 193Ile; 217Leu; 360Ala. 459Ala], [192His; 215Gly; 193Leu; 217Leu; 360Ala; 459Ala], [192Val; 215Gly; 217Ile; 360Ala; 459Ala], [192Ile; 215Gly; 217Ile; 360Ala; 459Ala], [192Leu; 215Gly; 217Ile; 360Ala; 459Ala], [192His; 193Gly; 215Gly; 217Ile; 360Ala; 459Ala], [192His; 213Ser; 215Gly; 360Ala; 459Ala], [192His; 215Gly; 249Ser; 360Ala; 459Ala], [192His; 215Gly; 249Val; 360Ala; 459Ala], [192His; 213Cys; 215Gly; 249Val; 360Ala; 459Ala], or [192His; 213Ala; 215Gly; 249Phe; 360Ala; 459Ala].

4. The AibRS according to claim 3, wherein the variant of SEQ ID NO: 7 is selected from a list consisting of: SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, and SEQ ID NO: 30.

5. The AibRS according to claim 3, wherein the tRNA is a suppressor tRNA.

* * * * *

SEQUENCE LISTING

```
<160> NUMBER OF SEQ ID NOS: 35

<210> SEQ ID NO 1
<211> LENGTH: 915
<212> TYPE: PRT
<213> ORGANISM: Pyrococcus horikoshii

<400> SEQUENCE: 1

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
    130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro Trp
            180                 185                 190

Ala Gly Gly Gly Asn Ala Gly Pro Ala Phe Glu Val Leu Tyr Arg Gly
```

```
                195                 200                 205
Leu Glu Val Ala Thr Leu Val Phe Met Gln Tyr Lys Lys Ala Pro Glu
            210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Glu Pro Leu Lys Lys Met Ala Gly Ile Glu Lys Ile Asp
            275                 280                 285

Glu Lys Ile Leu Met Glu Asn Ser Arg Leu Ala Gly Met Phe Asp Ile
            290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Asn Val Lys Ala Gly Tyr Leu Ala Arg
            355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Lys Gly Ile Lys Glu
            435                 440                 445

Ile Pro Val Glu Lys Leu Val Thr Phe Tyr Glu Ser His Gly Leu Thr
450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg Thr
                485                 490                 495

Lys Glu Glu Lys Gly Glu Glu Leu Val Asp Phe Glu Leu Leu Lys Asp
            500                 505                 510

Leu Pro Asp Thr Arg Arg Leu Tyr Tyr Glu Asp Pro Phe Met Lys Glu
            515                 520                 525

Phe Asp Ala Lys Val Leu Arg Val Ile Lys Asp Trp Val Ile Leu Asp
530                 535                 540

Ala Thr Ala Phe Tyr Pro Glu Gly Gly Gln Pro Tyr Asp Thr Gly
545                 550                 555                 560

Val Leu Ile Val Asn Gly Arg Glu Val Lys Val Thr Asn Val Gln Lys
                565                 570                 575

Val Gly Lys Val Ile Ile His Lys Val Glu Asp Pro Gly Ala Phe Lys
            580                 585                 590

Glu Gly Met Ile Val His Gly Lys Ile Asp Trp Lys Arg Arg Ile Gln
            595                 600                 605

His Met Arg His His Thr Gly Thr His Val Leu Met Gly Ala Leu Val
610                 615                 620
```

```
Arg Val Leu Gly Arg His Val Trp Gln Ala Gly Ser Gln Leu Thr Thr
625                 630                 635                 640

Asp Trp Ala Arg Leu Asp Ile Ser His Tyr Lys Arg Ile Ser Glu Glu
            645                 650                 655

Glu Leu Lys Glu Ile Glu Met Leu Ala Asn Arg Ile Val Met Glu Asp
            660                 665                 670

Arg Lys Val Thr Trp Glu Trp Leu Pro Arg Thr Thr Ala Glu Gln Lys
            675                 680                 685

Tyr Gly Phe Arg Leu Tyr Gln Gly Gly Val Val Pro Gly Arg Glu Ile
690                 695                 700

Arg Val Val Lys Ile Glu Asp Trp Asp Val Gln Ala Cys Gly Gly Thr
705                 710                 715                 720

His Leu Pro Ser Thr Gly Leu Val Gly Pro Ile Lys Ile Leu Arg Thr
                725                 730                 735

Glu Arg Ile Gln Asp Gly Val Glu Arg Ile Phe Ala Cys Gly Glu
                740                 745                 750

Ala Ala Ile Arg Glu Trp Gln Lys Glu Arg Asp Leu Leu Lys Lys Ala
            755                 760                 765

Ser Asn Val Leu Arg Val Pro Pro Glu Lys Leu Pro Glu Thr Ala Glu
770                 775                 780

Arg Phe Phe Asn Glu Trp Lys Glu Ala Arg Lys Glu Val Asp Lys Leu
785                 790                 795                 800

Lys Lys Glu Leu Ala Arg Leu Leu Val Tyr Glu Leu Glu Ser Lys Met
            805                 810                 815

Gln Lys Ile Gly Ser Ile Glu Phe Ile Gly Val Val Glu Gly Ser
            820                 825                 830

Met Glu Asp Leu Arg Glu Leu Val Glu Lys Leu Lys Lys Pro Lys Arg
            835                 840                 845

Val Val Val Leu Ile Ser Arg Asp Gly Tyr Phe Ala Val Ser Val Gly
850                 855                 860

Ser Glu Val Gly Val Glu Ala Asn Glu Leu Ala Lys Lys Ile Thr Leu
865                 870                 875                 880

Ile Ala Gly Gly Gly Gly Gly Arg Arg Asp Ile Ala Gln Gly Lys
                885                 890                 895

Val Lys Asp Ile Ser Lys Ala Lys Asp Val Ile Glu Ser Ile Lys Ser
            900                 905                 910

Met Phe Ser
        915

<210> SEQ ID NO 2
<211> LENGTH: 78
<212> TYPE: DNA
<213> ORGANISM: Pyrococcus horikoshii

<400> SEQUENCE: 2
gggccggtag ctcagcctgg tatgagcgcc gcccttgcaa ggcggaggcc ccgggttcaa     60
atcccggccg gtccacca                                                   78

<210> SEQ ID NO 3
<211> LENGTH: 78
<212> TYPE: DNA
<213> ORGANISM: ARTIFICIAL
<220> FEATURE:
<223> OTHER INFORMATION: polypeptide

<400> SEQUENCE: 3
```

-continued

```
gggccggtag ctcagcctgg tatgagcgcc gccctctaaa ggcggaggcc ccgggttcaa      60
atcccggccg gtccacca                                                    78
```

<210> SEQ ID NO 4
<211> LENGTH: 78
<212> TYPE: DNA
<213> ORGANISM: ARTIFICIAL
<220> FEATURE:
<223> OTHER INFORMATION: polypeptide

<400> SEQUENCE: 4

```
ggaccggtag ctcagcctgg tatgagcgcc gccctctaaa ggcggaggcc ccgggttcaa      60
atcccggccg gtccacca                                                    78
```

<210> SEQ ID NO 5
<211> LENGTH: 149
<212> TYPE: PRT
<213> ORGANISM: ARTIFICIAL
<220> FEATURE:
<223> OTHER INFORMATION: polypeptide
<220> FEATURE:
<221> NAME/KEY: MISC_FEATURE
<222> LOCATION: (3)..(3)
<223> OTHER INFORMATION: Aib

<400> SEQUENCE: 5

```
Met Ser Xaa Val Pro Ile Gln Lys Val Gln Asp Asp Thr Lys Thr Leu
1               5                   10                  15

Ile Lys Thr Ile Val Thr Arg Ile Asn Asp Ile Ser His Thr Gln Ser
            20                  25                  30

Val Ser Ser Lys Gln Lys Val Thr Gly Leu Asp Phe Ile Pro Gly Leu
        35                  40                  45

His Pro Ile Leu Thr Leu Ser Lys Met Asp Gln Thr Leu Ala Val Tyr
    50                  55                  60

Gln Gln Ile Leu Thr Ser Met Pro Ser Arg Asn Val Ile Gln Ile Ser
65                  70                  75                  80

Asn Asp Leu Glu Asn Leu Arg Asp Leu Leu His Val Leu Ala Phe Ser
                85                  90                  95

Lys Ser Cys His Leu Pro Trp Ala Ser Gly Leu Glu Thr Leu Asp Ser
            100                 105                 110

Leu Gly Gly Val Leu Glu Ala Ser Gly Tyr Ser Thr Glu Val Val Ala
        115                 120                 125

Leu Ser Arg Leu Gln Gly Ser Leu Gln Asp Met Leu Trp Gln Leu Asp
    130                 135                 140

Leu Ser Pro Gly Cys
145
```

<210> SEQ ID NO 6
<211> LENGTH: 495
<212> TYPE: PRT
<213> ORGANISM: ARTIFICIAL
<220> FEATURE:
<223> OTHER INFORMATION: polypeptide

<400> SEQUENCE: 6

```
Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30
```

```
Asp Arg Glu Thr Cys Gly Asp Pro Cys Asp Glu Tyr Gln Phe Ile
         35                  40                  45
Gly Lys Pro Gly Ile Pro Arg Lys Tyr Thr Leu Asp Glu Met Arg Glu
 50                  55                  60
Lys Phe Leu Arg Phe Phe Glu Lys His Glu Ile Tyr Pro His Gly Arg
 65                  70                  75                  80
Val Lys Arg Tyr Pro Val Leu Pro Arg Trp Arg Asp Asp Val Leu Leu
                 85                  90                  95
Val Gly Ala Ser Ile Met Asp Phe Gln Pro Trp Val Ile Ser Gly Glu
                100                 105                 110
Ala Asp Pro Pro Ala Asn Pro Leu Val Ile Ser Gln Pro Ser Ile Arg
                115                 120                 125
Phe Thr Asp Ile Asp Asn Val Gly Ile Thr Gly Arg His Phe Thr Ile
        130                 135                 140
Phe Glu Met Met Ala His His Ala Phe Asn Tyr Pro Gly Lys Pro Ile
145                 150                 155                 160
Tyr Trp Met Asp Glu Thr Val Glu Leu Ala Phe Glu Phe Phe Thr Lys
                165                 170                 175
Glu Leu Lys Met Lys Pro Glu Asp Ile Thr Phe Lys Glu Asn Pro Trp
                180                 185                 190
Ala Gly Gly Gly Asn Ala Gly Pro Ala Phe Glu Val Leu Tyr Arg Gly
                195                 200                 205
Leu Glu Val Ala Thr Leu Val Phe Met Gln Tyr Lys Lys Ala Pro Glu
                210                 215                 220
Asn Ala Pro Gln Asp Gln Val Val Ile Lys Gly Glu Lys Tyr Ile
225                 230                 235                 240
Pro Met Glu Thr Lys Val Val Asp Thr Gly Tyr Gly Leu Glu Arg Leu
                245                 250                 255
Val Trp Met Ser Gln Gly Thr Pro Thr Ala Tyr Asp Ala Val Leu Gly
                260                 265                 270
Tyr Val Val Glu Pro Leu Lys Lys Met Ala Gly Ile Glu Lys Ile Asp
                275                 280                 285
Glu Lys Ile Leu Met Glu Asn Ser Arg Leu Ala Gly Met Phe Asp Ile
        290                 295                 300
Glu Asp Leu Gly Asp Leu Arg Tyr Leu Arg Glu Gln Val Ala Lys Arg
305                 310                 315                 320
Val Gly Ile Thr Val Glu Glu Leu Glu Lys Ala Ile Arg Pro Tyr Glu
                325                 330                 335
Leu Ile Tyr Ala Ile Ala Asp His Thr Lys Ala Leu Thr Phe Met Leu
        340                 345                 350
Ala Asp Gly Val Val Pro Ser Asn Val Lys Ala Gly Tyr Leu Ala Arg
                355                 360                 365
Leu Leu Ile Arg Lys Ser Ile Arg His Leu Arg Glu Leu Gly Leu Glu
        370                 375                 380
Val Pro Leu Ser Glu Ile Val Ala Leu His Ile Lys Glu Leu His Lys
385                 390                 395                 400
Thr Phe Pro Glu Phe Lys Glu Met Glu Asp Ile Ile Leu Glu Met Ile
                405                 410                 415
Glu Leu Glu Glu Lys Lys Tyr Ala Glu Thr Leu Arg Arg Gly Ser Asp
                420                 425                 430
Leu Val Arg Arg Glu Ile Ala Lys Leu Lys Lys Gly Ile Lys Glu
        435                 440                 445
Ile Pro Val Glu Lys Leu Val Thr Phe Tyr Glu Ser His Gly Leu Thr
```

```
                450             455             460
Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 7
<211> LENGTH: 495
<212> TYPE: PRT
<213> ORGANISM: ARTIFICIAL
<220> FEATURE:
<223> OTHER INFORMATION: polypeptide

<400> SEQUENCE: 7

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
    50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
    130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro Trp
            180                 185                 190

Ala Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
    210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
    290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
```

```
                     325                 330                 335
Leu Ile Tyr Ala Ile Ala Asp His Thr Lys Ala Leu Thr Phe Met Leu
                340                 345                 350

Ala Asp Gly Val Val Pro Ser Asn Val Lys Ala Gly Tyr Leu Ala Arg
                355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Glu Ser His Gly Leu Thr
            450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 8
<211> LENGTH: 495
<212> TYPE: PRT
<213> ORGANISM: ARTIFICIAL
<220> FEATURE:
<223> OTHER INFORMATION: polypeptide

<400> SEQUENCE: 8

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
        130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro Phe
            180                 185                 190

Ala Gly Gly Gly Asn Ala Gly Pro Ala Phe Glu Val Leu Tyr Arg Gly
```

```
            195                 200                 205
Leu Glu Val Ala Thr Leu Val Phe Met Gln Tyr Lys Lys Ala Pro Glu
    210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Asn Val Lys Ala Gly Tyr Leu Ala Arg
        355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Glu Ser His Gly Leu Thr
450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 9
<211> LENGTH: 495
<212> TYPE: PRT
<213> ORGANISM: ARTIFICIAL
<220> FEATURE:
<223> OTHER INFORMATION: polypeptide

<400> SEQUENCE: 9

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Cys Asp Glu Tyr Gln Phe Ile
                35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
```

-continued

```
                65                  70                  75                  80
Val Lys Arg Tyr Pro Val Leu Pro Arg Trp Arg Asp Asp Val Leu Leu
                        85                  90                  95
Val Gly Ala Ser Ile Met Asp Phe Gln Pro Trp Val Ile Ser Gly Glu
                100                 105                 110
Ala Asp Pro Ala Asn Pro Leu Val Ile Ser Gln Pro Ser Ile Arg
            115                 120                 125
Phe Thr Asp Ile Asp Asn Val Gly Ile Thr Gly Arg His Phe Thr Ile
        130                 135                 140
Phe Glu Met Met Ala His His Ala Phe Asn Tyr Pro Gly Lys Pro Ile
145                 150                 155                 160
Tyr Trp Met Asp Glu Thr Val Glu Leu Ala Phe Glu Phe Thr Lys
                    165                 170                 175
Glu Leu Lys Met Lys Pro Glu Asp Ile Thr Phe Lys Glu Asn Pro His
                180                 185                 190
Ala Gly Gly Gly Asn Ala Gly Pro Ala Phe Glu Val Leu Tyr Arg Gly
                195                 200                 205
Leu Glu Val Ala Thr Leu Val Phe Met Gln Tyr Lys Lys Ala Pro Glu
        210                 215                 220
Asn Ala Pro Gln Asp Gln Val Val Ile Lys Gly Glu Lys Tyr Ile
225                 230                 235                 240
Pro Met Glu Thr Lys Val Val Asp Thr Gly Tyr Gly Leu Glu Arg Leu
                245                 250                 255
Val Trp Met Ser Gln Gly Thr Pro Thr Ala Tyr Asp Ala Val Leu Gly
                260                 265                 270
Tyr Val Val Glu Pro Leu Lys Lys Met Ala Gly Ile Glu Lys Ile Asp
            275                 280                 285
Glu Lys Ile Leu Met Glu Asn Ser Arg Leu Ala Gly Met Phe Asp Ile
        290                 295                 300
Glu Asp Leu Gly Asp Leu Arg Tyr Leu Arg Glu Gln Val Ala Lys Arg
305                 310                 315                 320
Val Gly Ile Thr Val Glu Glu Leu Glu Lys Ala Ile Arg Pro Tyr Glu
                325                 330                 335
Leu Ile Tyr Ala Ile Ala Asp His Thr Lys Ala Leu Thr Phe Met Leu
                340                 345                 350
Ala Asp Gly Val Val Pro Ser Asn Val Lys Ala Gly Tyr Leu Ala Arg
            355                 360                 365
Leu Leu Ile Arg Lys Ser Ile Arg His Leu Arg Glu Leu Gly Leu Glu
        370                 375                 380
Val Pro Leu Ser Glu Ile Val Ala Leu His Ile Lys Glu Leu His Lys
385                 390                 395                 400
Thr Phe Pro Glu Phe Lys Glu Met Glu Asp Ile Ile Leu Glu Met Ile
                405                 410                 415
Glu Leu Glu Glu Lys Lys Tyr Ala Glu Thr Leu Arg Arg Gly Ser Asp
                420                 425                 430
Leu Val Arg Arg Glu Ile Ala Lys Leu Lys Lys Gly Ile Lys Glu
        435                 440                 445
Ile Pro Val Glu Lys Leu Val Thr Phe Tyr Glu Ser His Gly Leu Thr
        450                 455                 460
Pro Glu Ile Val Lys Glu Ile Ala Glu Lys Gly Val Lys Val Asn
465                 470                 475                 480
Ile Pro Asp Asn Phe Tyr Ser Met Val Ala Lys Glu Ala Glu Arg
                485                 490                 495
```

```
<210> SEQ ID NO 10
<211> LENGTH: 495
<212> TYPE: PRT
<213> ORGANISM: ARTIFICIAL
<220> FEATURE:
<223> OTHER INFORMATION: polypeptide

<400> SEQUENCE: 10
```

| | | | | | | | | | | | | | | |
|---|---|---|---|---|---|---|---|---|---|---|---|---|---|---|
| Met | Glu | Phe | Ile | Met | Lys | Thr | Arg | Met | Phe | Glu | Glu | Gly | Trp | Ile |
| 1 | | | | 5 | | | | | 10 | | | | | 15 |
| Arg | Lys | Lys | Cys | Lys | Val | Cys | Gly | Lys | Pro | Phe | Trp | Thr | Leu | Asp | Pro |
| | | | 20 | | | | | 25 | | | | | 30 | | |
| Asp | Arg | Glu | Thr | Cys | Gly | Asp | Pro | Pro | Cys | Asp | Glu | Tyr | Gln | Phe | Ile |
| | | | 35 | | | | | 40 | | | | | 45 | | |
| Gly | Lys | Pro | Gly | Ile | Pro | Arg | Lys | Tyr | Thr | Leu | Asp | Glu | Met | Arg | Glu |
| 50 | | | | | 55 | | | | | 60 | | | | | |
| Lys | Phe | Leu | Arg | Phe | Phe | Glu | Lys | His | Glu | Ile | Tyr | Pro | His | Gly | Arg |
| 65 | | | | | 70 | | | | | 75 | | | | | 80 |
| Val | Lys | Arg | Tyr | Pro | Val | Leu | Pro | Arg | Trp | Arg | Asp | Asp | Val | Leu | Leu |
| | | | | 85 | | | | | 90 | | | | | 95 | |
| Val | Gly | Ala | Ser | Ile | Met | Asp | Phe | Gln | Pro | Trp | Val | Ile | Ser | Gly | Glu |
| | | | | 100 | | | | | 105 | | | | | 110 | |
| Ala | Asp | Pro | Pro | Ala | Asn | Pro | Leu | Val | Ile | Ser | Gln | Pro | Ser | Ile | Arg |
| | | | 115 | | | | | 120 | | | | | 125 | | |
| Phe | Thr | Asp | Ile | Asp | Asn | Val | Gly | Ile | Thr | Gly | Arg | His | Phe | Thr | Ile |
| | 130 | | | | | 135 | | | | | 140 | | | | |
| Phe | Glu | Met | Met | Ala | His | His | Ala | Phe | Asn | Tyr | Pro | Gly | Lys | Pro | Ile |
| 145 | | | | | 150 | | | | | 155 | | | | | 160 |
| Tyr | Trp | Met | Asp | Glu | Thr | Val | Glu | Leu | Ala | Phe | Glu | Phe | Phe | Thr | Lys |
| | | | | 165 | | | | | 170 | | | | | 175 | |
| Glu | Leu | Lys | Met | Lys | Pro | Glu | Asp | Ile | Thr | Phe | Lys | Glu | Asn | Pro | His |
| | | | 180 | | | | | 185 | | | | | 190 | | |
| Ala | Gly | Gly | Asn | Ala | Gly | Pro | Ala | Phe | Glu | Val | Leu | Tyr | Arg | Gly |
| | | | 195 | | | | | 200 | | | | | 205 | | |
| Leu | Glu | Val | Ala | Thr | Leu | Gly | Phe | Met | Gln | Tyr | Lys | Lys | Ala | Pro | Glu |
| | 210 | | | | | 215 | | | | | 220 | | | | |
| Asn | Ala | Pro | Gln | Asp | Gln | Val | Val | Ile | Lys | Gly | Glu | Lys | Tyr | Ile |
| 225 | | | | | 230 | | | | | 235 | | | | | 240 |
| Pro | Met | Glu | Thr | Lys | Val | Val | Asp | Thr | Gly | Tyr | Gly | Leu | Glu | Arg | Leu |
| | | | | 245 | | | | | 250 | | | | | 255 | |
| Val | Trp | Met | Ser | Gln | Gly | Thr | Pro | Thr | Ala | Tyr | Asp | Ala | Val | Leu | Gly |
| | | | 260 | | | | | 265 | | | | | 270 | | |
| Tyr | Val | Val | Glu | Pro | Leu | Lys | Lys | Met | Ala | Gly | Ile | Glu | Lys | Ile | Asp |
| | | 275 | | | | | 280 | | | | | 285 | | | |
| Glu | Lys | Ile | Leu | Met | Glu | Asn | Ser | Arg | Leu | Ala | Gly | Met | Phe | Asp | Ile |
| | 290 | | | | | 295 | | | | | 300 | | | | |
| Glu | Asp | Leu | Gly | Asp | Leu | Arg | Tyr | Leu | Arg | Glu | Gln | Val | Ala | Lys | Arg |
| 305 | | | | | 310 | | | | | 315 | | | | | 320 |
| Val | Gly | Ile | Thr | Val | Glu | Glu | Leu | Glu | Lys | Ala | Ile | Arg | Pro | Tyr | Glu |
| | | | | 325 | | | | | 330 | | | | | 335 | |
| Leu | Ile | Tyr | Ala | Ile | Ala | Asp | His | Thr | Lys | Ala | Leu | Thr | Phe | Met | Leu |
| | | | 340 | | | | | 345 | | | | | 350 | | |
| Ala | Asp | Gly | Val | Val | Pro | Ser | Asn | Val | Lys | Ala | Gly | Tyr | Leu | Ala | Arg |
| | | | 355 | | | | | 360 | | | | | 365 | | |

```
Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Glu Ser His Gly Leu Thr
450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 11
<211> LENGTH: 495
<212> TYPE: PRT
<213> ORGANISM: ARTIFICIAL
<220> FEATURE:
<223> OTHER INFORMATION: polypeptide

<400> SEQUENCE: 11

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
                35                  40                  45

Gly Lys Pro Gly Ile Pro Arg Lys Tyr Thr Leu Asp Glu Met Arg Glu
            50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
    130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Ala Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
    210                 215                 220

Asn Ala Pro Gln Asp Gln Val Val Val Ile Lys Gly Glu Lys Tyr Ile
225                 230                 235                 240
```

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 12
<211> LENGTH: 495
<212> TYPE: PRT
<213> ORGANISM: ARTIFICIAL
<220> FEATURE:
<223> OTHER INFORMATION: polypeptide

<400> SEQUENCE: 12

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Cys Asp Glu Tyr Gln Phe Ile
        35                  40                  45

Gly Lys Pro Gly Ile Pro Arg Lys Tyr Thr Leu Asp Glu Met Arg Glu
50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Ala Gly Gly Asn Ala Gly Pro Ala Phe Glu Val Leu Tyr Arg Gly
            195                 200                 205

Leu Glu Val Ala Thr Leu Gly Phe Ile Gln Tyr Lys Lys Ala Pro Glu
        210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
    370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
450                 455                 460

Pro Glu Ile Val Lys Glu Ile Ala Glu Lys Gly Val Lys Val Asn
                470                 475                 480

Ile Pro Asp Asn Phe Tyr Ser Met Val Ala Lys Glu Ala Glu Arg
            485                 490                 495

<210> SEQ ID NO 13
<211> LENGTH: 495
<212> TYPE: PRT
<213> ORGANISM: ARTIFICIAL
<220> FEATURE:

<223> OTHER INFORMATION: polypeptide

<400> SEQUENCE: 13

```
Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
                165                 170                 175

Glu Leu Lys Met Lys Pro Glu Asp Ile Thr Phe Lys Glu Asn Pro His
                180                 185                 190

Ala Gly Gly Gly Asn Ala Gly Pro Ala Phe Glu Val Leu Tyr Arg Gly
            195                 200                 205

Leu Glu Val Ala Thr Leu Gly Phe Leu Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Glu Pro Leu Lys Lys Met Ala Gly Ile Glu Lys Ile Asp
                275                 280                 285

Glu Lys Ile Leu Met Glu Asn Ser Arg Leu Ala Gly Met Phe Asp Ile
            290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
                355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400
```

```
Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 14
<211> LENGTH: 495
<212> TYPE: PRT
<213> ORGANISM: ARTIFICIAL
<220> FEATURE:
<223> OTHER INFORMATION: polypeptide

<400> SEQUENCE: 14

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Cys Asp Glu Tyr Gln Phe Ile
                35                  40                  45

Gly Lys Pro Gly Ile Pro Arg Lys Tyr Thr Leu Asp Glu Met Arg Glu
50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
        130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Leu Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270
```

```
Tyr Val Val Glu Pro Leu Lys Lys Met Ala Gly Ile Glu Lys Ile Asp
                275                 280                 285

Glu Lys Ile Leu Met Glu Asn Ser Arg Leu Ala Gly Met Phe Asp Ile
            290                 295                 300

Glu Asp Leu Gly Asp Leu Arg Tyr Leu Arg Glu Gln Val Ala Lys Arg
305                 310                 315                 320

Val Gly Ile Thr Val Glu Leu Glu Lys Ala Ile Arg Pro Tyr Glu
                325                 330                 335

Leu Ile Tyr Ala Ile Ala Asp His Thr Lys Ala Leu Thr Phe Met Leu
                340                 345                 350

Ala Asp Gly Val Val Pro Ser Ala Val Lys Ala Gly Tyr Leu Ala Arg
                355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Ala Ser His Gly Leu Thr
                450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 15
<211> LENGTH: 495
<212> TYPE: PRT
<213> ORGANISM: ARTIFICIAL
<220> FEATURE:
<223> OTHER INFORMATION: polypeptide

<400> SEQUENCE: 15

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
    130                 135                 140
```

```
Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
            165                 170                 175

Glu Leu Lys Met Lys Pro Glu Asp Ile Thr Phe Lys Glu Asn Pro His
            180                 185                 190

Ala Gly Gly Asn Ala Gly Pro Ala Phe Glu Val Leu Tyr Arg Gly
            195                 200                 205

Leu Glu Val Ala Thr Leu Gly Trp Met Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
            245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
            275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Leu Glu Lys Ala Ile Arg Pro Tyr Glu
            325                 330                 335

Leu Ile Tyr Ala Ile Asp His Thr Lys Ala Leu Thr Phe Met Leu
            340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
            405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Ala Ser His Gly Leu Thr
450                 455                 460

Pro Glu Ile Val Lys Glu Ile Ala Glu Lys Gly Val Lys Val Asn
465                 470                 475                 480

Ile Pro Asp Asn Phe Tyr Ser Met Val Ala Lys Glu Ala Glu Arg
            485                 490                 495

<210> SEQ ID NO 16
<211> LENGTH: 495
<212> TYPE: PRT
<213> ORGANISM: ARTIFICIAL
<220> FEATURE:
<223> OTHER INFORMATION: polypeptide

<400> SEQUENCE: 16

Met Glu Phe Ile Met Lys Thr Arg Met Phe Glu Glu Glu Gly Trp Ile
1               5                   10                  15
```

```
Arg Lys Lys Cys Lys Val Cys Gly Lys Pro Phe Trp Thr Leu Asp Pro
             20                  25                  30

Asp Arg Glu Thr Cys Gly Asp Pro Pro Cys Asp Glu Tyr Gln Phe Ile
         35                  40                  45

Gly Lys Pro Gly Ile Pro Arg Lys Tyr Thr Leu Asp Glu Met Arg Glu
     50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                 85                  90                  95

Val Gly Ala Ser Ile Met Asp Phe Gln Pro Trp Val Ile Ser Gly Glu
             100                 105                 110

Ala Asp Pro Pro Ala Asn Pro Leu Val Ile Ser Gln Pro Ser Ile Arg
             115                 120                 125

Phe Thr Asp Ile Asp Asn Val Gly Ile Thr Gly Arg His Phe Thr Ile
             130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                 165                 170                 175

Glu Leu Lys Met Lys Pro Glu Asp Ile Thr Phe Lys Glu Asn Pro His
             180                 185                 190

Leu Gly Gly Gly Asn Ala Gly Pro Ala Phe Glu Val Leu Tyr Arg Gly
             195                 200                 205

Leu Glu Val Ala Thr Leu Gly Trp Met Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                 245                 250                 255

Val Trp Met Ser Gln Gly Thr Pro Thr Ala Tyr Asp Ala Val Leu Gly
             260                 265                 270

Tyr Val Val Glu Pro Leu Lys Lys Met Ala Gly Ile Glu Lys Ile Asp
             275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                 325                 330                 335

Leu Ile Tyr Ala Ile Ala Asp His Thr Lys Ala Leu Thr Phe Met Leu
             340                 345                 350

Ala Asp Gly Val Val Pro Ser Ala Val Lys Ala Gly Tyr Leu Ala Arg
             355                 360                 365

Leu Leu Ile Arg Lys Ser Ile Arg His Leu Arg Glu Leu Gly Leu Glu
             370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                 405                 410                 415

Glu Leu Glu Glu Lys Lys Tyr Ala Glu Thr Leu Arg Arg Gly Ser Asp
             420                 425                 430

Leu Val Arg Arg Glu Ile Ala Lys Leu Lys Lys Lys Gly Ile Lys Glu
```

```
                  435                 440                 445
Ile Pro Val Glu Lys Leu Val Thr Phe Tyr Ala Ser His Gly Leu Thr
            450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 17
<211> LENGTH: 495
<212> TYPE: PRT
<213> ORGANISM: ARTIFICIAL
<220> FEATURE:
<223> OTHER INFORMATION: polypeptide

<400> SEQUENCE: 17

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Ile Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
```

```
            305                 310                 315                 320
Val Gly Ile Thr Val Glu Glu Leu Glu Lys Ala Ile Arg Pro Tyr Glu
                    325                 330                 335

Leu Ile Tyr Ala Ile Ala Asp His Thr Lys Ala Leu Thr Phe Met Leu
                340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
        370                 375                 380

Val Pro Leu Ser Glu Ile Val Ala Leu His Ile Lys Glu Leu His Lys
385                 390                 395                 400

Thr Phe Pro Glu Phe Lys Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
        450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 18
<211> LENGTH: 495
<212> TYPE: PRT
<213> ORGANISM: ARTIFICIAL
<220> FEATURE:
<223> OTHER INFORMATION: polypeptide

<400> SEQUENCE: 18

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
        130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
```

```
                180             185             190
Ile Gly Gly Gly Asn Ala Gly Pro Ala Phe Glu Val Leu Tyr Arg Gly
            195             200             205

Leu Glu Val Ala Thr Leu Gly Phe Ile Gln Tyr Lys Lys Ala Pro Glu
    210             215             220

Asn Ala Pro Gln Asp Gln Val Val Ile Lys Gly Glu Lys Tyr Ile
225             230             235             240

Pro Met Glu Thr Lys Val Val Asp Thr Gly Tyr Gly Leu Glu Arg Leu
                245             250             255

Val Trp Met Ser Gln Gly Thr Pro Thr Ala Tyr Asp Ala Val Leu Gly
            260             265             270

Tyr Val Glu Pro Leu Lys Lys Met Ala Gly Ile Glu Lys Ile Asp
            275             280             285

Glu Lys Ile Leu Met Glu Asn Ser Arg Leu Ala Gly Met Phe Asp Ile
            290             295             300

Glu Asp Leu Gly Asp Leu Arg Tyr Leu Arg Glu Gln Val Ala Lys Arg
305             310             315             320

Val Gly Ile Thr Val Glu Glu Leu Glu Lys Ala Ile Arg Pro Tyr Glu
                325             330             335

Leu Ile Tyr Ala Ile Ala Asp His Thr Lys Ala Leu Thr Phe Met Leu
                340             345             350

Ala Asp Gly Val Val Pro Ser Ala Val Lys Ala Gly Tyr Leu Ala Arg
                355             360             365

Leu Leu Ile Arg Lys Ser Ile Arg His Leu Arg Glu Leu Gly Leu Glu
            370             375             380

Val Pro Leu Ser Glu Ile Val Ala Leu His Ile Lys Glu Leu His Lys
385             390             395             400

Thr Phe Pro Glu Phe Lys Glu Met Glu Asp Ile Ile Leu Glu Met Ile
                405             410             415

Glu Leu Glu Glu Lys Lys Tyr Ala Glu Thr Leu Arg Arg Gly Ser Asp
                420             425             430

Leu Val Arg Arg Glu Ile Ala Lys Leu Lys Lys Gly Ile Lys Glu
            435             440             445

Ile Pro Val Glu Lys Leu Val Thr Phe Tyr Ala Ser His Gly Leu Thr
            450             455             460

Pro Glu Ile Val Lys Glu Ile Ala Glu Lys Gly Val Lys Val Asn
465             470             475             480

Ile Pro Asp Asn Phe Tyr Ser Met Val Ala Lys Glu Ala Glu Arg
                485             490             495

<210> SEQ ID NO 19
<211> LENGTH: 495
<212> TYPE: PRT
<213> ORGANISM: ARTIFICIAL
<220> FEATURE:
<223> OTHER INFORMATION: polypeptide

<400> SEQUENCE: 19

Met Glu Phe Ile Met Lys Thr Arg Met Phe Glu Glu Glu Gly Trp Ile
1               5               10              15

Arg Lys Lys Cys Lys Val Cys Gly Lys Pro Phe Trp Thr Leu Asp Pro
            20              25              30

Asp Arg Glu Thr Cys Gly Asp Pro Pro Cys Asp Glu Tyr Gln Phe Ile
            35              40              45

Gly Lys Pro Gly Ile Pro Arg Lys Tyr Thr Leu Asp Glu Met Arg Glu
```

```
                50                  55                  60
Lys Phe Leu Arg Phe Phe Glu Lys His Glu Ile Tyr Pro His Gly Arg
 65                  70                  75                  80

Val Lys Arg Tyr Pro Val Leu Pro Arg Trp Arg Asp Asp Val Leu Leu
                 85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
                115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
                180                 185                 190

Leu Gly Gly Gly Asn Ala Gly Pro Ala Phe Glu Val Leu Tyr Arg Gly
                195                 200                 205

Leu Glu Val Ala Thr Leu Gly Phe Ile Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
                260                 265                 270

Tyr Val Glu Pro Leu Lys Lys Met Ala Gly Ile Glu Lys Ile Asp
                275                 280                 285

Glu Lys Ile Leu Met Glu Asn Ser Arg Leu Ala Gly Met Phe Asp Ile
                290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
                340                 345                 350

Ala Asp Gly Val Val Pro Ser Ala Val Lys Ala Gly Tyr Leu Ala Arg
                355                 360                 365

Leu Leu Ile Arg Lys Ser Ile Arg His Leu Arg Glu Leu Gly Leu Glu
                370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
                435                 440                 445

Ile Pro Val Glu Lys Leu Val Thr Phe Tyr Ala Ser His Gly Leu Thr
                450                 455                 460

Pro Glu Ile Val Lys Glu Ile Ala Glu Lys Glu Gly Val Lys Val Asn
465                 470                 475                 480
```

```
Ile Pro Asp Asn Phe Tyr Ser Met Val Ala Lys Glu Ala Glu Arg
            485                 490                 495
```

<210> SEQ ID NO 20
<211> LENGTH: 495
<212> TYPE: PRT
<213> ORGANISM: ARTIFICIAL
<220> FEATURE:
<223> OTHER INFORMATION: polypeptide

<400> SEQUENCE: 20

```
Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65              70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
130             135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
                165                 170                 175

Glu Leu Lys Met Lys Pro Glu Asp Ile Thr Phe Lys Glu Asn Pro His
            180                 185                 190

Ile Gly Gly Gly Asn Ala Gly Pro Ala Phe Glu Val Leu Tyr Arg Gly
        195                 200                 205

Leu Glu Val Ala Thr Leu Gly Phe Leu Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
    290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350
```

```
Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
    370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Ala Ser His Gly Leu Thr
            450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 21
<211> LENGTH: 495
<212> TYPE: PRT
<213> ORGANISM: ARTIFICIAL
<220> FEATURE:
<223> OTHER INFORMATION: polypeptide

<400> SEQUENCE: 21

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
    50                  55                  60

Lys Phe Leu Arg Phe Phe Glu Lys His Glu Ile Tyr Pro His Gly Arg
65              70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
                165                 170                 175

Glu Leu Lys Met Lys Pro Glu Asp Ile Thr Phe Lys Glu Asn Pro His
                180                 185                 190

Leu Gly Gly Gly Asn Ala Gly Pro Ala Phe Glu Val Leu Tyr Arg Gly
            195                 200                 205

Leu Glu Val Ala Thr Leu Gly Phe Leu Gln Tyr Lys Lys Ala Pro Glu
        210                 215                 220
```

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
435                 440                 445

Ile Pro Val Glu Lys Leu Val Thr Phe Tyr Ala Ser His Gly Leu Thr
450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 22
<211> LENGTH: 495
<212> TYPE: PRT
<213> ORGANISM: ARTIFICIAL
<220> FEATURE:
<223> OTHER INFORMATION: polypeptide

<400> SEQUENCE: 22

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Tyr Thr Leu Asp Glu Met Arg Glu
        50                  55                  60

Lys Phe Leu Arg Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
            130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
                165                 170                 175

Glu Leu Lys Met Lys Pro Glu Asp Ile Thr Phe Lys Glu Asn Pro Val
            180                 185                 190

Ala Gly Gly Asn Ala Gly Pro Ala Phe Glu Val Leu Tyr Arg Gly
            195                 200                 205

Leu Glu Val Ala Thr Leu Gly Phe Ile Gln Tyr Lys Lys Ala Pro Glu
            210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Glu Pro Leu Lys Lys Met Ala Gly Ile Glu Lys Ile Asp
            275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
                340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
435                 440                 445

Ile Pro Val Glu Lys Leu Val Thr Phe Tyr Ala Ser His Gly Leu Thr
            450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 23
<211> LENGTH: 495

<212> TYPE: PRT
<213> ORGANISM: ARTIFICIAL
<220> FEATURE:
<223> OTHER INFORMATION: polypeptide

<400> SEQUENCE: 23

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Pro Cys Asp Glu Tyr Gln Phe Ile
                35                  40                  45

Gly Lys Pro Gly Ile Pro Arg Lys Tyr Thr Leu Asp Glu Met Arg Glu
50                  55                  60

Lys Phe Leu Arg Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Gly Asn Pro Ile
            180                 185                 190

Ala Gly Gly Gly Asn Ala Gly Pro Ala Phe Glu Val Leu Tyr Arg Gly
        195                 200                 205

Leu Glu Val Ala Thr Leu Gly Phe Ile Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
            405                 410                 415

Glu Leu Glu Glu Lys Lys Tyr Ala Glu Thr Leu Arg Arg Gly Ser Asp
        420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
    450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
            485                 490                 495

<210> SEQ ID NO 24
<211> LENGTH: 495
<212> TYPE: PRT
<213> ORGANISM: ARTIFICIAL
<220> FEATURE:
<223> OTHER INFORMATION: polypeptide

<400> SEQUENCE: 24

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
    50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
    130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro Leu
            180                 185                 190

Ala Gly Gly Gly Asn Ala Gly Pro Ala Phe Glu Val Leu Tyr Arg Gly
    195                 200                 205

Leu Glu Val Ala Thr Leu Gly Phe Ile Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

```
Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
            275                 280                 285

Glu Lys Ile Leu Met Glu Asn Ser Arg Leu Ala Gly Met Phe Asp Ile
            290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
            370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
            435                 440                 445

Ile Pro Val Glu Lys Leu Val Thr Phe Tyr Ala Ser His Gly Leu Thr
450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 25
<211> LENGTH: 495
<212> TYPE: PRT
<213> ORGANISM: ARTIFICIAL
<220> FEATURE:
<223> OTHER INFORMATION: polypeptide

<400> SEQUENCE: 25

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
            115                 120                 125
```

Phe Thr Asp Ile Asp Asn Val Gly Ile Thr Gly Arg His Phe Thr Ile
            130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Gly Gly Gly Gly Asn Ala Gly Pro Ala Phe Glu Val Leu Tyr Arg Gly
            195                 200                 205

Leu Glu Val Ala Thr Leu Gly Phe Ile Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
            275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
435                 440                 445

Ile Pro Val Glu Lys Leu Val Thr Phe Tyr Ala Ser His Gly Leu Thr
450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 26
<211> LENGTH: 495
<212> TYPE: PRT
<213> ORGANISM: ARTIFICIAL
<220> FEATURE:
<223> OTHER INFORMATION: polypeptide

<400> SEQUENCE: 26

-continued

```
Met Glu Phe Ile Met Lys Thr Arg Met Phe Glu Glu Gly Trp Ile
 1               5                  10                  15

Arg Lys Lys Cys Lys Val Cys Gly Lys Pro Phe Trp Thr Leu Asp Pro
            20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
     50                  55                  60

Lys Phe Leu Arg Phe Glu Lys His Glu Ile Tyr Pro His Gly Arg
 65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
            130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
                180                 185                 190

Ala Gly Gly Gly Asn Ala Gly Pro Ala Phe Glu Val Leu Tyr Arg Gly
                195                 200                 205

Leu Glu Val Ala Ser Leu Gly Phe Met Gln Tyr Lys Lys Ala Pro Glu
    210                 215                 220

Asn Ala Pro Gln Asp Gln Val Val Ile Lys Gly Glu Lys Tyr Ile
225                 230                 235                 240

Pro Met Glu Thr Lys Val Val Asp Thr Gly Tyr Gly Leu Glu Arg Leu
                245                 250                 255

Val Trp Met Ser Gln Gly Thr Pro Thr Ala Tyr Asp Ala Val Leu Gly
                260                 265                 270

Tyr Val Glu Pro Leu Lys Lys Met Ala Gly Ile Glu Lys Ile Asp
    275                 280                 285

Glu Lys Ile Leu Met Glu Asn Ser Arg Leu Ala Gly Met Phe Asp Ile
            290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
    370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
```

```
                420           425           430
Leu Val Arg Arg Glu Ile Ala Lys Leu Lys Lys Gly Ile Lys Glu
            435                 440                 445

Ile Pro Val Glu Lys Leu Val Thr Phe Tyr Ala Ser His Gly Leu Thr
        450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 27
<211> LENGTH: 495
<212> TYPE: PRT
<213> ORGANISM: ARTIFICIAL
<220> FEATURE:
<223> OTHER INFORMATION: polypeptide

<400> SEQUENCE: 27

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Cys Asp Glu Tyr Gln Phe Ile
        35                  40                  45

Gly Lys Pro Gly Ile Pro Arg Lys Tyr Thr Leu Asp Glu Met Arg Glu
    50                  55                  60

Lys Phe Leu Arg Phe Glu Lys His Glu Ile Tyr Pro His Gly Arg
65              70                  75                  80

Val Lys Arg Tyr Pro Val Leu Pro Arg Trp Arg Asp Asp Val Leu Leu
            85                  90                  95

Val Gly Ala Ser Ile Met Asp Phe Gln Pro Trp Val Ile Ser Gly Glu
        100                 105                 110

Ala Asp Pro Pro Ala Asn Pro Leu Val Ile Ser Gln Pro Ser Ile Arg
            115                 120                 125

Phe Thr Asp Ile Asp Asn Val Gly Ile Thr Gly Arg His Phe Thr Ile
        130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Ala Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
210                 215                 220

Asn Ala Pro Gln Asp Gln Val Val Ile Lys Gly Gly Lys Tyr Ile
225                 230                 235                 240

Pro Met Glu Thr Lys Val Val Asp Ser Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
```

```
            290                 295                 300
Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
                340                 345                 350

Ala Asp Gly Val Val Pro Ser Ala Val Lys Ala Gly Tyr Leu Ala Arg
                355                 360                 365

Leu Leu Ile Arg Lys Ser Ile Arg His Leu Arg Glu Leu Gly Leu Glu
                370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
                420                 425                 430

Leu Val Arg Arg Glu Ile Ala Lys Leu Lys Lys Gly Ile Lys Glu
                435                 440                 445

Ile Pro Val Glu Lys Leu Val Thr Phe Tyr Ala Ser His Gly Leu Thr
                450                 455                 460

Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 28
<211> LENGTH: 495
<212> TYPE: PRT
<213> ORGANISM: ARTIFICIAL
<220> FEATURE:
<223> OTHER INFORMATION: polypeptide

<400> SEQUENCE: 28

Met Glu Phe Ile Met Lys Thr Arg Met Phe Glu Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
                35                  40                  45

Gly Lys Pro Gly Ile Pro Arg Lys Tyr Thr Leu Asp Glu Met Arg Glu
50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
                100                 105                 110

Ala Asp Pro Pro Ala Asn Pro Leu Val Ile Ser Gln Pro Ser Ile Arg
                115                 120                 125

Phe Thr Asp Ile Asp Asn Val Gly Ile Thr Gly Arg His Phe Thr Ile
                130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
```

```
                165                 170                 175
Glu Leu Lys Met Lys Pro Glu Asp Ile Thr Phe Lys Glu Asn Pro His
            180                 185                 190

Ala Gly Gly Gly Asn Ala Gly Pro Ala Phe Glu Val Leu Tyr Arg Gly
        195                 200                 205

Leu Glu Val Ala Thr Leu Gly Phe Met Gln Tyr Lys Lys Ala Pro Glu
    210                 215                 220

Asn Ala Pro Gln Asp Gln Val Val Ile Lys Gly Glu Lys Tyr Ile
225                 230                 235                 240

Pro Met Glu Thr Lys Val Val Asp Val Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
    290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
    370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
    435                 440                 445

Ile Pro Val Glu Lys Leu Val Thr Phe Tyr Ala Ser His Gly Leu Thr
    450                 455                 460

Pro Glu Ile Val Lys Glu Ile Ala Glu Lys Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 29
<211> LENGTH: 495
<212> TYPE: PRT
<213> ORGANISM: ARTIFICIAL
<220> FEATURE:
<223> OTHER INFORMATION: polypeptide

<400> SEQUENCE: 29

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
            20                  25                  30

Asp Arg Glu Thr Cys Gly Asp Pro Pro Cys Asp Glu Tyr Gln Phe Ile
```

```
                35                  40                  45
Gly Lys Pro Gly Ile Pro Arg Lys Tyr Thr Leu Asp Glu Met Arg Glu
 50                  55                  60

Lys Phe Leu Arg Phe Phe Glu Lys His Glu Ile Tyr Pro His Gly Arg
 65                  70                  75                  80

Val Lys Arg Tyr Pro Val Leu Pro Arg Trp Arg Asp Asp Val Leu Leu
                 85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
    130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Phe Thr Lys
                165                 170                 175

Glu Leu Lys Met Lys Pro Glu Asp Ile Thr Phe Lys Glu Asn Pro His
            180                 185                 190

Ala Gly Gly Gly Asn Ala Gly Pro Ala Phe Glu Val Leu Tyr Arg Gly
        195                 200                 205

Leu Glu Val Ala Cys Leu Gly Phe Met Gln Tyr Lys Lys Ala Pro Glu
    210                 215                 220

Asn Ala Pro Gln Asp Gln Val Val Ile Lys Gly Glu Lys Tyr Ile
225                 230                 235                 240

Pro Met Glu Thr Lys Val Val Asp Val Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
    290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335

Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
        355                 360                 365

Leu Leu Ile Arg Lys Ser Ile Arg His Leu Arg Glu Leu Gly Leu Glu
    370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
    450                 455                 460
```

```
Pro Glu Ile Val Lys Glu Ile Ala Glu Lys Glu Gly Val Lys Val Asn
465                 470                 475                 480

Ile Pro Asp Asn Phe Tyr Ser Met Val Ala Lys Glu Ala Glu Arg
            485                 490                 495

<210> SEQ ID NO 30
<211> LENGTH: 495
<212> TYPE: PRT
<213> ORGANISM: ARTIFICIAL
<220> FEATURE:
<223> OTHER INFORMATION: polypeptide

<400> SEQUENCE: 30

Met Glu Phe Ile Met Lys Thr Arg Met Phe Glu Glu Gly Trp Ile
1               5                   10                  15

Arg Lys Lys Cys Lys Val Cys Gly Lys Pro Phe Trp Thr Leu Asp Pro
                20                  25                  30

Asp Arg Glu Thr Cys Gly Asp Pro Cys Asp Glu Tyr Gln Phe Ile
            35                  40                  45

Gly Lys Pro Gly Ile Pro Arg Lys Tyr Thr Leu Asp Glu Met Arg Glu
        50                  55                  60

Lys Phe Leu Arg Phe Phe Glu Lys His Glu Ile Tyr Pro His Gly Arg
65                  70                  75                  80

Val Lys Arg Tyr Pro Val Leu Pro Arg Trp Arg Asp Asp Val Leu Leu
                85                  90                  95

Val Gly Ala Ser Ile Met Asp Phe Gln Pro Trp Val Ile Ser Gly Glu
            100                 105                 110

Ala Asp Pro Pro Ala Asn Pro Leu Val Ile Ser Gln Pro Ser Ile Arg
        115                 120                 125

Phe Thr Asp Ile Asp Asn Val Gly Ile Thr Gly Arg His Phe Thr Ile
130                 135                 140

Phe Glu Met Met Ala His His Ala Phe Asn Tyr Pro Gly Lys Pro Ile
145                 150                 155                 160

Tyr Trp Met Asp Glu Thr Val Glu Leu Ala Phe Glu Phe Thr Lys
                165                 170                 175

Glu Leu Lys Met Lys Pro Glu Asp Ile Thr Phe Lys Glu Asn Pro His
            180                 185                 190

Ala Gly Gly Gly Asn Ala Gly Pro Ala Phe Glu Val Leu Tyr Arg Gly
        195                 200                 205

Leu Glu Val Ala Ala Leu Gly Phe Met Gln Tyr Lys Lys Ala Pro Glu
210                 215                 220

Asn Ala Pro Gln Asp Gln Val Val Ile Lys Gly Glu Lys Tyr Ile
225                 230                 235                 240

Pro Met Glu Thr Lys Val Val Asp Phe Gly Tyr Gly Leu Glu Arg Leu
                245                 250                 255

Val Trp Met Ser Gln Gly Thr Pro Thr Ala Tyr Asp Ala Val Leu Gly
            260                 265                 270

Tyr Val Val Glu Pro Leu Lys Lys Met Ala Gly Ile Glu Lys Ile Asp
        275                 280                 285

Glu Lys Ile Leu Met Glu Asn Ser Arg Leu Ala Gly Met Phe Asp Ile
290                 295                 300

Glu Asp Leu Gly Asp Leu Arg Tyr Leu Arg Glu Gln Val Ala Lys Arg
305                 310                 315                 320

Val Gly Ile Thr Val Glu Glu Leu Glu Lys Ala Ile Arg Pro Tyr Glu
                325                 330                 335
```

-continued

```
Leu Ile Tyr Ala Ile Ala Asp His Thr Lys Ala Leu Thr Phe Met Leu
            340                 345                 350

Ala Asp Gly Val Val Pro Ser Ala Val Lys Ala Gly Tyr Leu Ala Arg
            355                 360                 365

Leu Leu Ile Arg Lys Ser Ile Arg His Leu Arg Glu Leu Gly Leu Glu
        370                 375                 380

Val Pro Leu Ser Glu Ile Val Ala Leu His Ile Lys Glu Leu His Lys
385                 390                 395                 400

Thr Phe Pro Glu Phe Lys Glu Met Glu Asp Ile Ile Leu Glu Met Ile
                405                 410                 415

Glu Leu Glu Glu Lys Lys Tyr Ala Glu Thr Leu Arg Arg Gly Ser Asp
            420                 425                 430

Leu Val Arg Arg Glu Ile Ala Lys Leu Lys Lys Gly Ile Lys Glu
        435                 440                 445

Ile Pro Val Glu Lys Leu Val Thr Phe Tyr Ala Ser His Gly Leu Thr
    450                 455                 460

Pro Glu Ile Val Lys Glu Ile Ala Lys Glu Gly Val Lys Val Asn
465                 470                 475                 480

Ile Pro Asp Asn Phe Tyr Ser Met Val Ala Lys Glu Ala Glu Arg
                485                 490                 495

<210> SEQ ID NO 31
<211> LENGTH: 75
<212> TYPE: PRT
<213> ORGANISM: ARTIFICIAL
<220> FEATURE:
<223> OTHER INFORMATION: polypeptide
<220> FEATURE:
<221> NAME/KEY: MISC_FEATURE
<222> LOCATION: (46)..(46)
<223> OTHER INFORMATION: Aib

<400> SEQUENCE: 31

Met His Lys Ser Ser Pro Gln Gly Pro Asp Arg Leu Leu Ile Arg Leu
1               5                   10                  15

Arg His Leu Ile Asp Ile Val Glu Ser Lys Ser Arg Ser Lys Ser Arg
            20                  25                  30

Ala Ser Gly Ser Asp Val Lys Asp Asp Gly Asp Arg His Xaa Glu Gly
        35                  40                  45

Thr Phe Thr Ser Asp Val Ser Ser Tyr Leu Glu Gly Gln Ala Ala Lys
    50                  55                  60

Glu Phe Ile Ala Trp Leu Val Arg Gly Arg Gly
65                  70                  75

<210> SEQ ID NO 32
<211> LENGTH: 31
<212> TYPE: PRT
<213> ORGANISM: ARTIFICIAL
<220> FEATURE:
<223> OTHER INFORMATION: polypeptide
<220> FEATURE:
<221> NAME/KEY: MISC_FEATURE
<222> LOCATION: (2)..(2)
<223> OTHER INFORMATION: Aib

<400> SEQUENCE: 32

His Xaa Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30
```

-continued

```
<210> SEQ ID NO 33
<211> LENGTH: 494
<212> TYPE: PRT
<213> ORGANISM: ARTIFICIAL
<220> FEATURE:
<223> OTHER INFORMATION: Formula I
<220> FEATURE:
<221> NAME/KEY: MISC_FEATURE
<222> LOCATION: (1)..(494)
<223> OTHER INFORMATION: Xaa represents any amino acid

<400> SEQUENCE: 33

Xaa Xaa Xaa Xaa Xaa Xaa Xaa Xaa Xaa Phe Xaa Glu Xaa Gly Xaa Xaa
 1               5                  10                  15

Xaa Lys Xaa Cys Xaa Xaa Cys Gly Xaa Xaa Phe Trp Thr Xaa Xaa Xaa
            20                  25                  30

Xaa Arg Xaa Xaa Cys Gly Asp Xaa Pro Cys Xaa Xaa Tyr Xaa Phe Ile
        35                  40                  45

Gly Xaa Pro Xaa Xaa Xaa Xaa Xaa Xaa Leu Xaa Glu Xaa Arg Xaa
    50                  55                  60

Xaa Phe Xaa Xaa Phe Phe Glu Xaa Xaa Xaa His Xaa Xaa Xaa Xaa Arg
65                  70                  75                  80

Tyr Pro Val Xaa Xaa Arg Trp Arg Asp Asp Val Xaa Leu Val Gly Ala
                85                  90                  95

Ser Ile Xaa Asp Phe Gln Pro Trp Val Xaa Xaa Gly Xaa Xaa Xaa Pro
            100                 105                 110

Pro Ala Asn Pro Leu Xaa Ile Ser Gln Pro Xaa Ile Arg Xaa Xaa Asp
            115                 120                 125

Xaa Asp Xaa Val Gly Xaa Xaa Gly Arg His Xaa Thr Xaa Phe Glu Met
    130                 135                 140

Met Ala His His Ala Phe Asn Xaa Xaa Xaa Xaa Xaa Xaa Tyr Trp Xaa
145                 150                 155                 160

Xaa Glu Thr Val Xaa Xaa Xaa Xaa Xaa Phe Xaa Xaa Xaa Xaa Xaa
                165                 170                 175

Xaa Xaa Xaa Xaa Xaa Ile Thr Phe Xaa Glu Xaa Xaa Trp Xaa Gly Gly
            180                 185                 190

Gly Asn Ala Gly Xaa Xaa Xaa Glu Val Xaa Xaa Xaa Gly Xaa Glu Xaa
            195                 200                 205

Ala Thr Leu Val Phe Met Xaa Tyr Xaa Xaa Xaa Xaa Xaa Xaa Xaa Xaa
            210                 215                 220

Xaa Xaa Xaa Xaa Xaa Xaa Xaa Xaa Xaa Xaa Xaa Pro Xaa Xaa
225                 230                 235                 240

Xaa Xaa Xaa Val Asp Thr Gly Tyr Gly Leu Glu Arg Xaa Xaa Trp Xaa
            245                 250                 255

Ser Xaa Gly Xaa Pro Thr Xaa Tyr Asp Ala Xaa Xaa Xaa Xaa Xaa
    260                 265                 270

Xaa Xaa Leu Xaa Xaa Xaa Ala Gly Xaa Xaa Xaa Xaa Xaa Xaa
        275                 280                 285

Ile Leu Xaa Xaa Xaa Xaa Xaa Ala Gly Xaa Xaa Asp Xaa Xaa Xaa
    290                 295                 300

Xaa Xaa Xaa Leu Xaa Xaa Leu Arg Xaa Xaa Val Ala Xaa Xaa Xaa Xaa
305                 310                 315                 320

Xaa Xaa Xaa Xaa Glu Leu Xaa Xaa Xaa Xaa Pro Xaa Glu Xaa Xaa
                325                 330                 335

Tyr Ala Ile Ala Asp His Thr Xaa Xaa Leu Xaa Phe Met Leu Xaa Asp
```

```
                340             345             350
Gly Val Xaa Pro Ser Asn Xaa Xaa Ala Gly Tyr Leu Ala Arg Leu Xaa
                355             360             365
Ile Arg Xaa Xaa Xaa Arg Xaa Xaa Xaa Xaa Leu Gly Xaa Xaa Xaa Pro
        370             375             380
Leu Xaa Xaa Ile Xaa Xaa Xaa Xaa Xaa Xaa Xaa Xaa Xaa Xaa Xaa Xaa
385             390             395             400
Pro Glu Xaa Xaa Glu Xaa Xaa Xaa Xaa Xaa Xaa Xaa Xaa Xaa Xaa Xaa
                405             410             415
Glu Glu Xaa Xaa Xaa Xaa Xaa Thr Xaa Xaa Arg Gly Xaa Xaa Xaa Xaa
                420             425             430
Xaa Xaa Xaa Xaa Xaa Xaa Xaa Lys Xaa Xaa Gly Xaa Xaa Xaa Xaa Pro
            435             440             445
Xaa Xaa Xaa Leu Xaa Xaa Xaa Tyr Xaa Ser His Gly Xaa Xaa Pro Glu
            450             455             460
Xaa Xaa Xaa Glu Xaa Ala Xaa Xaa Xaa Xaa Xaa Val Xaa Xaa Pro
465             470             475             480
Asp Asn Phe Tyr Xaa Xaa Val Ala Xaa Xaa Xaa Xaa Xaa
                485             490

<210> SEQ ID NO 34
<211> LENGTH: 494
<212> TYPE: PRT
<213> ORGANISM: ARTIFICIAL
<220> FEATURE:
<223> OTHER INFORMATION: Formula II
<220> FEATURE:
<221> NAME/KEY: MISC_FEATURE
<222> LOCATION: (1)..(494)
<223> OTHER INFORMATION: Xaa represents any amino acid

<400> SEQUENCE: 34

Xaa Xaa Xaa Xaa Xaa Xaa Xaa Xaa Phe Xaa Glu Xaa Gly Xaa Xaa
1               5               10              15
Arg Lys Xaa Cys Xaa Xaa Cys Gly Xaa Xaa Phe Trp Thr Xaa Asp Pro
            20              25              30
Asp Arg Glu Thr Cys Gly Asp Xaa Pro Cys Asp Xaa Tyr Xaa Phe Ile
        35              40              45
Gly Xaa Pro Xaa Xaa Xaa Xaa Tyr Xaa Leu Xaa Glu Xaa Arg Glu
    50              55              60
Xaa Phe Leu Xaa Phe Phe Glu Xaa Xaa Xaa His Xaa Arg Xaa Xaa Arg
65              70              75              80
Tyr Pro Val Xaa Xaa Arg Trp Arg Asp Asp Val Xaa Leu Val Gly Ala
                85              90              95
Ser Ile Xaa Asp Phe Gln Pro Trp Val Xaa Ser Gly Xaa Xaa Xaa Pro
            100             105             110
Pro Ala Asn Pro Leu Xaa Ile Ser Gln Pro Ser Ile Arg Xaa Thr Asp
            115             120             125
Xaa Asp Asn Val Gly Xaa Thr Gly Arg His Xaa Thr Xaa Phe Glu Met
130             135             140
Met Ala His His Ala Phe Asn Xaa Pro Xaa Xaa Xaa Tyr Trp Xaa
145             150             155             160
Asp Glu Thr Val Glu Xaa Xaa Xaa Phe Xaa Thr Xaa Xaa Leu Xaa
                165             170             175
Xaa Xaa Xaa Glu Xaa Ile Thr Phe Lys Glu Xaa Xaa Trp Xaa Gly Gly
                180             185             190
```

```
Gly Asn Ala Gly Pro Xaa Xaa Glu Val Leu Xaa Arg Gly Leu Glu Val
            195                 200                 205

Ala Thr Leu Val Phe Met Gln Tyr Lys Xaa Xaa Xaa Xaa Xaa Xaa
            210                 215                 220

Xaa Xaa Xaa Xaa Xaa Xaa Xaa Gly Xaa Xaa Xaa Pro Met Xaa
225                 230                 235                 240

Xaa Xaa Xaa Val Asp Thr Gly Tyr Gly Leu Glu Arg Xaa Val Trp Xaa
            245                 250                 255

Ser Xaa Gly Thr Pro Thr Ala Tyr Asp Ala Val Xaa Xaa Val Xaa
            260                 265                 270

Xaa Xaa Leu Xaa Xaa Xaa Ala Gly Xaa Xaa Xaa Xaa Xaa Xaa
            275                 280                 285

Ile Leu Xaa Glu Asn Ser Xaa Leu Ala Gly Xaa Xaa Asp Ile Glu Xaa
            290                 295                 300

Xaa Xaa Asp Leu Xaa Xaa Leu Arg Xaa Xaa Val Ala Xaa Xaa Xaa Gly
305                 310                 315                 320

Ile Xaa Xaa Xaa Glu Leu Xaa Xaa Xaa Xaa Pro Xaa Glu Xaa Ile
            325                 330                 335

Tyr Ala Ile Ala Asp His Thr Xaa Xaa Leu Xaa Phe Met Leu Xaa Asp
            340                 345                 350

Gly Val Xaa Pro Ser Asn Val Lys Ala Gly Tyr Leu Ala Arg Leu Leu
            355                 360                 365

Ile Arg Xaa Xaa Xaa Arg Xaa Xaa Xaa Xaa Leu Gly Leu Xaa Xaa Pro
            370                 375                 380

Leu Xaa Glu Ile Xaa Xaa Xaa Xaa Xaa Xaa Leu Xaa Xaa Xaa Xaa
385                 390                 395                 400

Pro Glu Xaa Xaa Glu Xaa Xaa Xaa Xaa Ile Xaa Xaa Xaa Xaa Xaa
            405                 410                 415

Glu Glu Xaa Xaa Tyr Xaa Xaa Thr Leu Xaa Arg Gly Xaa Xaa Leu Val
            420                 425                 430

Xaa Xaa Xaa Xaa Xaa Xaa Leu Lys Lys Xaa Gly Xaa Xaa Glu Xaa Pro
            435                 440                 445

Leu Glu Xaa Leu Xaa Xaa Xaa Tyr Xaa Ser His Gly Xaa Xaa Pro Glu
            450                 455                 460

Xaa Val Xaa Glu Xaa Ala Xaa Xaa Xaa Gly Xaa Xaa Val Xaa Xaa Pro
465                 470                 475                 480

Asp Asn Phe Tyr Xaa Leu Val Ala Xaa Xaa Glu Xaa Xaa
            485                 490

<210> SEQ ID NO 35
<211> LENGTH: 493
<212> TYPE: PRT
<213> ORGANISM: ARTIFICIAL
<220> FEATURE:
<223> OTHER INFORMATION: Formula III
<220> FEATURE:
<221> NAME/KEY: MISC_FEATURE
<222> LOCATION: (1)..(493)
<223> OTHER INFORMATION: Xaa represents any amino acid

<400> SEQUENCE: 35

Met Xaa Met Asp Met Xaa Thr Arg Met Phe Lys Glu Glu Gly Trp Ile
1               5                   10                  15

Arg Lys Xaa Cys Lys Xaa Cys Gly Lys Xaa Phe Trp Thr Leu Asp Pro
            20                  25                  30

Asp Arg Glu Thr Cys Gly Asp Pro Pro Cys Asp Glu Tyr Xaa Phe Ile
            35                  40                  45
```

```
Gly Lys Pro Gly Ile Pro Lys Lys Tyr Thr Leu Xaa Glu Met Arg Glu
        50                  55                  60

Lys Phe Leu Ser Phe Phe Glu Xaa Xaa Gly His Gly Arg Val Lys Arg
 65                  70                  75                  80

Tyr Pro Val Leu Pro Arg Trp Arg Asp Asp Val Leu Leu Val Gly Ala
                     85                  90                  95

Ser Ile Met Asp Phe Gln Pro Trp Val Ile Ser Gly Glu Ala Asp Pro
                100                 105                 110

Pro Ala Asn Pro Leu Thr Ile Ser Gln Pro Ser Ile Arg Phe Thr Asp
            115                 120                 125

Ile Asp Asn Val Gly Ile Thr Gly Arg His Phe Thr Ile Phe Glu Met
130                 135                 140

Met Ala His His Ala Phe Asn Tyr Pro Gly Lys Pro Ile Tyr Trp Met
145                 150                 155                 160

Asp Glu Thr Val Glu Leu Ala Phe Glu Phe Phe Thr Lys Xaa Leu Gly
                165                 170                 175

Met Lys Pro Glu Asp Ile Thr Phe Lys Glu Asn Pro Trp Ala Gly Gly
                180                 185                 190

Gly Asn Ala Gly Pro Ala Phe Glu Val Leu Tyr Arg Gly Leu Glu Val
            195                 200                 205

Ala Thr Leu Val Phe Met Gln Tyr Lys Xaa Ala Pro Xaa Xaa Ala Xaa
210                 215                 220

Xaa Xaa Gln Val Val Xaa Ile Lys Gly Asp Xaa Tyr Val Pro Met Xaa
225                 230                 235                 240

Thr Xaa Val Val Asp Thr Gly Tyr Gly Leu Glu Arg Leu Val Trp Met
                245                 250                 255

Ser Gln Gly Thr Pro Thr Ala Tyr Asp Ala Val Leu Gly Tyr Val Val
                260                 265                 270

Glu Pro Leu Lys Xaa Met Ala Gly Xaa Glu Lys Ile Asp Xaa Xaa Ile
            275                 280                 285

Leu Met Glu Asn Ser Arg Leu Ala Gly Met Phe Asp Ile Glu Asp Met
290                 295                 300

Gly Asp Leu Arg Xaa Leu Arg Xaa Xaa Val Ala Xaa Arg Val Gly Ile
305                 310                 315                 320

Ser Val Glu Glu Leu Glu Xaa Xaa Xaa Arg Pro Tyr Glu Leu Ile Tyr
                325                 330                 335

Ala Ile Ala Asp His Thr Lys Ala Leu Thr Phe Met Leu Ala Asp Gly
            340                 345                 350

Val Ile Pro Ser Asn Val Lys Ala Gly Tyr Leu Ala Arg Leu Leu Ile
            355                 360                 365

Arg Lys Ser Ile Arg His Leu Arg Glu Leu Gly Leu Glu Xaa Pro Leu
            370                 375                 380

Ser Glu Ile Val Ala Met His Ile Lys Glu Leu Xaa Xaa Thr Phe Pro
385                 390                 395                 400

Glu Phe Lys Glu Met Glu Asp Val Ile Leu Asp Ile Xaa Xaa Val Glu
                405                 410                 415

Glu Lys Arg Tyr Xaa Glu Thr Leu Xaa Arg Gly Ser Xaa Leu Val Xaa
            420                 425                 430

Arg Glu Ile Xaa Lys Leu Lys Xaa Gly Xaa Xaa Glu Xaa Pro Leu
            435                 440                 445

Glu Lys Leu Ile Leu Phe Tyr Glu Ser His Gly Leu Thr Pro Glu Ile
450                 455                 460
```

```
Val Xaa Glu Ile Ala Glu Lys Glu Gly Xaa Lys Val Xaa Ile Pro Asp
465             470                 475                 480

Asn Phe Tyr Ser Leu Val Ala Lys Xaa Ala Glu Xaa Xaa
                485                 490
```